United States Patent
Sugiyama et al.

(10) Patent No.: US 8,557,191 B2
(45) Date of Patent: Oct. 15, 2013

(54) NANOCARBON PRODUCING APPARATUS

(75) Inventors: Eiichi Sugiyama, Yokohama (JP); Katsuki Ide, Chigasaki (JP); Kazutaka Kojo, Yokohama (JP); Tsuyoshi Noma, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/020,260

(22) Filed: Feb. 3, 2011

(65) Prior Publication Data
US 2011/0142726 A1 Jun. 16, 2011

Related U.S. Application Data

(63) Continuation of application No. PCT/JP2009/063205, filed on Jul. 23, 2009.

(30) Foreign Application Priority Data

| Aug. 8, 2008 | (JP) | 2008-205919 |
| Aug. 26, 2008 | (JP) | 2008-216827 |
| Aug. 26, 2008 | (JP) | 2008-216828 |
| Mar. 12, 2009 | (JP) | 2009-059737 |

(51) Int. Cl.
*B01J 8/02* (2006.01)
*D01F 9/12* (2006.01)
*D01F 9/133* (2006.01)

(52) U.S. Cl.
USPC ............ 422/199; 422/202; 422/212; 422/222; 977/842; 977/843; 977/845; 423/447.1

(58) Field of Classification Search
USPC .................. 422/198, 199, 202, 210, 212, 222; 423/447.1; 977/842, 843, 845
See application file for complete search history.

(56) References Cited

U.S. PATENT DOCUMENTS

| 4,378,240 A * | 3/1983 | Siegle et al. ................... 75/348 |
| 2004/0149209 A1 | 8/2004 | Dai et al. |
| 2007/0025906 A1 * | 2/2007 | Pirard et al. .............. 423/447.3 |
| 2008/0213138 A1 | 9/2008 | Nakayama et al. |
| 2009/0010822 A1 | 1/2009 | Dai et al. |

FOREIGN PATENT DOCUMENTS

| JP | 10-273308 | 10/1998 |
| JP | 2000-86217 | 3/2000 |
| JP | 2000-95509 | 4/2000 |
| JP | 2001-89251 | 4/2001 |

(Continued)

OTHER PUBLICATIONS

English abstract and machine translation for JP 2005-171443 A (Jun. 2005).*

(Continued)

*Primary Examiner* — Jennifer A Leung
(74) *Attorney, Agent, or Firm* — Finnegan, Henderson, Farabow, Garrett & Dunner, L.L.P.

(57) ABSTRACT

According to one embodiment, a nanocarbon producing apparatus includes a heating vessel which provides a reducing atmosphere therein, a heating source disposed on an outer circumference of the heating vessel, a hydrocarbon injection nozzle disposed on an upstream side of the heating vessel for spraying hydrocarbon into the heating vessel, and a nanocarbon product discharge nozzle disposed on a downstream side of the heating vessel, wherein a metallic substrate is disposed on an inside surface of the heating vessel and the hydrocarbon is continuously sprayed from the hydrocarbon injection nozzle, effecting a reaction to grow nanocarbon on the metallic substrate, and the grown nanocarbon product is peeled off from the metallic substrate and discharged through the discharge nozzle.

3 Claims, 21 Drawing Sheets

(56) References Cited

FOREIGN PATENT DOCUMENTS

| | | | |
|---|---|---|---|
| JP | 2001-115342 | | 4/2001 |
| JP | 2002-542136 | | 12/2002 |
| JP | 2003-342840 | | 12/2003 |
| JP | 2004-76196 | | 3/2004 |
| JP | 2004-523460 | | 8/2004 |
| JP | 2005171443 A | * | 6/2005 |
| JP | 2006-45051 | | 2/2006 |
| JP | 2006-143491 | | 6/2006 |
| JP | 2007-45637 | | 2/2007 |
| JP | 2007-515369 | | 6/2007 |
| JP | 2008-63718 | | 3/2008 |
| WO | WO 2006/033367 A1 | | 3/2006 |

OTHER PUBLICATIONS

Machine Translation for JP 2006-045051 A (Feb. 2006).*

International Search Report from Japanese Patent Office for International Application No. PCT/JP2009/063205, Mailed Oct. 27, 2009.

Notice of Reasons for Rejection issued by the Japanese Patent Office on Apr. 3, 2012, for Japanese Patent Application No. 2008-216827, and English-language translation thereof.

English-language Translation of the International Preliminary Report on Patentability for International Application No. PCT/JP2009/063205, issued Mar. 8, 2011.

* cited by examiner

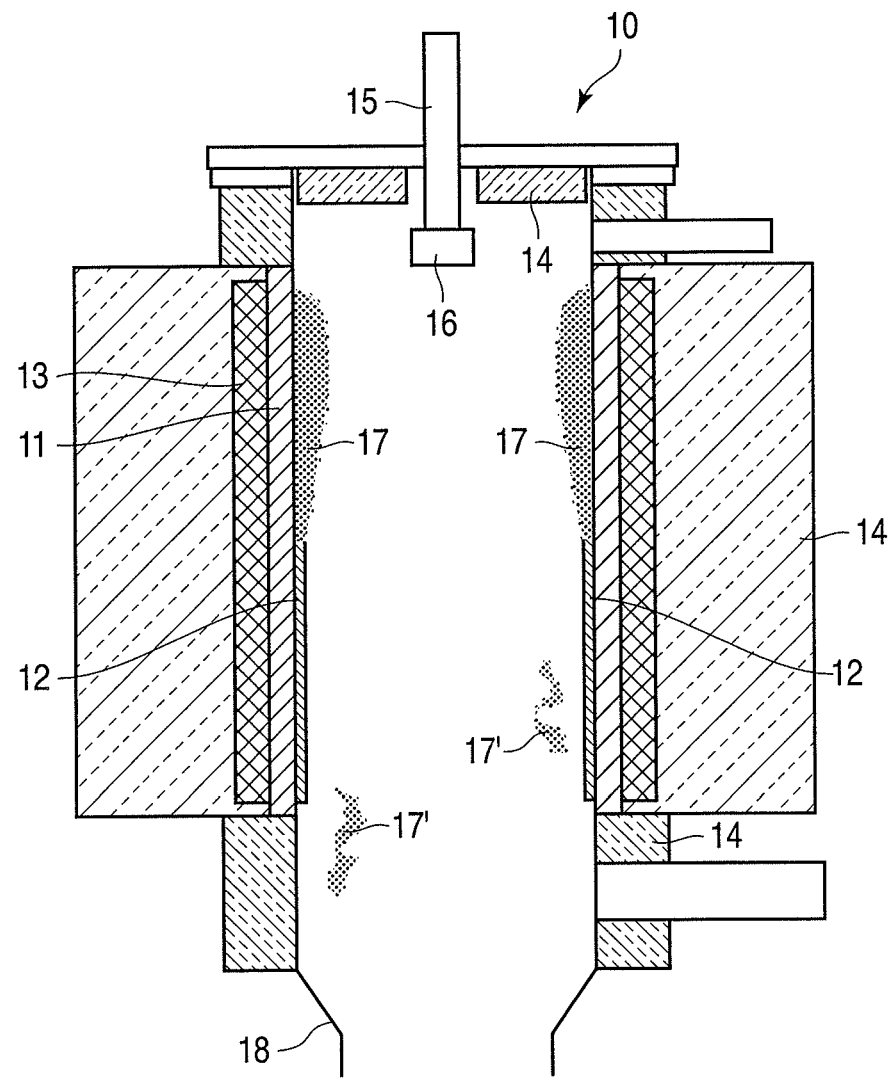
F I G. 1

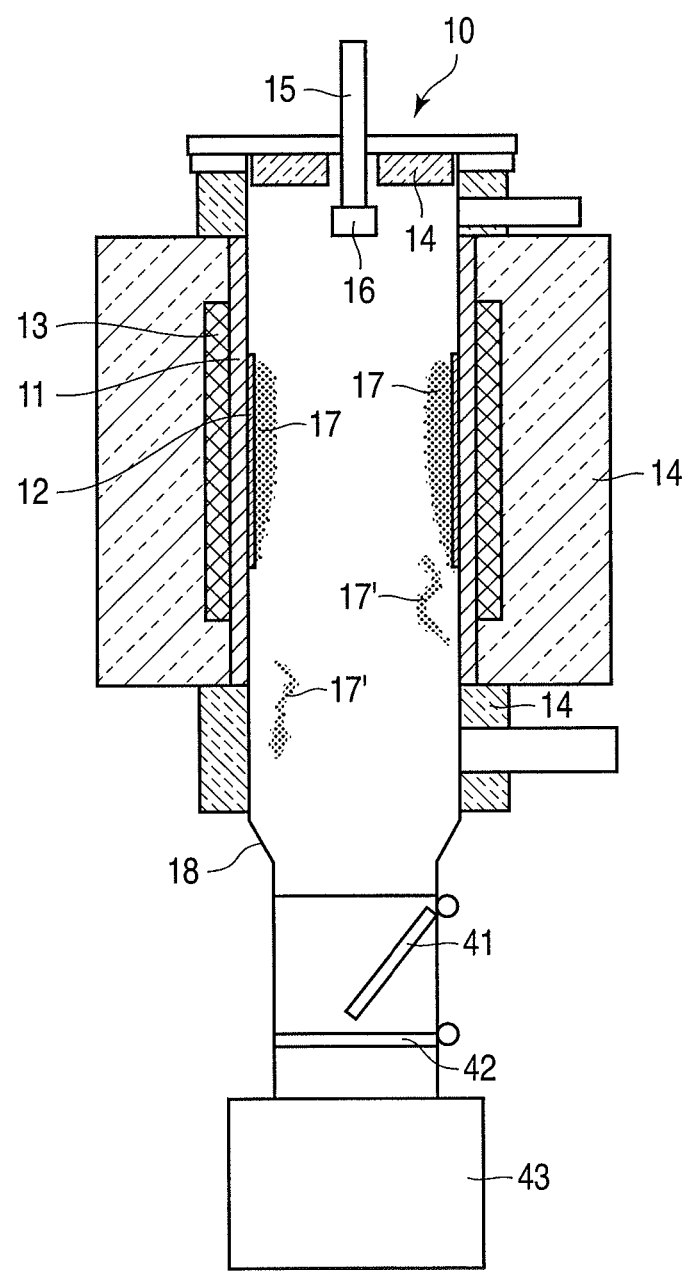
F I G. 5

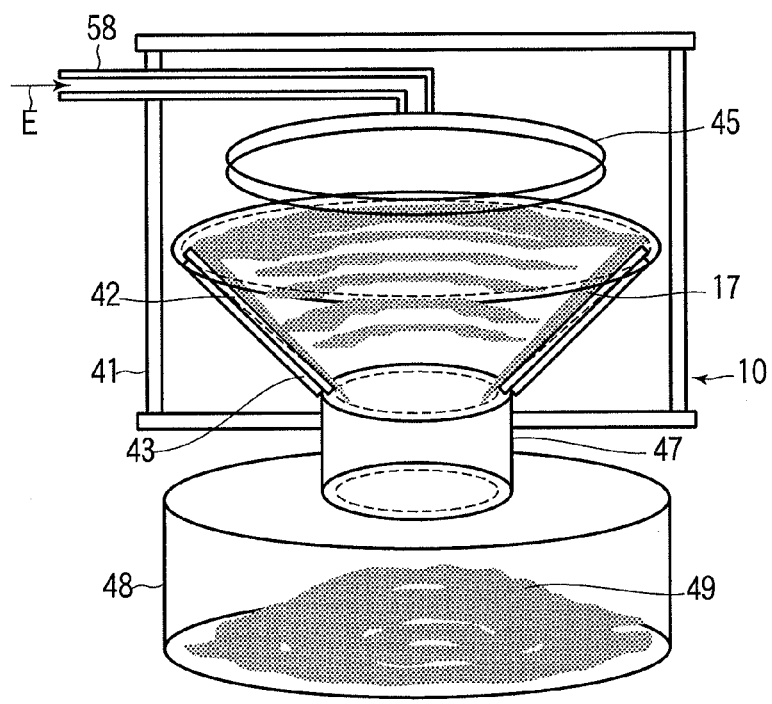
F I G. 12
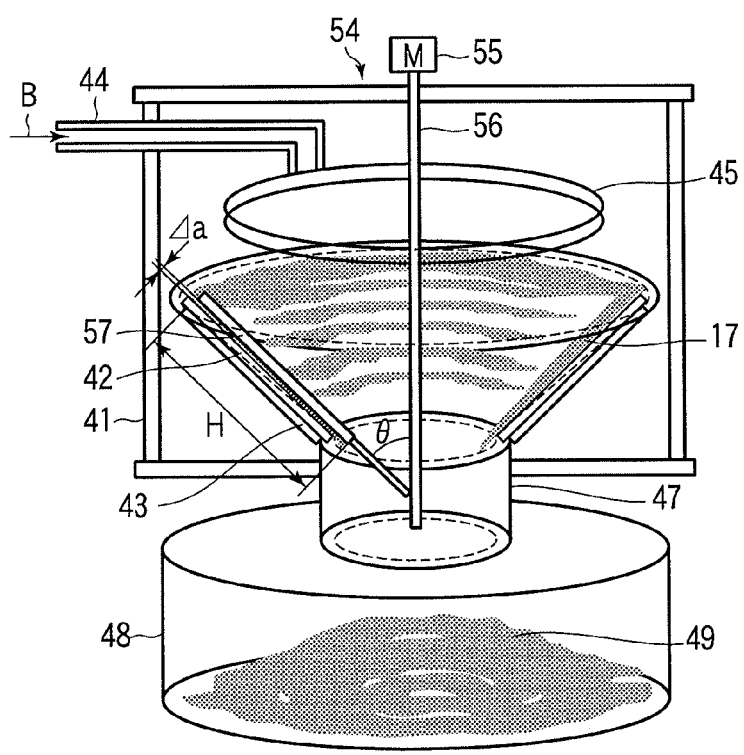
F I G. 13

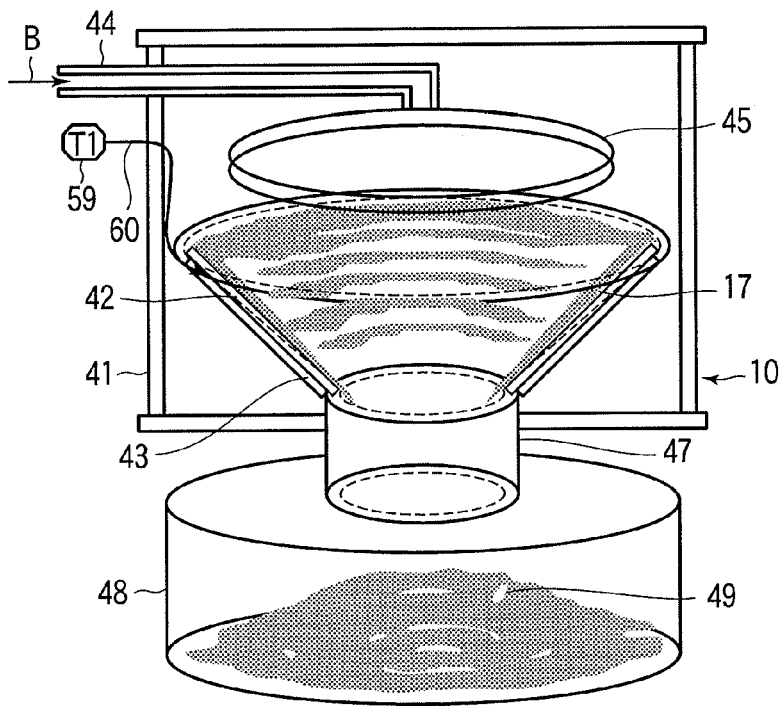
F I G. 14
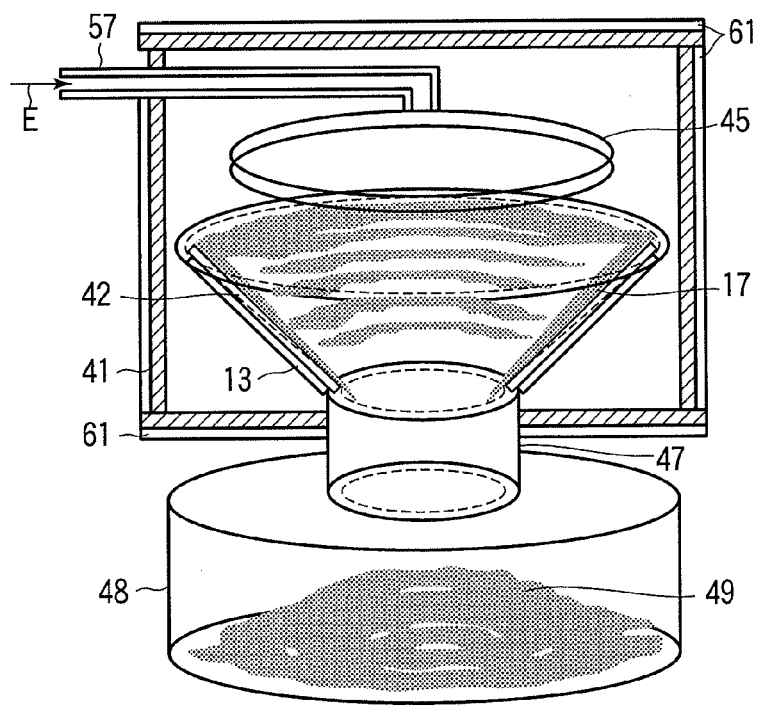
F I G. 15

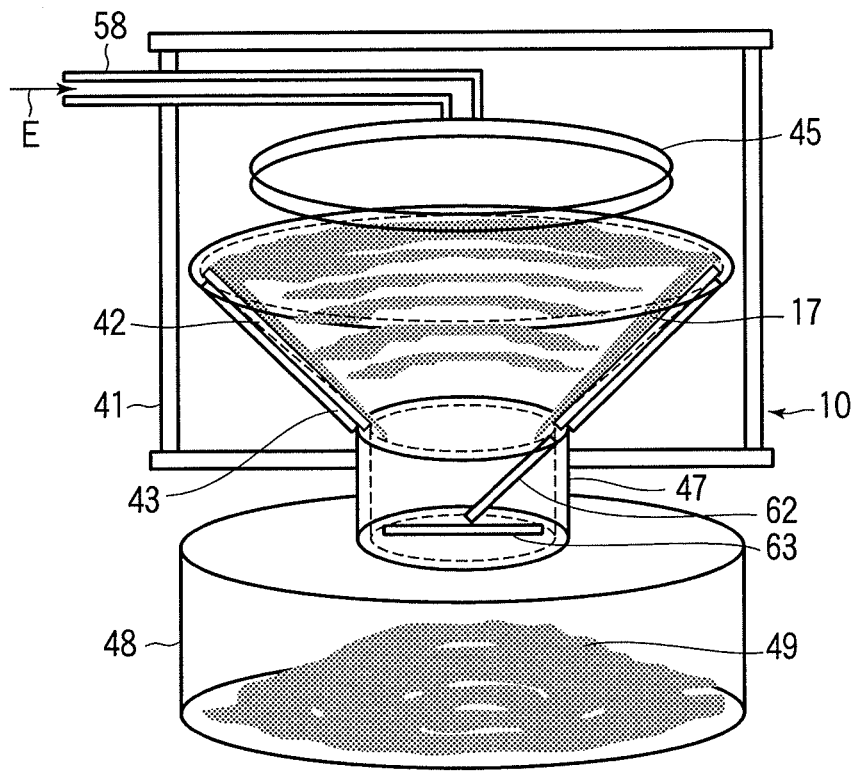
F I G. 16
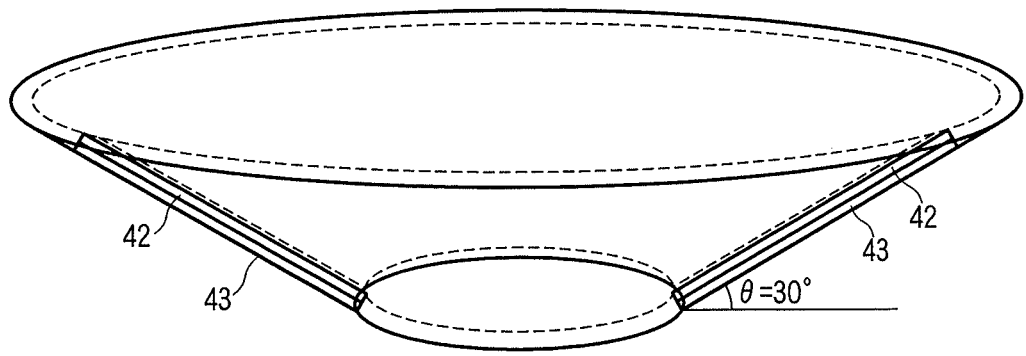
F I G. 17

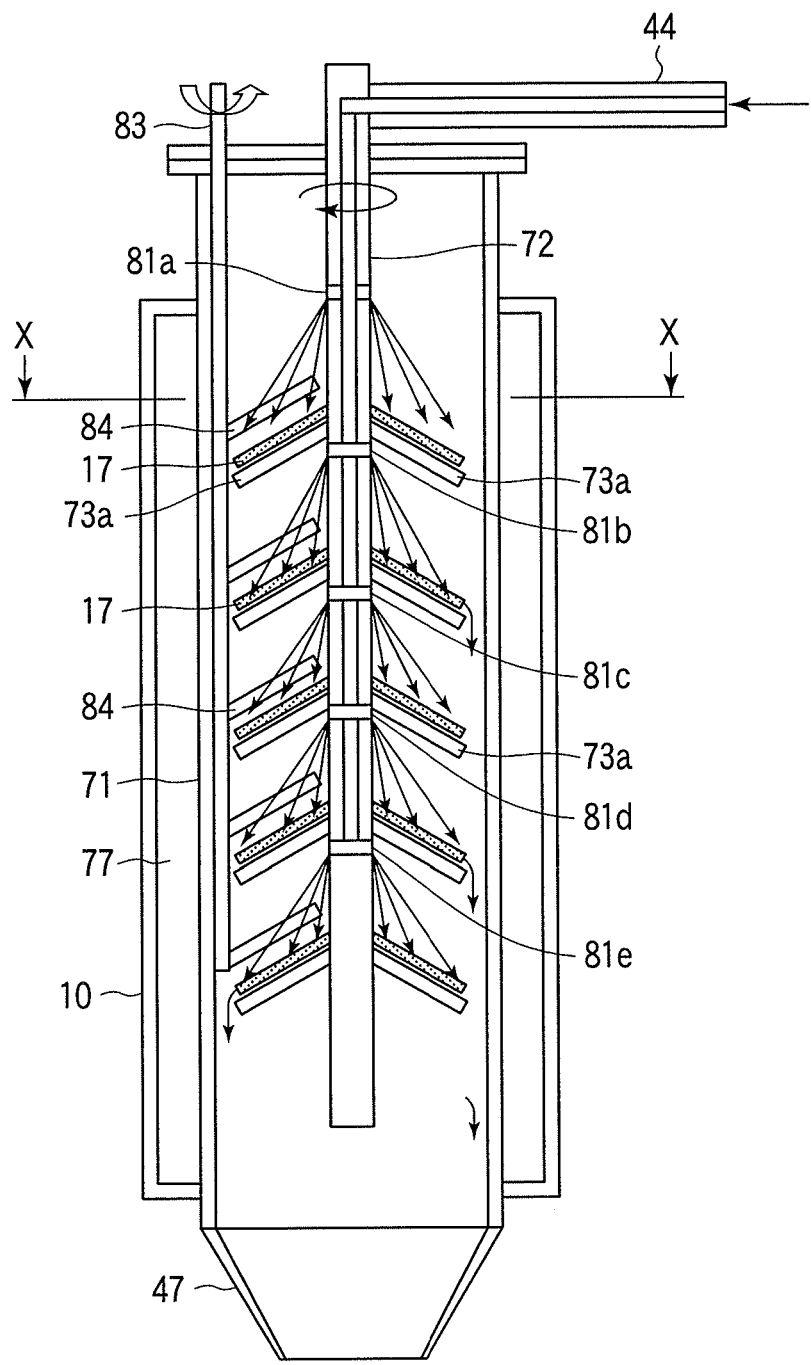
F I G. 23

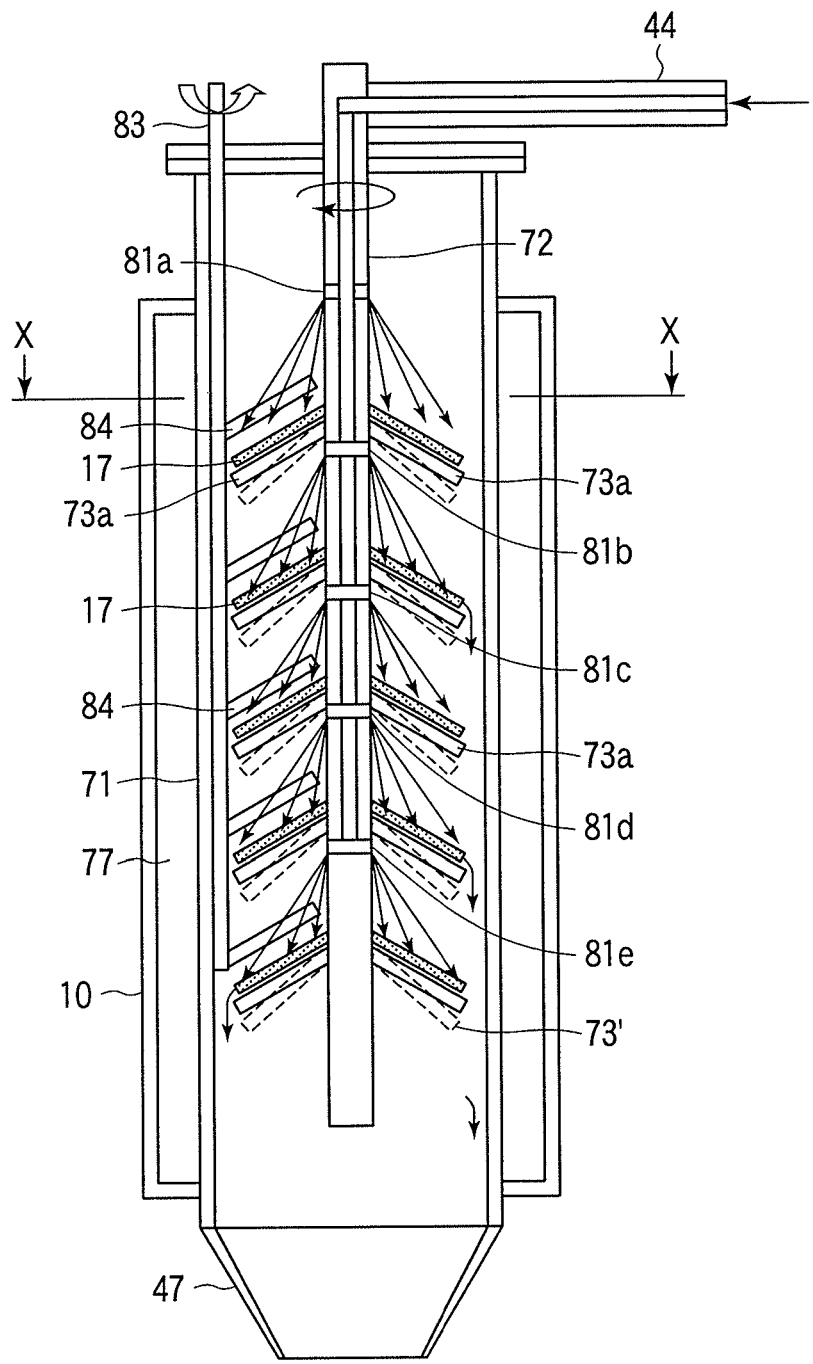
F I G. 24

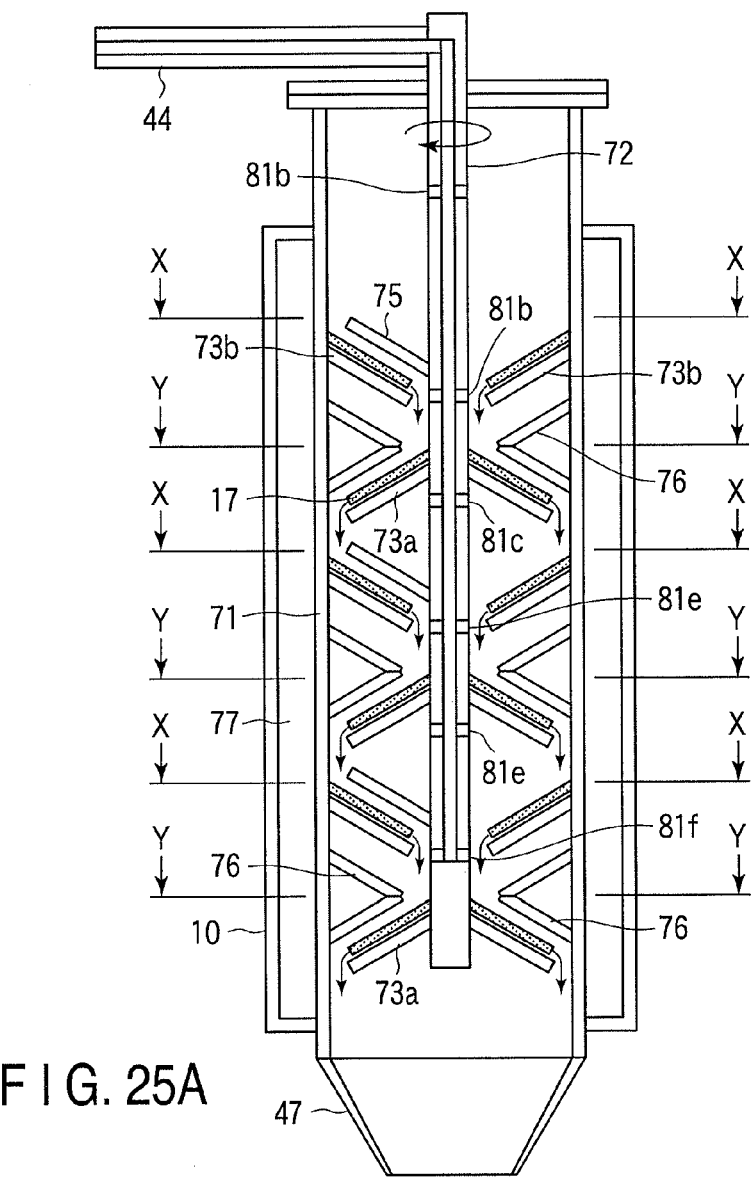
F I G. 25A
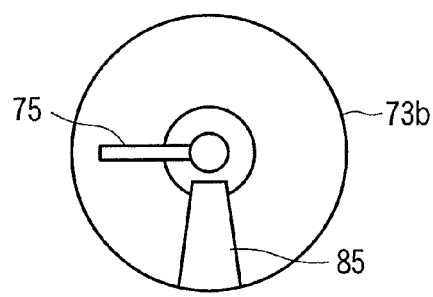
F I G. 25B
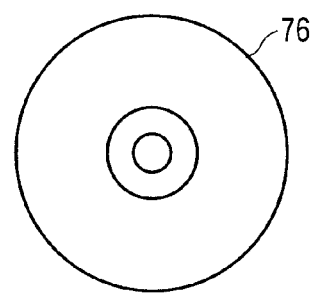
F I G. 25C

NANOCARBON PRODUCING APPARATUS

CROSS REFERENCE TO RELATED APPLICATIONS

This is a Continuation Application of PCT Application No. PCT/JP2009/063205, filed Jul. 23, 2009, which was published under PCT Article 21(2) in Japanese.

This application is based upon and claims the benefit of priority from Japanese Patent Applications No. 2008-205919, filed Aug. 8, 2008; No. 2008-216827, filed Aug. 26, 2008; No. 2008-216828, filed Aug. 26, 2008; and No. 2009-059737, filed Mar. 12, 2009; the entire contents of all of which are incorporated herein by reference.

FIELD

Embodiments described herein relate generally to a nanocarbon producing apparatus which is capable of efficiently producing highly useful fibrous nanocarbon such as a carbon nanotube, a carbon fiber, a carbon nanocoil, etc.

BACKGROUND

As well known, there are various methods for producing a carbon nanotube, such as an arc discharge method, a laser vapor deposition method and a chemical vapor deposition method (CVD method).

The arc discharge method is a method wherein graphite is enabled to vaporized through the generation of arc discharge between a positive graphite electrode and a negative graphite electrode, thereby creating a deposition of condensed carbon on a distal end of the negative electrode and forming carbon nanotube in the deposition of condensed carbon (see for example, Jpn. Pat. Appln. KOKAI Publication No. 2000-95509). The laser vapor deposition method is a method wherein a graphite specimen mixed with a metallic catalyst is placed in an inert gas atmosphere which is over-heated to high temperatures and then subjected to laser irradiation, thereby forming carbon nanotube (see for example, Jpn. Pat. Appln. KOKAI Publication No. 10-273308).

Generally speaking, although it is possible in the cases of the arc discharge method and the laser vapor deposition method to create carbon nanotube having an excellent crystallinity, the quantity of carbon nanotube created is small, thus it is considered difficult to create carbon nanotube in large quantities.

The DVD method can be classified into two methods, i.e. a substrate method wherein carbon nanotubes are formed on a substrate placed in a reaction furnace (see for example, Jpn. Pat. Appln. KOKAI Publication No. 2000-86217) and a fluidized gas phase method wherein a carbon source is fluidized together with a catalytic metal in a high-temperature furnace, thereby creating carbon nanotube (see for example, Jpn. Pat. Appln. KOKAI Publication No. 2003-342840).

The vapor phase deposition method will be explained with reference to FIG. 6. The reference number 1 in FIG. 6 represents a reaction tube in which a catalyst-carrying substrate 3 having a catalyst 2 carried therein is positioned. Electric heaters 4 are disposed on an outer circumference of the reaction tube 1. A raw material (hydrocarbon) 5 is allowed to flow into the interior of the reaction tube 1 from one side of the reaction tube 1 and to discharge from the other side of the reaction tube 1. As a result, a hydrocarbon gas 6 is generated in the interior of the reaction tube 1, thereby forming carbon nanotube. Incidentally, the reference number 8 in FIG. 6 represents a hydrocarbon gas.

Next, the fluidized gas phase method will be explained with reference to FIG. 7. In FIG. 7, the same components as those of FIG. 6 are identified by the same reference numbers, thereby omitting the explanation thereof. The system shown in FIG. 7 is characterized in that a hydrocarbon 5 employed as a raw material is fed together with a carrier gas 8 from one side of a reaction tube 1. By doing so, a hydrocarbon gas 6 is enabled to generate at an inner region of the reaction tube 1 which corresponds to the region where an electric heater 4 is disposed, thereby making it possible to form carbon nanotube 7.

However, since the aforementioned vapor phase deposition method is performed by way of a batch treatment, it is difficult to utilize for mass production. Further, in the case of the fluidized gas phase method, it is poor in uniformity of temperature and hence considered difficult to create carbon nanotubes exhibiting excellent crystallinity. On the other hand, there is proposed an innovated type of fluidized gas phase method, wherein a fluidizing material also acting as a catalyst is employed for creating a fluidized layer in a high temperature furnace, and a carbonaceous raw material is fed to the furnace to create fibrous carbon nanotubes. However, in the case of this method also, it is poor in uniformity of temperature and hence considered difficult to create carbon nanotubes exhibiting excellent crystallinity.

Therefore, if it becomes possible to effectively and cheaply mass-produce fibrous carbon nanotubes which are highly useful such as high-purity/high stability carbon nanotubes, high-purity/high stability carbon fibers, high-purity/high stability carbon nanocoils, etc., it may become possible to supply nano-technology products utilizing the characteristics of carbon nanotube in large quantities and at a low cost.

BRIEF DESCRIPTION OF THE DRAWINGS

FIG. 1 is a schematic cross-sectional view of a nanocarbon producing apparatus according to the first embodiment of the present invention;

FIG. 5 is a schematic cross-sectional view of a nanocarbon producing apparatus according to the eleventh and the twelfth embodiment of the present invention;

FIG. 12 is a diagram schematically illustrating a nanocarbon producing apparatus according to the twenty-first embodiment of the present invention;

FIG. 13 is a diagram schematically illustrating a nanocarbon producing apparatus according to the twenty-second embodiment of the present invention;

FIG. 14 is a diagram schematically illustrating a nanocarbon producing apparatus according to the twenty-fourth embodiment of the present invention;

FIG. 15 is a diagram schematically illustrating a nanocarbon producing apparatus according to the twenty-fifth embodiment of the present invention;

FIG. 16 is a diagram schematically illustrating a nanocarbon producing apparatus according to the twenty-sixth embodiment of the present invention;

FIG. 17 is a diagram schematically illustrating a vertical type nanocarbon producing apparatus according to the twenty-seventh embodiment of the present invention;

FIG. 23 is a diagram schematically illustrating a vertical type nanocarbon producing apparatus according to the thirty-third embodiment of the present invention;

FIG. 24 is a diagram schematically illustrating a vertical type nanocarbon producing apparatus according to the thirty-fourth embodiment of the present invention;

FIG. 25A is a diagram schematically illustrating the entire structure of a vertical type nanocarbon producing apparatus according to the thirty-fifth embodiment of the present invention;

FIG. 25B is a cross-sectional view taken along the X-X line of FIG. 25A;

FIG. 25C is a cross-sectional view taken along the Y-Y line of FIG. 25A;

DETAILED DESCRIPTION

Figure 2:
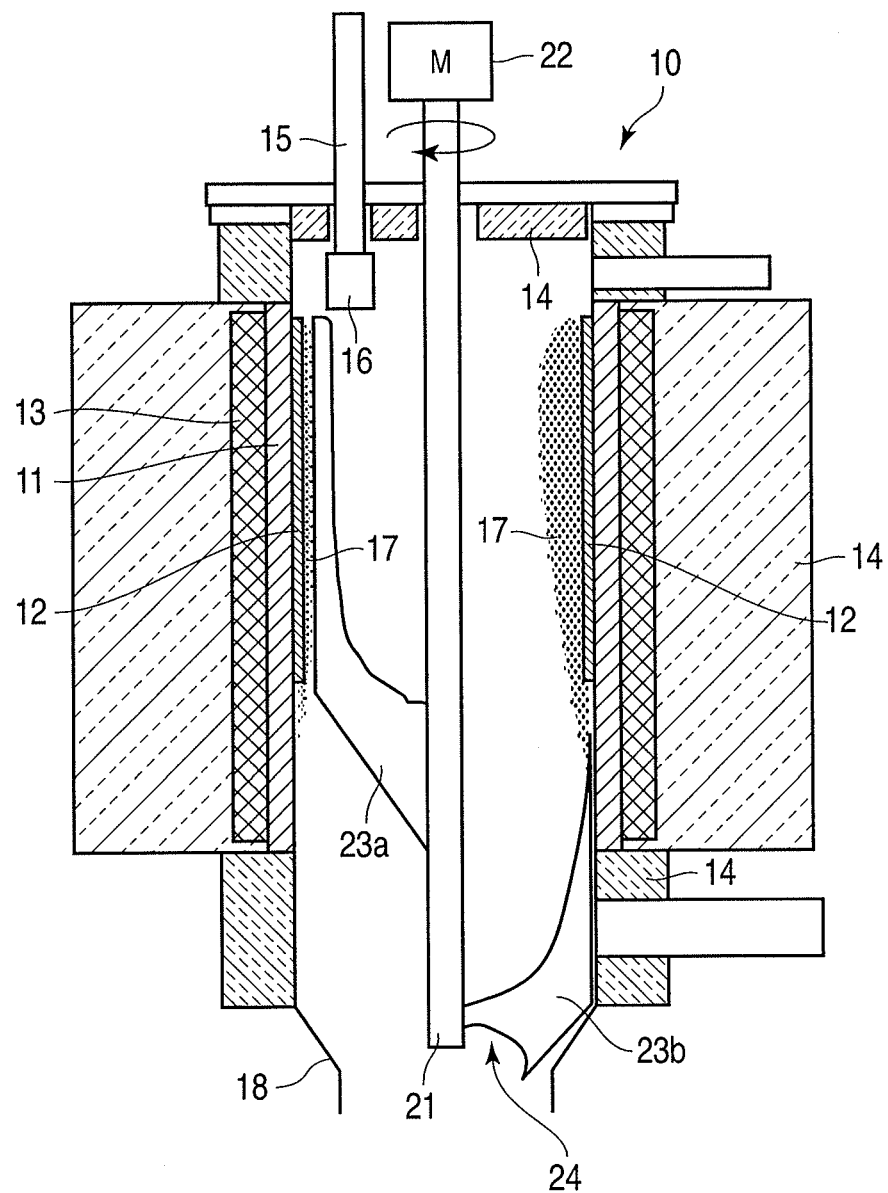
FIG. 2 is a schematic cross-sectional view of a nanocarbon producing apparatus according to the second, the third, the fourth, the fifth and the sixth embodiment of the present invention.

In general, according to one embodiment, an object of the present invention is to provide a nanocarbon producing apparatus which makes it possible to effectively and cheaply mass-produce fibrous carbon which is highly useful, such as high-purity/high stability carbon nanotubes, high-purity/high stability carbon fibers, high-purity/high stability carbon nanocoils, etc. without inviting the inclusion of metallic catalyst powder in the fibrous carbon nanotube.

Another object of the present invention is to provide a nanocarbon producing apparatus which makes it possible to effectively and cheaply mass-produce fibrous carbon which is highly useful, such as high-purity/high stability carbon nanotubes, high-purity/high stability carbon fibers, high-purity/high stability carbon nanocoils, etc. without requiring the employment of a special catalytic substrate and without inviting the inclusion of metallic catalyst powder in the fibrous carbon nanotube.

A further object of the present invention is to provide a nanocarbon producing apparatus which can be operated under constant conditions, and makes it possible to continuously and almost semi-permanently create nanocarbon, thereby enabling to supply nanocarbon in large quantities.

According to the present invention, there is provided a nanocarbon producing apparatus characterized by comprising: a heating vessel which provides a reducing atmosphere therein; a heating source disposed on an outer circumference of the heating vessel; a hydrocarbon injection nozzle disposed on an upstream side of the heating vessel for spraying hydrocarbon into the heating vessel; and a nanocarbon product discharge nozzle disposed on a downstream side of the heating vessel; wherein a metallic catalyst is disposed on an inside surface of the heating vessel and the hydrocarbon is continuously sprayed from the hydrocarbon injection nozzle, effecting a reaction to grow nanocarbon on the metallic substrate, and the grown nanocarbon is peeled off from the metallic substrate and discharged through the discharge nozzle.

According to the present invention, there is also provided a nanocarbon producing apparatus characterized by comprising: a heating vessel which provides a reducing atmosphere therein; a cone-shaped plate disposed in the heating vessel, with an angle of inclination, concentrically with the heating vessel; a heating source disposed on an outer circumference of the cone-shaped plate; a hydrocarbon/catalyst mixing and spraying nozzle disposed on an upstream side of the heating vessel for continuously or intermittently spraying a mixture comprising hydrocarbon and metallic catalyst powder into the heating vessel; and a nanocarbon discharge nozzle disposed on a downstream side of the heating vessel; wherein a metallic catalyst powder-mixed hydrocarbon mixed with the metallic catalyst powder is continuously or intermittently sprayed from the hydrocarbon/catalyst mixing and spraying nozzle, effecting a reaction to grow noncarbon on the cone-shaped plate, and the grown nanocarbon product is peeled off from the cone-shaped plate and discharged through the nanocarbon discharge nozzle.

According to the present invention, there is further provided a nanocarbon producing apparatus characterized by comprising: a heating vessel which is installed vertically and provides a reducing atmosphere therein; cone-shaped plates disposed in multistage in the heating vessel, with an angle of inclination, concentrically with the heating vessel; a heating source disposed on an outer circumference of the multistage cone-shaped plates; a hydrocarbon/catalyst mixing and spraying nozzle disposed on an upstream side of the heating vessel for mixing and spraying a hydrocarbon and a small quantity of metallic catalyst fine powder into the heating vessel; and a nanocarbon discharge nozzle disposed on a downstream side of the heating vessel; wherein a metallic catalyst powder-mixed hydrocarbon mixed with the metallic catalyst powder is continuously or intermittently sprayed from the hydrocarbon/catalyst mixing and spraying nozzle, effecting a reaction to grow noncarbon on the cone-shaped plates, and the grown nanocarbon product is peeled off from the cone-shaped plates and discharged through the nanocarbon discharge nozzle.

According to the present invention, it is possible to effectively and cheaply mass-produce fibrous carbon which is highly useful, such as high-purity/high stability carbon nanotubes, high-purity/high stability carbon fibers, high-purity/high stability carbon nanocoils, etc. without inviting the inclusion of metallic catalyst powder in the fibrous carbon nanotubes.

Further, according to the present invention, it is possible to effectively and cheaply mass-produce fibrous carbon which is highly useful, such as high-purity/high stability carbon nanotubes, high-purity/high stability carbon fibers, high-purity/high stability carbon nanocoils, etc. without requiring the employment of a special catalytic substrate and without inviting the inclusion of metallic catalyst powder in the fibrous carbon nanotube.

Furthermore, according to the present invention, it is possible to provide a nanocarbon producing apparatus which can be operated under constant conditions, and makes it possible to continuously and almost semi-permanently create nanocarbon, thereby enabling to supply nanocarbon in large quantities.

Next, specific embodiments of the present invention will be further explained with reference to the drawings. These embodiments however are not intended to limit the scope of the present invention.

(First Embodiment)

FIG. 1 is a schematic cross-sectional view of a vertical type nanocarbon producing apparatus 10 according to the first embodiment of the present invention.

A reference number 11 in FIG. 1 shows schematically a vertical type heating vessel (inner cylinder) which provides a reducing atmosphere therein. In this heating vessel 11, a cylindrical metallic substrate 12 is disposed in contact with the inner wall of this heating vessel 11. An electric heater 13 is disposed as a heating source on the outer circumference of the heating vessel 11, so that the metallic substrate 12 is enabled to be heated by this electric heater 13. Herein, the length in the vertical direction of the metallic substrate 12 is shorter than the length in the vertical direction of the electric heater 13, and the metallic substrate 12 is positioned at almost the central position of the electric heater 13. A heat insulating material 14 is disposed so as to externally surround the heating vessel 11 and the electric heater 13, thereby making is possible to thermally insulate the interior of the heating vessel 11. On the upper side (upstream side) of the heating vessel 11 is disposed a hydrocarbon injecting nozzle 15 for injecting hydrocarbon into the interior of heating vessel 11. In this case, a distal end of the hydrocarbon injecting nozzle 15 is located at a region higher than the metallic substrate 12. A hydrocarbon dispersing mesh 16 is attached to the distal end of the hydrocarbon injecting nozzle 15, thereby enabling the hydrocarbon to be sprayed in the heating vessel. A nanocarbon product discharging nozzle (hereinafter referred simply as a discharge nozzle) 18 for discharging nanocarbon 17 which has been produced and separated on the surface of the metallic substrate 12 is attached to a lower portion (downstream side) of the heating vessel 11.

Next, the operation of the nanocarbon producing apparatus 10 constructed as described above will be explained.

By making use of the hydrocarbon injecting nozzle 15, hydrocarbon is continuously sprayed from the hydrocarbon dispersing mesh 16 located on the upstream side of the nanocarbon producing apparatus 10. As a result, the reaction of hydrocarbon is caused to take place on the metallic substrate 12 which has been disposed in contact with the inner wall of this heating vessel 11 of the nanocarbon producing apparatus 10, thereby enabling the nanocarbon 17 to grow. Namely, the hydrocarbon that has been sprayed from an upper portion of the nanocarbon producing apparatus 10 is reacted on the metallic substrate 12 which has been disposed on the inner wall of heating vessel 11 of the nanocarbon producing apparatus 10, resulting in the growth of the nanocarbon 17.

Due to its own weight, the nanocarbon 17 that has been grown on the metallic substrate 12 is caused to peel off from metallic substrate 12. The nanocarbon 17' that has been peeled is caused to gravitationally drop. With respect to the microscopic mechanism in the production of nanocarbon, it can be explained as follows. Namely, the hydrocarbon is caused to react with metallic fine particles existing on the surface of the metallic substrate 12 at an optimum temperature to create the nanocarbon 17 and then, as the nanocarbon grows, the metallic fine particles reacted are caused to peel off and slightly separated from the surface of the metallic substrate 12. Then, to the metallic fine particles thus separated, nanocarbon is additionally precipitated and permitted to grow. By repeating these phenomena, the nanocarbon is acceleratingly produced and grown, thereby making it possible to synthesize highly pure nanocarbon in large quantities.

Since the nanocarbon is synthesized in large quantities within a short period of time, a block of the nanocarbon that has been grown to more than a predetermined thickness is caused to peel off and, due to its own weight, gravitationally drop from the metallic substrate. On this occasion, the quantity of the metallic fine particles that peel off from the metallic substrate is very small, so that even after the peeling of nanocarbon, hydrocarbon is permitted to react with the metallic fine particles existing on metallic substrate, thereby making it possible to continuously repeat the production and growth of nanocarbon. Therefore, when hydrocarbon is continuously sprayed, through the hydrocarbon dispersing mesh 16, from the hydrocarbon injecting nozzle 15 disposed at an upper portion of the nanocarbon producing apparatus 10, the reaction of hydrocarbon is caused to take place repeatedly on the metallic substrate which has been disposed in contact with the inner cylindrical wall of the nanocarbon-producing furnace, thereby continuously and repeatedly enabling to produce and grow the nanocarbon.

Namely, catalytic particles constituting a substrate functions as a core and reacts with the catalytic particles thus sprayed under a high temperature condition, thereby enabling nanocarbon to produce and grow by way of a vapor phase deposition method. By uniformly heating the surface of the substrate and, at the same time, by uniformly spraying hydrocarbon, nanocarbon is enabled to uniformly produce and grow without being uneven on the surface of the substrate. As a result, nanocarbon can be continuously manufactured.

As describe above, the nanocarbon producing apparatus according to the first embodiment comprises: the heating vessel 11; the electric heater 13 disposed on an outer circumference of the heating vessel 11; the hydrocarbon injection nozzle 15 disposed on an upstream side of the heating vessel 11 for spraying hydrocarbon into the heating vessel 11; and the nanocarbon product discharge nozzle 18 disposed on a downstream side of the heating vessel 11; wherein the heating vessel 11 is provided, on an inner wall thereof, with the metallic substrate 12 and the hydrocarbon is enabled to be continuously sprayed from the hydrocarbon injection nozzle 15 toward the metallic substrate, thereby enabling a reaction and the growth of nanocarbon to take place on the metallic substrate 12, the resultant nanocarbon product being subsequently allowed to peel off from metallic substrate 12 and discharged from the nanocarbon product discharge nozzle 18. Therefore, it is possible to effectively mass-produce high-quality nanocarbon which is high in purity and stability at a low cost. Further, since the length in the vertical direction of the metallic substrate 12 is made shorter than the length in the vertical direction of the electric heater 13 and, at the same time, the metallic substrate 12 is positioned at almost the central position of the electric heater 13, it is possible to maintain the surface temperature of the metallic substrate 12 at an optimal condition, thereby making it possible to mass-produce nanocarbon exhibiting a higher quality.

Incidentally, although an electric heater is employed as a heating source in the first embodiment, the heating source is not limited to the electric heater but may be constructed so as to utilize the hot air to be obtained from the waste heat to be generated from installations or plants, thereby improving the efficiency of the nanocarbon producing apparatus as a whole or the efficiency of the system as a whole.

Further, in order to optimize the flow rate of hydrocarbon being sprayed from the hydrocarbon injecting nozzle for the production of nanocarbon, a flow meter and a flow rate-controlling valve may be optionally attached to a hydrocarbon supply pipe which is connected with a hydrocarbon header, thereby making it possible to control the spray rate of hydrocarbon.

Furthermore, in the embodiment shown in FIG. 1, the nanocarbon producing apparatus is constructed as a vertical system so that the hydrocarbon injecting nozzle is disposed at an upper region of the nanocarbon producing apparatus and the nanocarbon product discharge nozzle is disposed at a lower region of the nanocarbon producing apparatus. However, the nanocarbon producing apparatus may be constructed as a horizontal system or an oblique system, wherein a metallic substrate may be disposed in contact with the inner wall of a concentrical inner cylinder to be heated by the electric heater and installed in the nanocarbon producing apparatus provides a reducing atmosphere therein and the discharging system for the nanocarbon product may be suitably designed so as to make it possible to efficiently and continuously manufacture nanocarbon.

(Second Embodiment)

FIG. 2 is a schematic cross-sectional view of a vertical type nanocarbon producing apparatus 10 according to the second embodiment of the present invention. Herein, the same components as those of FIG. 1 are identified by the same reference numbers, thereby omitting the explanation thereof.

A reference number 21 in FIG. 2 shows a rotational driving shaft which can be rotated by means of a driving shaft-rotating motor 22. This driving shaft-rotating motor 22 is equipped with a plate-like scraper blade 23a for scraping the nanocarbon product 17 that has been deposited on the surface of the metallic substrate 12 and with a scraper blade 23b for reliably dropping the nanocarbon product 17 that has been scraped by the plate-like scraper blade 23a down, through the discharge nozzle 18, to a region below the nanocarbon producing apparatus. These scraper blades 23a and 23b are respectively mounted concentrically with the heating vessel 11. Herein, the entire system comprising the rotational driving shaft 21, the driving shaft-rotating motor 22 and the scraper blades 23a and 23b is generically referred to as a scraping mechanism 24. These scraper blades 23a and 23b are respectively disposed such that the outermost edge thereof can be slightly and uniformly spaced away from the surface of the cylindrical metallic substrate 12 during the rotation thereof. Therefore, only the nanocarbon 17 that has been deposited on the surface of the metallic substrate 12 can be scraped off by these scraper blades 23a and 23b and made to drop.

Next, the operation of the nanocarbon producing apparatus 10 constructed as described above will be explained.

Catalytic particles constituting a substrate functions as a core and the catalytic particles reacts with the hydrocarbon thus sprayed under a high temperature condition, thereby enabling nanocarbon to produce and grow by way of a vapor phase deposition method. Although it is possible to frequently scrape away the produced and grown nanocarbon 17 by continuously rotating the scraping mechanism 24, the quantity of nanocarbon recovered is decreased and the metal on the surface of metallic substrate may be scraped, thereby taking up the catalytic metal particles and hence increasing the content of metal in the nanocarbon product. For this reason, it is more effective to intermittently rotate the scraping mechanism 24 at the moment when the nanocarbon 17 has been grown to a certain extent on the surface of the metallic substrate, and not drive the scraping mechanism 24 all the time.

Further, since the bulk specific gravity of nanocarbon is very low, a bridge of nanocarbon may be created at a low region of the heating vessel 11 by the nanocarbon that has been scraped off and flown downward as the distal end portion of the nanocarbon product discharge nozzle 18 disposed on a downstream side of the heating vessel 11 is tapered. In order to prevent the generation of such a bridge, the scraper blade 23b is attached to a portion of the rotational driving shaft 21 which is located at a downstream side of the nanocarbon producing apparatus 10, thereby making it possible to perform the scraping of the inner surface region of the nanocarbon producing apparatus 10 located in the vicinity of the nanocarbon product discharge nozzle 18 where the bridge is more likely to be formed. By the provision of the scraper blade 23b, it becomes possible to effectively prevent the bridge from being formed by the discharging nanocarbon product while enabling to realize the scraping and falling of the nanocarbon product.

In the nanocarbon producing apparatus according to the second embodiment, the scraping mechanism 24 comprising the rotational driving shaft 21, the driving shaft-rotating motor 22 and the scraper blades 23a and 23b is disposed in the heating vessel 11, thereby making it possible to scrape away the nanocarbon product deposited on the surface of the metallic substrate by means of the scraper blade 23a. Therefore, the nanocarbon 17 that has not peeled off and dropped under its own weight the metallic substrate 12 after nanocarbon has been grown to a predetermined thickness on the metallic substrate 12 can be made to drop, at periodic intervals, to a region below the nanocarbon producing apparatus 10. As a result, the nanocarbon product can be steadily discharged from the downstream side of the nanocarbon producing apparatus 10, thus making it possible to continuously manufacture nanocarbon.

Further, since the scraper blade 23b is secured to that portion of the rotational driving shaft 21 that is located at a lower portion of the nanocarbon producing apparatus 10, it is possible to scrape away nanocarbon deposited on the surface of a lower portion of the nanocarbon producing apparatus 10 where the nanocarbon product discharge nozzle 18 is attached and a bridge of nanocarbon is more likely to be formed. As a result, it is now possible to effectively prevent bridges from being formed by the discharging nanocarbon product while enabling to realize the scraping and falling of the nanocarbon product.

As for the system for preventing the formation of bridges of nanocarbon product while enabling to realize the scraping and falling of the nanocarbon product in the second embodiment, it is of course possible to employ, other than the aforementioned system of using a nanocarbon product scraping rod and scraping blades, any other system which makes it possible to stably discharge the nanocarbon product, such, for example, as a system wherein a brush may be mounted in a manner to optimally carry out not only the scraping of nanocarbon but also the prevention of the formation of bridges of discharging nanocarbon product. Further, although an electric heater is employed as a heating source in the above embodiment, it is also possible to utilize the hot air from the waste heat generated from installations or plants, thereby improving the efficiency of the nanocarbon producing apparatus as a whole or the efficiency of the system as a whole.

(Third Embodiment)

The vertical type nanocarbon producing apparatus according to the third embodiment of the present invention is fundamentally the same in construction as the nanocarbon producing apparatus shown in FIG. 2. Therefore, this nanocarbon producing apparatus will be explained with reference to FIG. 2.

The nanocarbon producing apparatus according to the third embodiment is characterized in that a material of the material substrate 12 is iron and that a surface temperature of this iron metallic substrate 12 is set to a range of 550° to 700° C. as hydrocarbon is continuously and uniformly sprayed thereto.

It is desirable to set the surface temperature of the iron metallic substrate as low as possible and to enhance the efficiency of the nanocarbon producing apparatus as a whole. However, it has verified through repeated tests and researches conducted by the present inventors that when iron is employed as a material for the metallic substrate 12, it is possible to most effectively create high-purity nanocarbon by setting the surface temperature of the metallic substrate within the range of 550° C. to 700° C. without increasing the surface temperature thereof to 800° C. or more.

The nanocarbon producing apparatus according to the third embodiment is featured not only in that nanocarbon can be produced by making use of inexpensive iron as a material for the metallic substrate 12 but also in that the nanocarbon product that has been grown to a certain thickness on the surface of metallic substrate 12 is permitted to peel away and fall, due to its own weight, from the surface thereof or permitted to be scraped away by means of the scraping mechanism 24. The nanocarbon 17 that has gravitationally fallen is permitted to pass through a lower portion of the nanocarbon producing apparatus and to discharge from the downstream region of the nanocarbon producing furnace, thus making it possible to continuously manufacture nanocarbon.

(Fourth Embodiment)

A vertical type nanocarbon producing apparatus 10 according to the fourth embodiment of the present invention will be explained with reference to FIG. 2. Herein, the same components as those of FIGS. 1 and 2 are identified by the same reference numbers, thereby omitting the explanation thereof.

In this embodiment, hydrocarbon which may be in the form of a liquid or gas is sprayed from the hydrocarbon injecting nozzle 15 into the nanocarbon producing apparatus. This liquid or gaseous hydrocarbon is sprayed through the hydrocarbon dispersing mesh 16.

In this fourth embodiment, the hydrocarbon to be sprayed to the surface of the metallic substrate 12 installed in the inner wall of the heating vessel is injected, as a liquid or gas, into the nanocarbon producing apparatus 10. The hydrocarbon thus injected is then heated and turned into a gaseous state, thereby enabling the nanocarbon to be uniformly sprayed without lowering the surface temperature of the metallic substrate 12.

The construction of the nanocarbon producing apparatus 10 is fundamentally the same as that shown in FIG. 2. This nanocarbon producing apparatus 10 is designed such that the hydrocarbon injection portion is disposed at an upper portion of the interior of nanocarbon producing apparatus which is kept in a reducing atmosphere, and nanocarbon is enabled to continuously spray into the nanocarbon producing apparatus from the hydrocarbon dispersing mesh 16 attached to the hydrocarbon injecting nozzle 15. In this nanocarbon producing apparatus 10, the hydrocarbon dispersing mesh 16 is lowered in the vicinity of the electric heater 13 disposed in the nanocarbon producing apparatus 10. In this nanocarbon producing apparatus 10, the liquid or gaseous hydrocarbon thus injected is heated by the electric heater 13 disposed in the nanocarbon producing apparatus 10 and turned into a gaseous state, thereby enabling the nanocarbon to be uniformly sprayed without lowering the surface temperature of the metallic substrate 12.

In this case, the nanocarbon producing apparatus is of a vertical type and the surface temperature of the metallic substrate is set in the range (500° C. to 700° C.), which is optimal for the formation of nanocarbon. Further, an upper region of the interior of the nanocarbon producing apparatus is kept in a high-temperature atmosphere on account of an ascending current. To this high-temperature atmosphere, liquid or gaseous hydrocarbon is sprayed and heated to turn it into a gaseous state. This hydrocarbon of gaseous state is uniformly sprayed to the surface of the metallic substrate and enabled the reaction thereof to take place, thus making it possible to efficiently create nanocarbon 17 without lowering the surface temperature of the metallic substrate 12.

In this nanocarbon producing apparatus according to the fourth embodiment, the hydrocarbon dispersing mesh 16 which is connected with the hydrocarbon injecting nozzle 15 is lowered in the vicinity of the electric heater 13 disposed in the nanocarbon producing apparatus 10. As a result, the nanocarbon that will be sprayed to the surface of the metallic substrate is preliminarily heated in the nanocarbon producing apparatus and enabled to be continuously sprayed in a gaseous state to the surface of the metallic substrate. Therefore, the nanocarbon-producing reaction is promoted on the surface of the metallic substrate without lowering the surface temperature of the metallic substrate. As a result, the nanocarbon-forming rate can be accelerated to enhance the nanocarbon-producing efficiency and, at the same time, the surface of the metallic substrate can be maintained at an optimal temperature even if the preset temperature of the electric heater 13 is set to a relatively low level. Additionally, the heating temperature of the nanocarbon producing apparatus 10 can be also lowered, thereby making it possible to continuously and stably create and recover nanocarbon while enhancing the nanocarbon-producing efficiency.

(Fifth Embodiment)

A vertical type nanocarbon producing apparatus according to the fifth embodiment of the present invention will be explained with reference to FIG. 2. Herein, the same components as those of FIGS. 1 and 2 are identified by the same reference numbers, thereby omitting the explanation thereof.

In this embodiment, hydrocarbon which may be in the form of liquid is sprayed from the hydrocarbon injecting nozzle 15 into the nanocarbon producing apparatus. Further, this liquid hydrocarbon is sprayed through the hydrocarbon dispersing mesh 16. The hydrocarbon dispersing mesh 16 is lowered close to the electric heater 13.

The construction of the nanocarbon producing apparatus 10 according to this embodiment is fundamentally the same as that shown in FIG. 2. In this embodiment, a metallic substrate is disposed on a cylindrical inner wall which is mounted concentrically in the nanocarbon producing apparatus provides a reducing atmosphere. The liquid hydrocarbon to be sprayed to the surface of the metallic substrate is not only sprayed in a gaseous state due to the heating thereof but also sprayed in a liquid state and vaporized in the nanocarbon producing apparatus, thereby enabling the reaction of hydrocarbon to take place on the surface of the metallic substrate.

Namely, the hydrocarbon such as ethanol, methanol, bio-ethanol, various kinds of alcohols, hydrocarbon oil such as kerosene, etc. to be sprayed to the surface of the metallic substrate 12 mounted concentrically in the nanocarbon producing apparatus provides a reducing atmosphere is sprayed in a state of liquid and then vaporized in the nanocarbon producing apparatus 10. As a result, the vaporized hydrocarbon is uniformly and continuously sprayed onto the surface of the metallic substrate 12, thereby causing reaction of the vaporized hydrocarbon to take place to produce the nanocarbon 17.

In this nanocarbon producing apparatus according to this embodiment, catalytic particles constituting a substrate functions as a core and the reaction of hydrocarbon thus vaporized is caused to take place on the surface of the metallic substrate 12 under a high temperature condition, thereby enabling the nanocarbon 17 to efficiently form and grow by way of a vapor phase deposition method.

In this nanocarbon producing apparatus according to the fifth embodiment, the hydrocarbon dispersing mesh 16 which is connected with the hydrocarbon injecting nozzle 15 is lowered in the vicinity of the electric heater 13 disposed in the nanocarbon producing apparatus 10. As a result, the nanocarbon such as ethanol, methanol, bio-ethanol, various kinds of alcohols, hydrocarbon oil such as kerosene, etc. that will be sprayed to the surface of the metallic substrate is preliminarily heated in the nanocarbon producing apparatus and enabled to be continuously sprayed in a gaseous state to the surface of the metallic substrate. Therefore, the nanocarbon-producing reaction is promoted on the surface of the metallic substrate without lowering the surface temperature of the metallic substrate. As a result, the nanocarbon-producing rate can be accelerated to enhance the nanocarbon-producing efficiency and, at the same time, the surface of the metallic substrate can be maintained at the range of 550° C. to 700° C. even if the preset temperature of the electric heater 13 is set to a relatively low level. Accordingly, the heating temperature of the nanocarbon producing apparatus 10 can be also lowered, thereby making it possible to continuously and stably create and recover nanocarbon while enhancing the nanocarbon-producing efficiency.

(Sixth Embodiment)

A vertical type nanocarbon producing apparatus according to the sixth embodiment of the present invention will be explained with referende to FIG. 2. Herein, the same components as those of FIGS. 1 and 2 are identified by the same reference numbers, thereby omitting the explanation thereof.

In this embodiment, hydrocarbon which contains an acid component is sprayed from the hydrocarbon injecting nozzle 15 into the nanocarbon producing apparatus. Further, this liquid hydrocarbon containing an acid component is sprayed through the hydrocarbon dispersing mesh 16. The hydrocarbon dispersing mesh 16 is lowered close to the electric heater 13.

The construction of the nanocarbon producing apparatus 10 according to this embodiment is fundamentally the same as that shown in FIG. 2. In the nanocarbon producing apparatus 10 of this embodiment, the liquid hydrocarbon containing an acid component and being sprayed to the surface of the metallic substrate is sprayed in a liquid state into the nanocarbon producing apparatus. As a result, the metallic fine particles are caused to corrode and become liable to be peeled off from the surface of the metallic substrate 12, thereby making it possible to promote the reaction of the hydrocarbon on the surface of the metallic substrate 12.

As for the liquid hydrocarbon containing an acid component, it is possible to employ, for example, a solution of hydrocarbon comprising hydrocarbon selected from ethanol, methanol, bio-ethanol, various kinds of alcohols, hydrocarbon oil such as kerosene, etc. and a very small quantity of an acid such as acetic acid, hydrochloric acid, etc. for making the mixture acidic; or an acidic solution of hydrocarbon such as biomass oil, etc., wherein the liquid hydrocarbon contains a very small quantity of catalytic metal power. The hydrocarbon containing any of these acidic components is sprayed in a liquid state and then vaporized in the nanocarbon producing apparatus, thereby enabling the vaporized hydrocarbon to be uniformly and continuously sprayed onto the surface of the metallic substrate, causing the reaction of vaporized hydrocarbon to take place to form the nanocarbon.

In this nanocarbon producing apparatus 10 according to this embodiment, by making use of catalytic particles constituting the substrate as a core, the reaction of hydrocarbon thus vaporized is caused to take place on the surface of the metallic substrate 12 under a high temperature condition, thereby enabling the nanocarbon 17 to efficiently form and grow by way of a vapor phase deposition method.

In this nanocarbon producing apparatus 10 according to the sixth embodiment, the hydrocarbon dispersing mesh 16 which is connected with the hydrocarbon injecting nozzle 15 is lowered in the vicinity of the electric heater 13 disposed in the nanocarbon producing apparatus 10. As a result, the nanocarbon containing an acid component that will be sprayed to the surface of the metallic substrate is preliminarily heated in the nanocarbon producing apparatus and enabled to be continuously sprayed in a gaseous state to the surface of the metallic substrate. Therefore, the nanocarbon-producing reaction is promoted on the surface of the metallic substrate without lowering the surface temperature of the metallic substrate. As a result, the nanocarbon-producing rate can be accelerated to enhance the nanocarbon-producing efficiency and, at the same time, the surface of the metallic substrate can be maintained at the range of 550° C. to 700° C. even if the preset temperature of the electric heater 13 is set to a relatively low level. Accordingly, the heating temperature of the nanocarbon producing apparatus 10 can be also lowered, thereby making it possible to continuously and stably create and recover nanocarbon while enhancing the nanocarbon-producing efficiency.

(Seventh Embodiment)

Figure 3:
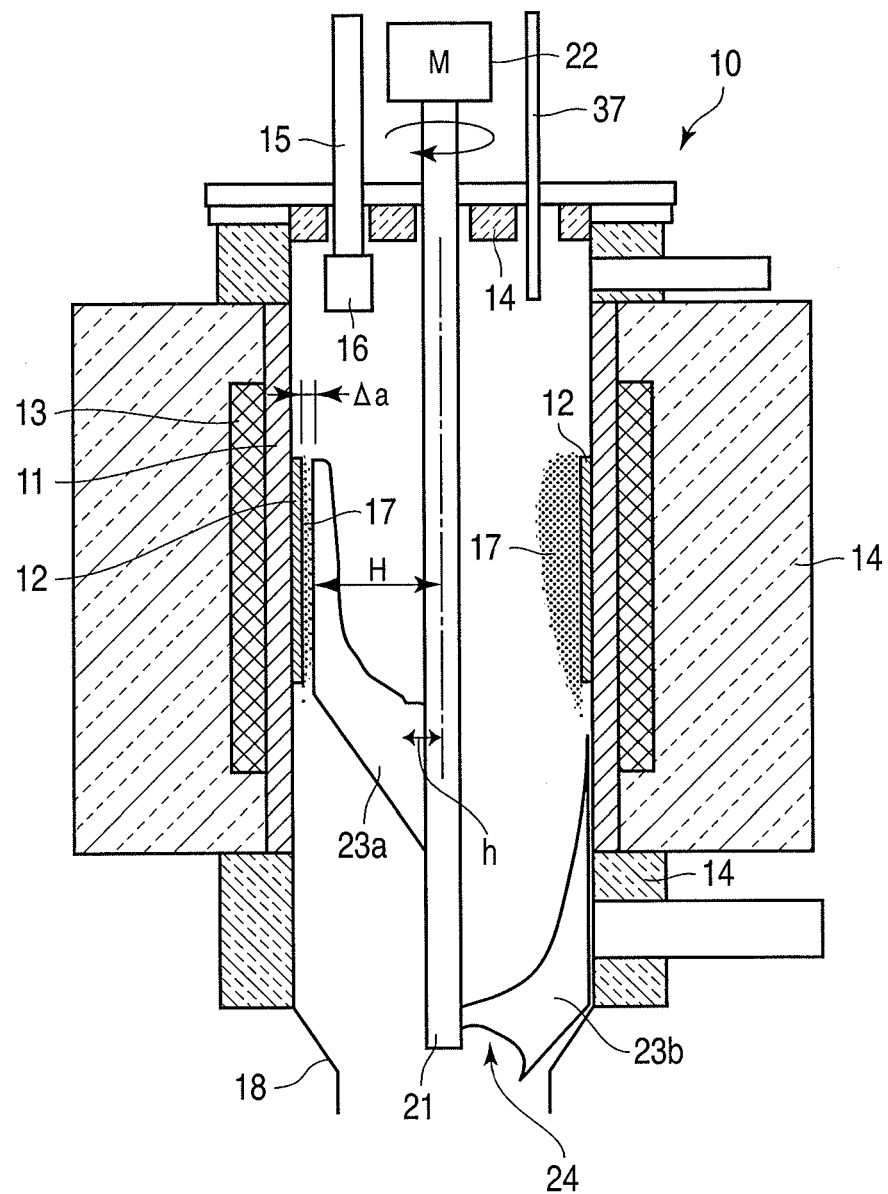
FIG. 3 is a schematic cross-sectional view of a nanocarbon producing apparatus according to the second, the seventh, the eighth, and the ninth embodiment of the present invention.

FIG. 3 shows schematically a vertical type nanocarbon producing apparatus according to the seventh embodiment of the present invention. Herein, the same components as those of FIGS. 1 and 2 are identified by the same reference numbers, thereby omitting the explanation thereof.

The reference number 37 in FIG. 3 represents a hydrogen injecting nozzle for continuously injecting hydrogen into the nanocarbon producing apparatus and is disposed close to the hydrocarbon injecting nozzle 15.

The nanocarbon producing apparatus 10 according to this embodiment is featured in that hydrocarbon to be sprayed to the surface of the metallic substrate 12 disposed in the nanocarbon producing apparatus 10 keeping a reducing atmosphere is sprayed from the hydrocarbon injecting nozzle 15 and, at the same time, hydrogen is also sprayed from the hydrogen injecting nozzle 37, thereby activating the surface of the metallic substrate.

The hydrocarbon injecting nozzle 15 and the hydrogen injecting nozzle 37 may be positioned higher than the metallic substrate 12 which is disposed on the inner cylindrical wall of nanocarbon producing apparatus though the positioning thereof may be changed depending on the configuration of the nanocarbon producing apparatus 10. Even if hydrocarbon and hydrogen are individually injected into the nanocarbon producing apparatus 10, the positioning thereof should be made adjustable so as to optimize the growth of nanocarbon on the metallic substrate 12 which is disposed on the inner wall of the heating vessel placed in the nanocarbon producing apparatus 10 through the reaction of the hydrocarbon and hydrogen sprayed from an upper portion of the nanocarbon producing apparatus 10.

According to the nanocarbon producing apparatus 10 of this seventh embodiment, the catalytic particles constituting the metallic substrate 12 acts as a core and hence not only the hydrocarbon but also the hydrogen is sprayed and enabled to react at a high temperature condition. As a result, as compared with the case where only hydrocarbon is sprayed and reacted at high temperatures, nanocarbon 17 is enabled in this case to form and grow more efficiently by way of a vapor phase deposition method. Since the surface of the metallic substrate is uniformly heated and, at the same time, since the hydrocarbon and hydrogen are uniformly sprayed, it is possible to enable the nanocarbon 17 to produce and grow uniformly without being uneven on the surface of the metallic substrate. In this manner, the nanocarbon 17 can be continuously manufactured.

(Eighth Embodiment)

A vertical type nanocarbon producing apparatus according to the eighth embodiment of the present invention will be explained with reference to FIG. 3. Herein, the same components as those of FIGS. 1 and 2 are identified by the same reference numbers, thereby omitting the explanation thereof.

This embodiment differs from the seventh embodiment in that a steam injecting nozzle is employed in place of the hydrogen injecting nozzle 37. Namely, steam is continuously injected into the nanocarbon producing apparatus 10 by means of the steam injecting nozzle. This steam injecting nozzle is disposed close to the hydrocarbon injecting nozzle 15.

The nanocarbon producing apparatus 10 according to this embodiment is featured in that hydrocarbon to be sprayed to the surface of the metallic substrate 12 disposed in the nanocarbon producing apparatus 10 keeping a reducing atmosphere is sprayed from the hydrocarbon injecting nozzle 15 and, at the same time, steam is also sprayed from the steam injecting nozzle, thereby activating the surface of the metallic substrate.

In this embodiment, the hydrocarbon injecting nozzle 15 and the steam injecting nozzle may be positioned higher than the metallic substrate 12 which is disposed on the inner cylindrical wall of nanocarbon producing apparatus though the positioning thereof may be changed depending on the configuration of the nanocarbon producing apparatus. Even if hydrocarbon and steam are individually injected into the nanocarbon producing apparatus, the positioning thereof should be made adjustable so as to optimize the growth of nanocarbon on the metallic substrate 12 which is disposed on the inner wall of the heating vessel placed in the nanocarbon producing apparatus 10 through the reaction of the hydrocarbon and steam sprayed from an upper portion of the nanocarbon producing apparatus 10. Further, the steam injecting nozzle may be designed such that while it is capable of continuously and uniformly spraying steam, it can be switched so as to inject hydrogen in place of steam.

According to the nanocarbon producing apparatus 10 of this eighth embodiment, the catalytic particles constituting the metallic substrate 12 act as a core and hence not only the hydrocarbon but also the steam is sprayed and enabled to react at a high temperature condition. As a result, as compared with the case where only hydrocarbon is sprayed and reacted at high temperatures, nanocarbon 17 is enabled in this case to form and grow more efficiently by way of a vapor phase deposition method. Since the surface of metallic substrate is uniformly heated and, at the same time, since the hydrocarbon and hydrogen are uniformly sprayed, it is possible to enable the nanocarbon 17 to form and grow uniformly without being uneven on the surface of metallic substrate. In this manner, the nanocarbon 17 can be continuously manufactured.

(Ninth Embodiment)

The vertical type nanocarbon producing apparatus according to the ninth embodiment of the present invention is fundamentally the same in construction as the nanocarbon producing apparatus shown in FIG. 2. Therefore, this nanocarbon producing apparatus will be explained with reference to FIG. 2. Herein, the same components as those of FIGS. 1 and 2 are identified by the same reference numbers, thereby omitting the explanation thereof.

As shown in FIG. 3, the nanocarbon producing apparatus 10 according to the ninth embodiment is featured in that a spacing distance $\Delta a$ between the surface of the metallic substrate 12 and the edge of scraper blade 23$a$ constituting one of the components of the scraping mechanism 24 is capable of adjusting.

As described above, the scraping mechanism 24 is designed so as not to directly contact with the surface of the metallic substrate 12 disposed in the nanocarbon producing apparatus 10 but to scrape away only the nanocarbon 17 that has been grown from the surface of the metallic substrate 12. Namely, the scraper blade 23$a$ of the scraping mechanism 24 is not contacted with the surface of the metallic substrate 12 but is enabled to scrape away only the nanocarbon 17 that has been grown from the surface of the metallic substrate 12. Otherwise, the metallic fine particles of the metallic substrate 12 may be also scraped away and permitted to mix with the grown nanocarbon 17, thereby lowering the purity of the nanocarbon 17. Additionally, since the metal constituting the surface of the metallic substrate 12 is scraped away, it may lead to the lowering of the rate of continuously forming the nanocarbon 17, thus lowering the efficiency of forming the nanocarbon 17.

As for the mechanism of adjusting the spacing distance $\Delta a$ between the surface of the metallic substrate 12 and the edge of scraper blade 23$a$ constituting one of the components of the scraping mechanism 24, various structures and systems are conceivable as shown below.

1) In conformity with the structure to uniformly scrape the inner wall of the heating vessel 11, the proximal end portion of the scraper blade 23a is secured to the rotational driving shaft 21 by means of a screw, wherein the fine adjustment of the length H of the arm (a distance between the axial center of the rotational driving shaft 21 and the edge of the scraper blade 23a) can be performed by the rotation of the screw.

2) A scraper blade-fixing jig is mounted on the rotational driving shaft 21—facing side of the scraper blade 23a of the scraping mechanism 24, wherein the fine adjustment of the length "H" of the arm can be performed by adjusting the mounting height "h" of the fixing jig. Incidentally, although the fixing jig is not shown in FIG. 3, the scraper blade is secured, by means of the fixing jig, to the rotational driving shaft 21, wherein the fixing jig is made movable in the direction of right and left in the drawing, thereby making it possible to finely adjust the mounting height "h" of the fixing jig by means of the screw.

3) A method of finely adjusting the length H of arm through the fine adjustment of the angle of the arm of scraper blade 23a.

4) A method of finely adjusting the spacing distance Δa between the surface of the metallic substrate 12 and a scraper rod through the fine adjustment of the angle of the distal end portion of scraper blade 23a.

According to the nanocarbon producing apparatus of the ninth embodiment, even when the nanocarbon 17 fails to peel off and to gravitationally drop from the surface of metallic substrate 12 after nanocarbon has been grown to a predetermined thickness on the surface of metallic substrate 12, the nanocarbon 17 can be made to drop, at periodic intervals, to a region below the nanocarbon producing apparatus 10, thereby making it possible to steadily discharge the nanocarbon product from the downstream side of the nanocarbon producing apparatus 10, thus making it possible to continuously manufacture nanocarbon.

Further, in this embodiment, the scraper blade 23b is secured to a lower portion of the rotational driving shaft 21 of scraping mechanism 24 (or below a portion of the heating vessel 11 where the metallic substrate 12 is disposed) for preventing the generation of deposition/bridge of the nanocarbon product that falls down. Due to the provision of the scraper blade 23b, it is possible, through the rotation of the rotational driving shaft 21, to scrape the surface of a lower portion of the nanocarbon producing apparatus 10 which is located close to the nanocarbon product discharge nozzle 18 and where a bridge of falling nanocarbon product is more likely to be formed. As a result, it is now possible to effectively prevent the bridge from being formed by the discharging nanocarbon product while enabling to realize the scraping and falling of the nanocarbon product.

Incidentally, the nanocarbon producing apparatus described above is of a vertical system and the metallic substrate is adhered to the inner wall of the heating vessel mounted in the nanocarbon producing apparatus provides a reducing atmosphere and being heated by means of an electric heater. However, it is also possible to utilize the hot air obtained from the waste heat generated from installations or plants, thereby improving the efficiency of the nanocarbon producing apparatus as a whole or the efficiency of the system as a whole.

(Tenth Embodiment)

Figure 4:
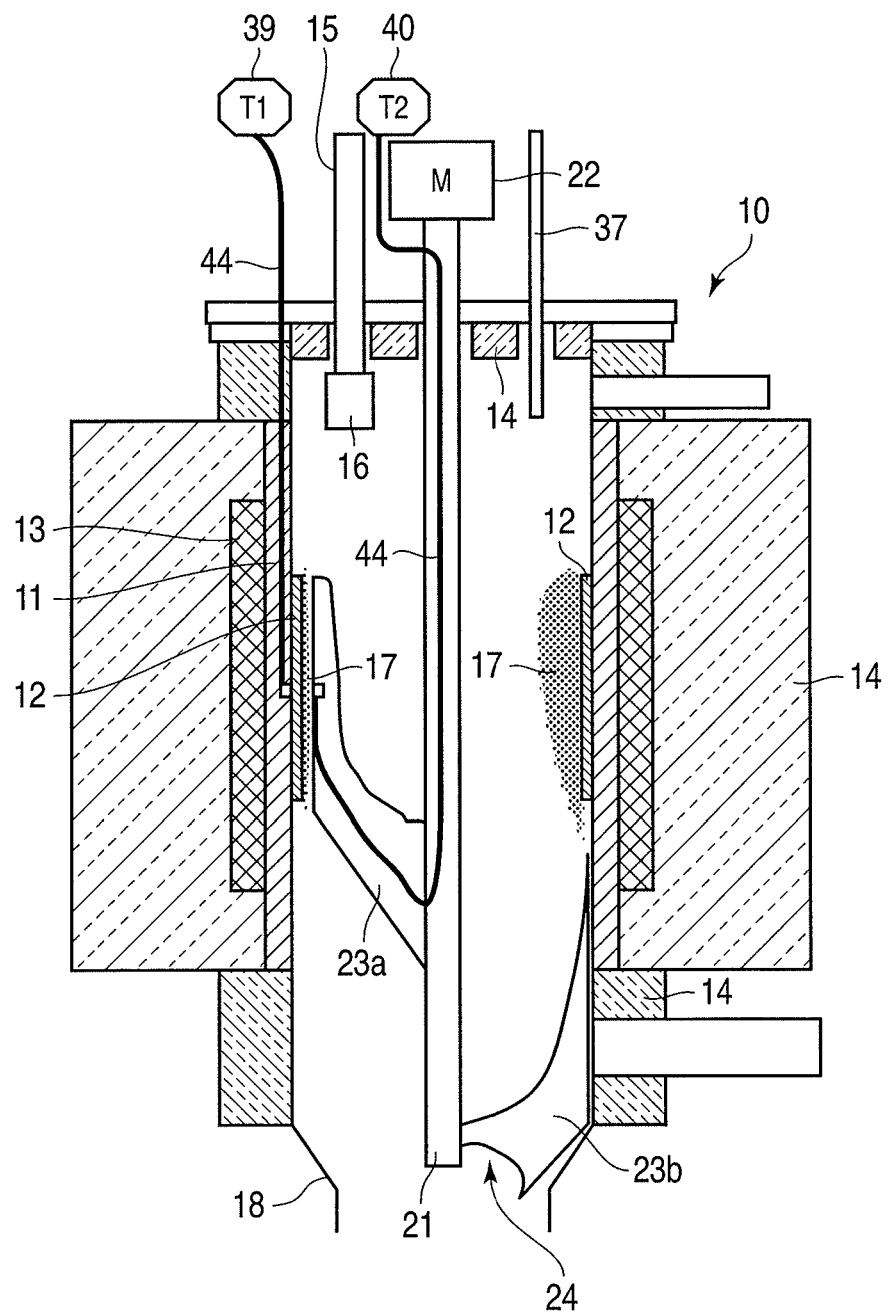
FIG. 4 is a schematic cross-sectional view of a nanocarbon producing apparatus according to the tenth embodiment of the present invention.
Figure 6:
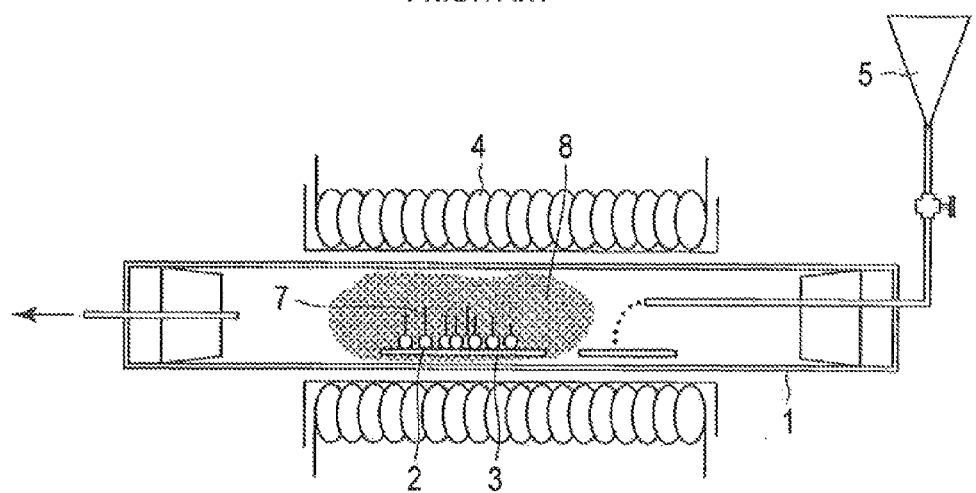
FIG. 6 is a diagram for illustrating the manufacturing method of nanocarbon according to the conventional CVD method.
Figure 7:
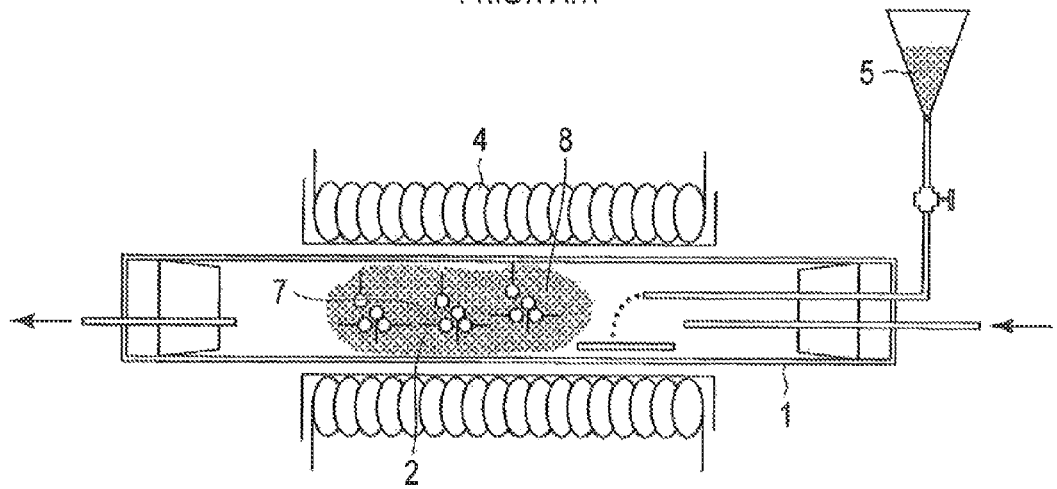
FIG. 7 is a diagram for illustrating the manufacturing method of nanocarbon according to the conventional substrate method.

FIG. 4 shows schematically a vertical type nanocarbon producing apparatus according to the tenth embodiment of the present invention. Herein, the same components as those of FIGS. 1 to 3 are identified by the same reference numbers, thereby omitting the explanation thereof.

The reference number 39 in FIG. 4 represents a first surface thermometer for measuring the surface temperature $T_1$ of the metallic substrate 12 disposed in the nanocarbon producing apparatus 10, and the reference number 40 represents a second surface thermometer for measuring the surface temperature $T_2$ of the edge portion of scraper blade 23a constituting one of the components of the scraping mechanism 24. Incidentally, the reference number 44 in FIG. 4 represents a thermocouple. The nanocarbon producing apparatus 10 shown in FIG. 4 is featured in that it is possible to accurately set the surface temperature of the metallic substrate 12 disposed in the nanocarbon producing apparatus to the range of 550° C. to 700° C. by means of these surface thermometers 39 and 40 under the condition wherein hydrocarbon is being continuously and uniformly sprayed to the surface of the metallic substrate 12.

It is important that the inner wall of the heating vessel 11 disposed in the nanocarbon producing apparatus 10 is uniformly heated and the temperature thereof constantly kept at an optimum temperature for the formation of nanocarbon. For the purpose of realizing this, the measurement of only the outer heating temperature of the nanocarbon producing apparatus 10 is insufficient. Namely, it is important to accurately measure the surface temperature of the metallic substrate 12 disposed in the nanocarbon producing apparatus 10, thereby strictly controlling the outer heating temperature of the nanocarbon producing apparatus 10. If the surface temperature of the metallic substrate 12 disposed in the nanocarbon producing apparatus 10 is lower than 550° C. under the condition wherein hydrocarbon is being continuously and uniformly sprayed to the surface temperature of the metallic substrate 12, nanocarbon can be hardly formed. On the other hand, if the surface temperature of the metallic substrate 12 is higher than 700° C., the soot of carbon is caused to generate, thereby making it difficult to form the nanocarbon. For this reason, it is critically important for the purpose of enhancing the efficiency of forming nanocarbon as well as for the purpose of enhancing the purity of nanocarbon to accurately set the surface temperature of the metallic substrate 12 disposed in the nanocarbon producing apparatus 10 in the range of 550° C. to 700° C. under the condition wherein hydrocarbon is being continuously and uniformly sprayed to the surface of the metallic substrate 12. Namely, the efficiency of forming nanocarbon as well as the purity of nanocarbon can be enhanced by accurately measuring the surface temperature of the metallic substrate 12 disposed in the nanocarbon producing apparatus 10 and, based on this measurement, by strictly controlling the outer heating temperature of the nanocarbon producing apparatus 10. By doing so, it is possible to continuously manufacture nanocarbon which is excellent in quality and high in purity.

The nanocarbon producing apparatus according to the tenth embodiment is equipped with the first surface thermometer 39 for measuring the surface temperature $T_1$ of the metallic substrate 12 disposed in the nanocarbon producing apparatus 10 and with the second surface thermometer 40 for measuring the surface temperature $T_2$ of the edge portion of scraper blade 23a constituting one of the components of the scraping mechanism 24. Due to the provision of these surface thermometers, the surface temperature of the metallic substrate 12 disposed in the nanocarbon producing apparatus 10 can be accurately measured and the outer heating temperature of the nanocarbon producing apparatus 10 can be strictly controlled, thereby making it possible to enhance the efficiency of producing nanocarbon as well as the purity of nanocarbon. Accordingly, it is possible to continuously manufacture nanocarbon which is excellent in quality and high in purity.

(Eleventh Embodiment)

FIG. 5 shows schematically a vertical type nanocarbon producing apparatus according to the eleventh embodiment of the present invention. Herein, the same components as those of FIGS. 1 and 2 are identified by the same reference numbers, thereby omitting the explanation thereof.

The reference numbers 41 and 42 in FIG. 5 represents, respectively, an upper damper and a lower damper, both of which are disposed below the nanocarbon product discharging nozzle 18. A nanocarbon recovery vessel 43 is disposed below the lower damper 42.

The movement of these upper and lower dampers is as explained below. First of all, the upper damper 41 and the lower damper 42 are entirely closed. Then, the upper damper 41 is opened to thereby accumulate nanocarbon product in a space between the upper damper 41 and the lower damper 42. Subsequently, the upper damper 41 is entirely closed and then the lower damper 42 is opened. As a result, the nanocarbon product can be recovered under the condition where the interior of the nanocarbon producing apparatus 10 is separated from the nanocarbon recovery vessel 43. Further, in order to prevent the air inside the nanocarbon recovery vessel 43 from entering into the nanocarbon producing apparatus 10, an inert gas may be intermittently injected into a space between the upper damper 41 and the lower damper 42. The layout and the operation thereof may be performed as described above, thereby making it possible to steadily discharge the nanocarbon product.

The nanocarbon producing apparatus according to the eleventh embodiment is equipped not only with the upper damper 41 and the lower damper 42 at a region below the nanocarbon product discharging nozzle 18 but also with the nanocarbon recovery vessel 43 at a region below the lower damper 42. As a result, it is possible to obtain the nanocarbon producing apparatus 10 which is capable of stably and steadily performing the discharge of nanocarbon product.

Although the mounting of a rotary valve is omitted in FIG. 5, a rotary valve may be mounted above or below a double damper comprising the upper and the lower dampers (the upper damper 41 and the lower damper 42).

Further, a reducing atmosphere in the interior of the nanocarbon producing apparatus is required to be kept during the operation thereof, thus a sealing structure for sufficiently securing the air-tightness against the external atmosphere should be, of course, taken into account. Furthermore, it is also possible, through the provision of a rotary valve below the nanocarbon producing apparatus, to stably discharge the nanocarbon product that has been dropped to a region below the nanocarbon producing apparatus. In this case also, in order to enhance the sealing performance against the external atmosphere, a double damper comprising the upper and the lower dampers (the upper damper 41 and the lower damper 42) may be disposed below the nanocarbon producing apparatus and a nanocarbon recovery vessel may be disposed below the double damper.

(Twelfth Embodiment)

The vertical type nanocarbon producing apparatus according to the twelfth embodiment of the present invention is fundamentally the same in construction as the nanocarbon producing apparatus shown in FIG. 5. Therefore, this nanocarbon producing apparatus will be explained with reference to FIG. 5. Herein, the same components as those of FIGS. 1, 2 and 5 are identified by the same reference numbers, thereby omitting the explanation thereof.

This twelfth embodiment is featured in that a high-purity iron plate (not less than 99.5% in purity) or a carbon steel containing iron is employed for forming the metallic substrate 12.

According to the nanocarbon producing apparatus of this twelfth embodiment, due to the employment of the high-purity iron plate or the carbon steel containing iron for forming the metallic substrate 12, it is possible to produce high-quality nanocarbon at low cost and easily. Further, since the product specification of the high-purity iron plate or of the carbon steel containing iron is standardized, high-quality nanocarbon always exhibiting stabilized purity and high stability can be easily and efficiently mass-produced at low cost.

Incidentally, when this nanocarbon producing apparatus is provided with the aforementioned scraper mechanism, even when the nanocarbon 17 fails to peel off and to gravitationally drop from the surface of metallic substrate 12 after nanocarbon has been grown to a predetermined thickness on the surface of metallic substrate 12, the nanocarbon 17 can be made to drop, at periodic intervals, to a region below the nanocarbon producing apparatus 10, thereby making it possible to steadily discharge the nanocarbon product from the downstream side of the nanocarbon producing apparatus 10, thus making it possible to continuously manufacture nanocarbon.

As explained above, the nanocarbon such as carbon nanotube that has peeled off and gravitationally dropped from the metallic substrate after it has been grown to a predetermined thickness on the surface of metallic substrate 12 can be permitted to fall below the nanocarbon producing apparatus, thus making it possible to continuously manufacture nanocarbon. Further, the nanocarbon that has failed to peel off and to gravitationally drop from the surface of metallic substrate 12 after the nanocarbon has been grown to a predetermined thickness on the surface of metallic substrate can be made to drop, at periodic intervals, to a region below the nanocarbon producing apparatus 10, thereby making it possible to steadily discharge the nanocarbon product from the downstream side of the nanocarbon producing apparatus. As a result, it is possible to continuously produce nanocarbon, thus enabling to obtain high-quality nanocarbon exhibiting high purity and high stability can be easily and efficiently mass-produced at low cost.

(Thirteenth Embodiment)

The vertical type nanocarbon producing apparatus according to the thirteenth embodiment of the present invention will be explained with reference to FIG. 1. Herein, the same components as those of FIG. 1 are identified by the same reference numbers, thereby omitting the explanation thereof.

In the present invention, there is disposed a hydrocarbon/catalyst mixing and spraying nozzle which is capable of mixing and spraying hydrocarbon and a minute quantity of metallic catalyst powder into the heating vessel 11 from the upstream side of the heating vessel 11. This nozzle is substituted for the hydrocarbon nozzle 15 shown in FIG. 1. From this nozzle, hydrocarbon mixed with metallic catalyst powder is injected. Since this hydrocarbon to be injected is preliminarily mixed with a minute quantity of metallic catalyst powder, the metallic substrate 12 is no longer required to be always provided with the function of metallic catalyst. As compared with the quantity of hydrocarbon, the amount of the metallic catalyst powder to be intermingled into the hydrocarbon may be such a small level that is enough to enable the metallic catalyst powder to act as a core for the production of nanocarbon. On the occasion of mixing metallic catalyst powder with hydrocarbon which is in a state of liquid, a very small amount of metallic catalyst powder is poured into a liquid hydrocarbon and then agitated. By doing so, the metallic catalyst powder which has been injected into the liquid hydrocarbon can be sufficiently uniformly dispersed therein.

With respect to the quantity of the metallic catalyst powder to be mixed with hydrocarbon, the ratio of the metallic catalyst powder to the hydrocarbon may be confined to a level as low as 1/100,000-1/10,000,000 or so. Especially, when the hydrocarbon is a liquid, it is only required to pour a very small quantity of the metallic catalyst powder into a vessel of hydrocarbon and to uniformly agitate the resultant mixture. Incidentally, when the quantity of the metallic catalyst powder to be incorporated is made larger, it may be possible to increase the rate of forming nanocarbon. In this case however, the ratio of metallic catalyst powder to be contained in the nanocarbon product will be increased, thereby raising the problem that the purity of the nanocarbon may be locally lowered. For this reason, it is important to determine an optimum ratio of metallic catalyst powder for the production of high-purity nanocarbon containing almost no metallic catalyst powder through the lowering in quantity of the metallic catalyst powder to be incorporated while taking into consideration the combination of the kind of hydrocarbon raw material and the kind of metallic catalyst powder to be incorporated.

Because of the incorporation of metallic catalyst powder in this manner, the material of the cylindrical metallic substrate 12 disposed on the inner wall of the heating vessel 11 is no longer required to have, in itself, a catalytic function. Namely, the material of the cylindrical metallic substrate 12 is only required to have a sufficient heat resistance and, more or less, a smooth surface, thus making the metallic substrate 12 free from thermal deformation. It is possible in this case to produce nanocarbon by simply feeding hydrocarbon mixed with the metallic catalyst powder.

A hydrocarbon/catalyst mixing and spraying nozzle for spraying a mixture of hydrocarbon mixed with metallic catalyst powder into the heating vessel 11 is disposed at an upper portion (upstream side) of the heating vessel 11. A mesh for dispersing this metallic catalyst powder mixed hydrocarbon is attached to a distal end portion of the hydrocarbon/catalyst mixing and spraying nozzle. From this mesh, hydrocarbon mixed with metallic catalyst powder is sprayed into the heating vessel. This mesh is employed in place of the hydrocarbon nozzle 16 shown in FIG. 1.

Next, the operation of the nanocarbon producing apparatus 10 constructed as described above will be explained.

First of all, by making use of the hydrocarbon/catalyst mixing and spraying nozzle, hydrocarbon mixed with a metallic catalyst powder is continuously or intermittently sprayed from the metallic powder/hydrocarbon mixing and dispersing mesh. As a result, the reaction of hydrocarbon is caused to take place on the metallic substrate 12 which has been disposed in contact with the inner surface of this heating vessel 11 of the nanocarbon producing apparatus 10 or take place the inner surface of the heating vessel 11, thereby enabling the nanocarbon 17 to grow. Namely, the reaction of the hydrocarbon that has been mixed with metallic catalyst powder and sprayed at an upper portion of the nanocarbon producing apparatus 10 is permitted to take place on the metallic substrate 12 which has been disposed on the inner surface of heating vessel 11 of the nanocarbon producing apparatus 10 or take place on the inner surface of the heating vessel, resulting in the growth of the nanocarbon 17.

Due to its own weight, the nanocarbon product 17 that has been grown on the surface of cylindrical vessel constituting the inner surface of the heating vessel 11 or on the surface of the metallic substrate 12 is caused to peel off and scatter to the downstream side of the apparatus from the surface of the inner surface of the heating vessel 11 or from the surface of metallic substrate 12, thereby enabling the nanocarbon 17' that has been peeled and scattered to gravitationally drop. An explanation of the microscopic mechanism in the production of nanocarbon follows. Namely, the hydrocarbon is caused to react with metallic fine particles in the heating vessel 11 at an optimum temperature to create and grow the nanocarbon 17. Concurrently, as the nanocarbon grows, the metallic fine particles reacted are caused to peel off and slightly separate from the surface of the metallic substrate 12. Then, to the metallic fine particles thus separated, nanocarbon is additionally precipitated and permitted to grow. By repeating these phenomena, the nanocarbon is acceleratingly formed and grown, thereby making it possible to synthesize highly pure nanocarbon in large quantities.

Since the nanocarbon is synthesized in large quantities within a short period of time, a block of the nanocarbon that has been grown to more than a predetermined thickness on the surface of the cylindrical vessel constituting the inner surface of the heating vessel 11 or on the surface of the metallic substrate 12 is caused to peel off and, due to its own weight, gravitationally drop from the metallic substrate. Additionally, nanocarbon is enabled to grow from the metallic fine particles existing in the heating vessel 11 and to gravitationally drop from the metallic fine particles. On this occasion, the quantity of the metallic fine particles to be peeled off from the metallic substrate 12 or to be contained in the nanocarbon is very small. Therefore, the metallic fine particles and the metallic catalyst powder in the sprayed metallic catalyst powder-mixed hydrocarbon functions as a core, thereby making it possible to continuously repeat the production and growth of nanocarbon through the reaction between the metallic fine particles and the hydrocarbon. In this manner, the metallic catalyst powder-mixed hydrocarbon is continuously sprayed, through the metallic catalyst powder-mixed hydrocarbon-dispersing mesh, from the hydrocarbon/catalyst mixture-spray nozzle which is disposed at an upper portion of the nanocarbon-producing apparatus 10. Namely, the reaction of hydrocarbon can be repeated in the nanocarbon-producting apparatus and on the surface of metallic substrate which is disposed on the cylindrical inner wall of the apparatus, thereby making it possible to continuously and repeatedly produce and grow the nanocarbon.

Namely, catalytic particles constituting the metallic catalyst powder functions as a core and the metallic catalyst powder-mixed hydrocarbon thus sprayed is caused to take place under a high temperature condition in the nanocarbon producing apparatus 10, on the cylindrical vessel constituting the inner surface of the heating vessel 11 and on the surface of the metallic substrate, thereby enabling nanocarbon to produce and grow by way of a vapor phase deposition method. Since the surface of the substrate is uniformly heated and, at the same time, hydrocarbon, nanocarbon is uniformly sprayed, it is possible to uniformly produce and grow nanocarbon without being uneven on the surface of the substrate. As a result, nanocarbon can be continuously and stably manufactured by simply feeding a metallic catalyst powder-mixed hydrocarbon without requiring the employment of a special kind of metallic substrate.

As describe above, the nanocarbon producing apparatus according to the thirteenth embodiment comprises: the heating vessel 11; the electric heater 13 disposed on an outer circumference of the heating vessel 11; the metallic catalyst powder-mixed hydrocarbon spraying nozzle 15 disposed on an upstream side of the heating vessel 11 for spraying the metallic catalyst powder-mixed hydrocarbon into the heating vessel 11; and the nanocarbon product discharge nozzle 18 disposed on a downstream side of the heating vessel 11. In this case, the metallic catalyst powder-mixed hydrocarbon is continuously sprayed from the metallic catalyst powder-mixed hydrocarbon nozzle into the heating vessel 11, thereby enabling a reaction and the growth of nanocarbon to take place in the heating vessel 11, the resultant nanocarbon product being subsequently discharged from the nanocarbon product discharge nozzle 18. Therefore, it is possible to effectively mass-produce high-quality nanocarbon which is high in purity and stability at a low cost.

Incidentally, in this thirteenth embodiment, although an electric heater is employed as a heating source, it is also possible to utilize the hot air obtained from the waste heat generated from installations or plants, thereby improving the efficiency of the nanocarbon producing apparatus as a whole or the efficiency of the system as a whole.

Further, in order to optimize the flow rate of hydrocarbon being sprayed from the hydrocarbon injecting nozzle for the formation of nanocarbon, a flow meter and a flow rate-controlling valve may be optionally attached to a hydrocarbon supply pipe which is connected with a hydrocarbon header, thereby making it possible to control the spray rate of hydrocarbon.

According to the present invention, it is possible to effectively and cheaply mass-produce fibrous carbon nanotube which is highly useful such as high-purity/high stability carbon nanotube, high-purity/high stability carbon fiber, high-purity/high stability carbon nanocoil, etc. Moreover, by operating the nanocarbon producing apparatus under fixed conditions, nanocarbon can be continuously produced almost semi-permanently, thereby making it possible to provide a nanocarbon manufacturing furnace which is capable of supplying nanocarbon in large quantities.

(Fourteenth Embodiment)

Figure 8:
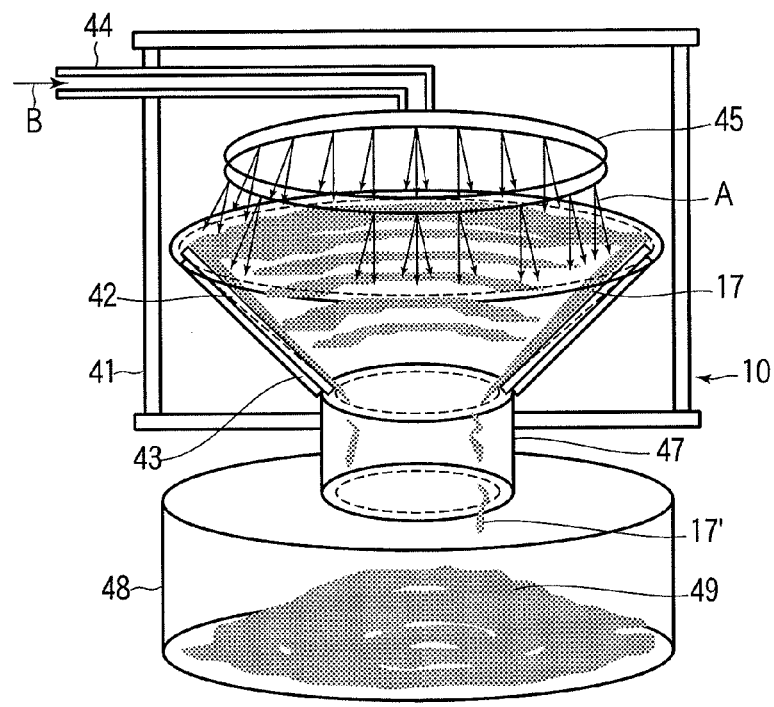
FIG. 8 is a diagram schematically illustrating a nanocarbon producing apparatus according to the fourteenth, the eighteenth, the nineteenth and the twentieth embodiment of the present invention.

FIG. 8 shows schematically a vertical type nanocarbon producing apparatus according to the fourteenth embodiment of the present invention. Herein, the same components as those of FIG. 1 are identified by the same reference numbers, thereby omitting the explanation thereof.

The reference number 41 in FIG. 8 represents a Vertical heating vessel which provides a reducing atmosphere therein. A cone-shaped plate 42 is placed concentrically with the heating vessel 41, thus presenting an inclined surface relative to the wall of the heating vessel 41. Further, an electric heater 43 as a heating source for heating the cone-shaped plate is disposed in contact with the outer wall of the cone-shaped plate 42, thereby enabling the cone-shaped plate 42 to be heated by the electric heater 43. On the upper side (upstream side) of the heating vessel 41 is disposed a spray nozzle 44 for continuously or intermittently injecting a metallic catalyst powder-mixed hydrocarbon (a raw material+a catalyst) into the heating vessel 41. To this spray nozzle 44 is connected a supply header 45 for supplying the metallic catalyst powder-mixed hydrocarbon. Namely, it is designed that the metallic catalyst powder mixed-hydrocarbon can be uniformly sprayed, as indicated by the arrow "A", from the supply header 45 to the surface of the cone-shaped plate 42 in a continuous or intermittent manner.

A cone-shaped metallic substrate may be disposed in contact with the inner surface of the cone-shaped plate 42. By doing so, it is possible to provide the cone-shaped plate 42 with a catalytic function. In this invention however, the spray nozzle 44 for mixing and spraying hydrocarbon and a small quantity of metallic catalyst powder into the heating vessel 41 is disposed on the upstream side of the heating vessel 41. By making use of this spray nozzle 44, a metallic catalyst powder-mixed hydrocarbon is injected or sprayed. In this metallic catalyst powder-mixed hydrocarbon to be sprayed, there is contained a very small quantity of metallic catalyst powder. Therefore, the cone-shaped plate 42 is no longer required to be always provided with the function of a metallic catalyst. The amount of the metallic catalyst powder to be intermingled into the metallic catalyst powder-mixed hydrocarbon may be such a small level that is enough to enable the metallic catalyst powder to act as a core for the formation of nanocarbon. The quantity of the metallic catalyst powder is confined to a very small level as compared the hydrocarbon, so that when the hydrocarbon is in a state of liquid, a very small amount of metallic catalyst powder is poured into the liquid hydrocarbon and then agitated. By doing so, the metallic catalyst powder which has been injected into the liquid hydrocarbon can be sufficiently uniformly dispersed therein.

With respect to the quantity of the metallic catalyst powder to be mixed with hydrocarbon, the ratio of the metallic catalyst powder to the hydrocarbon may be confined to a level as low as 1/100,000-1/10,000,000 or so. Especially when the hydrocarbon is a liquid, it is only required to pour a very small quantity of the metallic catalyst powder into a vessel of hydrocarbon and to uniformly agitate the resultant mixture. Incidentally, when the quantity of the metallic catalyst powder to be incorporated is made larger, it may be possible to increase the rate of producing nanocarbon. In this case however, the ratio of metallic catalyst powder to be contained in the nanocarbon product will be increased, thereby raising the problem that the purity of the nanocarbon may be locally lowered. For this reason, it is important to determine an optimum ratio of metallic catalyst powder for the formation of high-purity nanocarbon containing almost no metallic catalyst powder through the lowering in quantity of the metallic catalyst powder to be incorporated while taking into consideration the combination of the kind of hydrocarbon raw material and the kind of metallic catalyst powder to be incorporated.

Because of the incorporation of metallic catalyst powder in this manner, the material of the cone-shaped plate 42 is no longer required to have, in itself, a catalytic function. Namely, the material of the cone-shaped plate 42 is only required to have a sufficient heat resistance and, more or less, a smooth surface, thus making the metallic substrate 12 free from thermal deformation. Namely, it is possible in this case to stably produce nanocarbon by simply feeding hydrocarbon mixed with the metallic catalyst powder.

A nanocarbon discharge nozzle (hereinafter referred to simply as a discharge nozzle) 47 for discharging the nanocarbon 17' that has been formed on and peeled from the cone-shaped plate 42 is disposed at a lower portion (downstream side) of the cone-shaped plate 42. A nanocarbon container 48 for accommodating the nanocarbon 17' that has been peeled away is disposed below the discharge nozzle 47. Incidentally, the reference number 49 in FIG. 8 represents the nanocarbon product that has been recovered.

Next, the operation of the nanocarbon producing apparatus 10 constructed as described above will be explained.

First of all, a metallic catalyst powder mixed hydrocarbon "B" is continuously or intermittently sprayed, via the supply header 45, from the spray nozzle 44 which is disposed on the upstream side of the nanocarbon producing apparatus 10. As a result, the reaction of hydrocarbon is caused to take place on the cone-shaped plate 42 which is disposed in the heating vessel 41, thereby enabling the nanocarbon 17 to grow. Namely, the metallic catalyst powder mixed hydrocarbon that has been sprayed over the heating vessel 41 is reacted on the surface of the cone-shaped plate 42 disposed in the heating vessel 41, resulting in the growth of the nanocarbon 17.

Due to its own weight, the nanocarbon product 17 that has been grown over an upper inner surface of the heating vessel 41 or on the cone-shaped plate 42 which is disposed in the heating vessel is caused to peel off from the inner surface of the cone-shaped plate 42 and scatter toward the downstream side of the cone-shaped plate 42, thereby enabling the nanocarbon 17' that has been peeled and scattered to gravitationally drop. With respect to the microscopic mechanism in the formation of nanocarbon, it can be explained as follows. Namely, the hydrocarbon is caused to react with the metallic fine particles that have been sprayed on the surface of the cone-shaped plate 42 or over inner surface of the inner wall of heating vessel 41 at an optimum temperature, thereby creating and growing the nanocarbon 17. Concurrently, as the nanocarbon grows, the metallic fine particles reacted are caused to peel off and slightly separate from the surface of the cone-shaped plate 42. Then, to the metallic fine particles thus separated, nanocarbon is additionally precipitated and permitted to grow. By repeating these phenomena, the nanocarbon is acceleratingly produced and grown, thereby making it possible to synthesize highly pure nanocarbon in large quantities.

Since the nanocarbon is synthesized in large quantities within a short period of time, a block of the nanocarbon that has been grown to more than a predetermined thickness on the surface of the cone-shaped plate 42 or on an upper surface portion of the heating vessel is caused to peel off and, due to its own weight, gravitationally drop from these surfaces. On this occasion, the quantity of the metallic fine particles peeling off from the cone-shaped plate 42 or to be contained in the nanocarbon is very small. Therefore, the metallic catalyst powder in the sprayed metallic catalyst powder-mixed hydrocarbon is enabled to act as a core, thereby making it possible to continuously repeat the production and growth of nanocarbon through the reaction between the hydrocarbon and the metallic fine particles that have been sprayed and separated in the heating vessel 41. In this manner, the metallic catalyst powder-mixed hydrocarbon is continuously sprayed, through the metallic catalyst powder-mixed hydrocarbon-dispersing mesh 16, from the supply header 45 which is disposed at an upper portion of the nanocarbon producing apparatus 10. Namely, the reaction of hydrocarbon can be repeated in the nanocarbon producing apparatus and on the cone-shaped plate 42 which is disposed on the cylindrical inner wall of the apparatus, thereby making it possible to continuously and repeatedly produce and grow the nanocarbon.

Namely, in the nanocarbon producing apparatus 10 as well as on the surface of the cone-shaped plate 42 disposed on the inner surface of the heating vessel 41, the catalytic particles constituting the metallic catalyst powder and sprayed as described above becomes a core. The catalytic particles are then reacted with the sprayed hydrocarbon under a high temperature condition, thereby enabling nanocarbon to produce and grow by way of a vapor phase deposition method. The inner surface of the nanocarbon producing apparatus 10 is uniformly heated and, at the same time, metallic catalyst powder mixed-hydrocarbon is also uniformly sprayed. As a result, it is possible to uniformly form and grow nanocarbon without being uneven on the surface of the substrate. Accordingly, nanocarbon can be continuously and stably manufactured for a long period of time by simply feeding a metallic catalyst powder mixed-hydrocarbon without requiring the employment of a special kind of metallic substrate.

As describe above, the nanocarbon producing apparatus according to the fourteenth embodiment comprises: the heating vessel 41; the cone-shaped electric heater 43 disposed on an outer circumference of the heating vessel 41; the supply header 45 disposed on an upstream side of the heating vessel 41 for spraying the metallic catalyst powder mixed-hydrocarbon into the heating vessel 41; and the nanocarbon product discharge nozzle 48 disposed on a downstream side of the heating vessel 41. In this case, the metallic catalyst powder mixed-hydrocarbon is continuously sprayed from the supply header 45 into the heating vessel 41, thereby enabling a reaction and the growth of nanocarbon to take place on cone-shaped plate 42 or on the inner surface of the heating vessel 41, the resultant nanocarbon product being subsequently discharged from the discharge nozzle 18. Therefore, it is possible to effectively mass-produce high-quality nanocarbon which is high in purity and stability at a low cost.

According to the invention of the fourteenth embodiment, it is possible to obtain almost the same effects as that of the thirteenth embodiment.

With respect to the microscopic mechanism in the formation of nanocarbon, it can be explained as follows. Namely, the hydrocarbon is caused to react with the metallic fine particles existing on the surface of the cone-shaped plate 42 at an optimum temperature, thereby creating and growing the nanocarbon 17. Concurrently, as the nanocarbon grows, the metallic fine particles reacted are caused to peel off and slightly separate from the surface of the cone-shaped plate 42. Then, to the metallic fine particles thus separated, nanocarbon 17 is additionally formed and permitted to grow. By repeating these phenomena, the nanocarbon is acceleratingly formed and grown, thereby making it possible to synthesize highly pure nanocarbon in large quantities.

Since the nanocarbon is synthesized in large quantities within a short period of time, a block of the nanocarbon that has been grown to more than a predetermined thickness on the cone-shaped plate is caused to peel off and, due to its own weight, gravitationally drop from the cone-shaped plate. On this occasion, the quantity of the metallic fine particles to be peeled off from the cone-shaped plate 42 is very small. Therefore, the metallic fine particles on the surface of the cone-shaped plate is enabled to react with hydrocarbon even after the peeling of the nanocarbon 17, thereby making it possible to continuously repeat the producing and growth of nanocarbon. In this manner, the metallic catalyst powder-mixed hydrocarbon is sprayed continuously or intermittently from the metallic catalyst powder mixed-hydrocarbon-injecting nozzle 44 to an upper portion of the nanocarbon producing apparatus 10. As a result, a reaction of hydrocarbon can be repeated on cone-shaped plate 42 which is disposed in the apparatus 10, thereby making it possible to continuously and repeatedly produce and grow the nanocarbon 17.

Incidentally, if the angle of the inclined surface of cone-shaped plate 42 is small, the nanocarbon is produced by using the metallic particles on cone-shaped plate 42 as a core, the nanocarbon is produced above the cone-shaped plate 42. The nanocarbon thus grown is repeatedly grown at a region over the cone-shaped plate 42 with metallic particles separated from the cone-shaped plate 42 being used as a core. However, since the nanocarbon thus grown can hardly flow downward, the interior of the nanocarbon producing apparatus 10 becomes full of this grown nanocarbon.

On the other hand, if the angle of the inclined surface of cone-shaped plate 42 is large, the nanocarbon that has been produced on the surface of cone-shaped plate 42 is permitted grow more or less at a region over the cone-shaped plate 42. However, the nanocarbon thus grown cannot be held by the surface of cone-shaped plate 42, thereby enabling the grown nanocarbon to immediately flow downward. As a result, a further repetition of growth of nanocarbon using, as a core, the metallic particles that have been peeled from the cone-shaped plate 42 would be obstructed, thereby deteriorating the producing efficiency of nanocarbon. In order to avoid these problems, the angle of inclination of the surface of the cone-shaped plate 42 should be confined within a certain range, such as 30° to 60° or so, for example. The reason for using to this range is that when this angle is confined to this range, the repetition of growth of nanocarbon using, as a core, the metallic particles that have been peeled from the metallic catalyst powder can be promoted, thus enabling the nanocarbon to gravitationally fall after the nanocarbon has been grown to a certain height.

The metallic catalyst powder-mixed hydrocarbon to be continuously sprayed from the injection nozzle 44 disposed on the upstream side of the heating vessel 41 may not be required to be continuously sprayed. Rather, the intermittent spray of hydrocarbon is more advantageous in enhancing the producing efficiency of nanocarbon. The reason for this is that the timing of not spraying the metallic catalyst powder-mixed hydrocarbon from above is more advantageous in promoting the peeling of metallic powder from the cone-shaped plate 42. Therefore, it is preferable to suitably adjust the various factors such as the periodical intervals of spraying the metallic catalyst powder-mixed hydrocarbon, the timing of not spraying the metallic catalyst powder-mixed hydrocarbon, the spraying volume of the metallic catalyst powder-mixed hydrocarbon, the mixing ratio between the metallic catalyst powder and the hydrocarbon, etc. while taking into account the features of growth of nanocarbon on the surface of cone-shaped plate 42, the volume and features of nanocarbon falling downward from the heating vessel 41, etc.

The cone-shaped plate 42 which is with an angle of inclination, concenrically is disposed in contact with the electric heater 43 which is capable of uniformly heating the surface of the cone-shaped plate 42. Therefore, the surface of cone-shaped plate 42 can be uniformly heated without being uneven in surface temperature of the cone-shaped plate 42. If there are spots in surface temperature of the cone-shaped plate 42, the ratio of intermingling of soot in the nanocarbon may be increased at the regions where the surface temperature is relatively high and the ratio of growth of nanocarbon may be lowered at the regions where the surface temperature is relatively low.

As describe above, the nanocarbon producing apparatus according to the fourteenth embodiment comprises: the heating vessel 41; the cone-shaped plate 42 which is disposed in the heating vessel 41; the electric heater 43 disposed in contact with an outer circumference of the cone-shaped plate 42; the injection nozzle 44 for spraying a metallic catalyst powder-mixed hydrocarbon into the heating vessel 41; and the discharge nozzle 47 disposed on a downstream side of the heating vessel 41. Therefore, the metallic catalyst powder-mixed hydrocarbon is enabled to be continuously or intermittently but uniformly sprayed from the injection nozzle 44 into the heating vessel 41, thereby enabling a reaction and the growth of nanocarbon 17 to take place on the surface of cone-shaped plate 42, the grown nanocarbon product being subsequently peeled off from the cone-shaped plate 42 and discharged from the discharge nozzle 47. Therefore, it is possible to effectively mass-produce high-quality nanocarbon which is high in purity and stability at a low cost.

(Fifteenth Embodiment)

Figure 9:
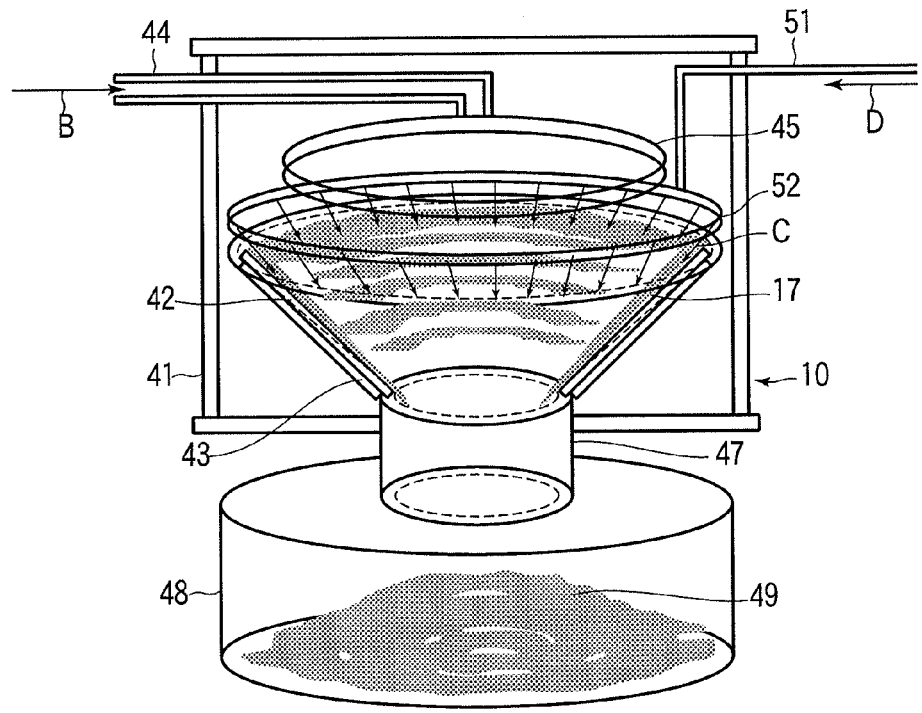
FIG. 9 is a diagram schematically illustrating a nanocarbon producing apparatus according to the fifteenth embodiment of the present invention.

FIG. 9 shows schematically a vertical type nanocarbon producing apparatus according to the fifteenth embodiment of the present invention. Herein, the same components as those of FIGS. 1 and 8 are identified by the same reference numbers, thereby omitting the explanation thereof.

The reference number 51 in FIG. 9 represents an inert gas injection nozzle. To this inert gas injection nozzle 51 is connected an inert gas supply header 52, from which an inert gas can be intermittently sprayed from the header 52 to the cone-shaped plate 42 as indicated by an arrow "D". Incidentally, although not shown in FIG. 9 for the sake of convenience, it is also designed in the embodiment of FIG. 9 as in the case of FIG. 8 that a metallic catalyst powder-mixed hydrocarbon can be continuously or intermittently but uniformly sprayed from the supply header 45 to the cone-shaped plate 42.

The nanocarbon producing apparatus 10 according to the fifteenth embodiment is designed such that the surface of cone-shaped plate 42 can be uniformly heated and that the metallic catalyst powder-mixed hydrocarbon can be continuously or intermittently but uniformly sprayed from the upstream side of the nanocarbon producing apparatus 10 which provides a reducing atmosphere therein, from the injection nozzle 44 through the supply header 45, to the cone-shaped plate 42 whose surface is uniformly heated. Therefore, hydrocarbon and metal can be uniformly reacted with each other at all regions of the surface of cone-shaped plate 42, thereby enabling nanocarbon to grow up, by making use of the metallic fine powder as a core, to a certain height in the space over the cone-shaped plate 42. Further, it is designed that an inert gas can be intermittently sprayed to the grown nanocarbon product from above the cone-shaped plate 42, from the injection nozzle 44 through the supply header 45. As a result, the blocks of nanocarbon product 17 that have been grown on the surface of cone-shaped plate 42 are enabled to be blown off, thereby making it possible to discharge the nanocarbon from the downstream side of the nanocarbon producing apparatus 10 and to continuously manufacture the nanocarbon.

With respect to the microscopic mechanism in the formation of nanocarbon, it is almost the same as that explained with reference to FIG. 8, thereby omitting the explanation thereof. If the angle of the inclined surface of cone-shaped plate 42 is small, the nanocarbon formed using the metallic particles on the surface of cone-shaped plate 42 as a core is permitted to grow above the cone-shaped plate 42. The nanocarbon thus grown is repeatedly grown at a region over the cone-shaped plate 42 with metallic particles separated from the cone-shaped plate 42 being used as a core. However, since the nanocarbon thus grown can hardly flow downward, the interior of the nanocarbon producing apparatus 10 becomes full of this grown nanocarbon. In the case of FIG. 9, an inert gas is intermittently sprayed from the inert gas injection nozzle 51 above the cone-shaped plate 42. Therefore, the blocks of nanocarbon product 17 that have been grown on the surface of cone-shaped plate 42 are enabled to be blown down reliably, thereby making it possible to drop the nanocarbon product and to discharge it from the downstream side of the nanocarbon producing apparatus 10, thus continuously manufacturing the nanocarbon.

Incidentally, the position of the inert gas injection nozzle 51 is spaced away from the surface of cone-shaped plate 42, so that an inert gas can be sprayed against only above the blocks of nanocarbon that have been grown to a certain height. By doing so, the floating metallic particles that have been freshly peeled from the metallic catalyst powder and are still capable of acting for the growth of nanocarbon are prevented from being discharged as they are, thereby preventing the lowering of the nanocarbon-producing efficiency that may result from the obstruction of the repeated growth of nanocarbon using, as a core, metallic particles that have been peeled from the metallic catalyst powder.

The angle of inclination of the cone-shaped plate 42 may be designed as follows. Namely, first of all, nanocarbon is allowed to grow on the cone-shaped plate 42, and then by making use of the metallic particles that have been peeled from the metallic catalyst powder, as a core, the repeated growth of nanocarbon is promoted. Then, when the nanocarbon has been grown to a certain height, an inert gas is sprayed against the grown nanocarbon to cause the grown nanocarbon to fall. Therefore, the angle of inclination of the cone-shaped plate 42 may be set smaller than the angle which is required for enabling the blocks of nanocarbon to gravitationally flow downward as they have been sufficiently grown using, as a core, the metal particles peeled from the metallic catalyst powder. As a result, the nanocarbon-producing efficiency can be enhanced in this case as compared with the case where the blocks of nanocarbon are enabled to gravitationally flow downward as they have been sufficiently grown using, as a core, the metal particles peeled from the metallic catalyst powder.

The metallic catalyst powder-mixed hydrocarbon to be continuously sprayed from the injection nozzle 44 disposed on the upstream side of the nanocarbon producing apparatus 10 may not be required to be continuously sprayed. Rather, the intermittent spray of hydrocarbon is more advantageous in enhancing the manufacturing efficiency of nanocarbon. The reason for this is that the timing of not spraying the metallic catalyst powder-mixed hydrocarbon from above is more advantageous in promoting the peeling of metallic powder from the cone-shaped plate 42. Therefore, it is preferable to suitably adjust the various factors, such as the periodical intervals of spraying the metallic catalyst powder-mixed hydrocarbon, the timing of not spraying the metallic catalyst powder-mixed hydrocarbon, the spraying volume of the metallic catalyst powder-mixed hydrocarbon, the mixing ratio of the metallic catalyst powder and the hydrocarbon, etc. while taking into account the features of growth of nanocarbon on the surface of cone-shaped plate 42, the volume and features of nanocarbon falling downward from the nanocarbon producing apparatus 10, etc.

The cone-shaped plate 42 which is with an angle inclination, centrically is disposed in contact with the electric heater 43 which is capable of uniformly heating the surface of cone-shaped plate 42. The reason for doing so is that the surface of the cone-shaped plate 42 can be uniformly heated without being uneven in surface temperature of the cone-shaped plate 42.

The nanocarbon producing apparatus according to the fifteenth embodiment is featured in that not only the injection nozzle 44 and the supply header 45, but also the inert gas injection nozzle 51 and the inert gas supply header 52 are disposed on an upstream side of the heating vessel 41. Therefore, the angle of inclination of the cone-shaped plate 42 may be set smaller than the angle which is required for enabling the blocks of nanocarbon to gravitationally flow downward as they have been sufficiently grown on the cone-shaped plate 42. As a result, the nanocarbon-producing efficiency can be enhanced in this case as compared with the case where the blocks of nanocarbon are enabled to gravitationally flow downward as they have been sufficiently grown on the cone-shaped plate 42.

(Sixteenth Embodiment)

Figure 10:
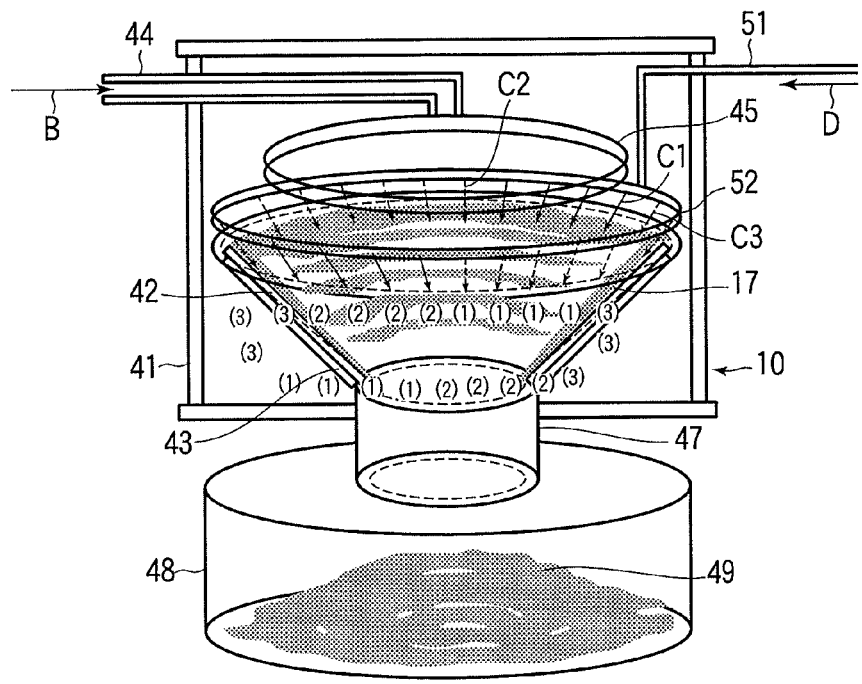
FIG. 10 is a diagram schematically illustrating a nanocarbon producing apparatus according to the sixteenth embodiment of the present invention.

FIG. 10 shows schematically a vertical type nanocarbon producing apparatus according to the sixteenth embodiment of the present invention. Herein, the same components as those of FIGS. 1, 8 and 9 are identified by the same reference numbers, thereby omitting the explanation thereof.

The reference number 53 in FIG. 10 represents an inert gas spray header which is connected with the inert gas supply nozzle 51. The position of blowing an inert gas from the inert gas spray header 53 to the cone-shaped plate 42 can be changed each time of blowing as shown by the arrows "C" (C1, C2 and C3). Specifically, as shown in FIG. 10 for example, the first spray may be at the position indicated by parenthesis 1 (arrow C1), the second spray may be the at position indicated by parenthesis 2 (arrow C2), and the third spray may be at the position indicated by parenthesis 3 (arrow C3). Incidentally, although not shown in FIG. 10 for the sake of convenience, it is also designed in the embodiment of FIG. 10 as in the case of FIG. 8 that a metallic catalyst powder-mixed hydrocarbon can be continuously or intermittently but uniformly sprayed from the supply header 45 to the surface of cone-shaped plate 42.

The nanocarbon producing apparatus 10 according to the sixteenth embodiment is designed such that the surface of metallic substrate 42 can be uniformly heated and that the metallic catalyst powder-mixed hydrocarbon can be continuously or intermittently but uniformly sprayed from the upstream side of the nanocarbon producing apparatus 10 which provides a reducing atmosphere therein, through the injection nozzle 44 and the supply header 45, to the surface of metallic substrate 42 whose surface is uniformly heated. Therefore, the metallic catalyst powder-mixed hydrocarbon and metal can be uniformly reacted with each other at all regions of the surface of metallic substrate 42, thereby enabling nanocarbon to grow, by making use of the metallic fine powder as a core, to a certain height in the space over the metallic substrate 42. Further, it is designed that an inert gas can be intermittently sprayed to the grown nanocarbon product from above the metallic substrate 42 by making use of the inert gas nozzle 51. As a result, the blocks of nanocarbon product 17 that have been grown on the surface of metallic substrate 42 are enabled to be blown down and to fall, thereby making it possible to discharge the nanocarbon from the downstream side of the nanocarbon producing apparatus 10 and to continuously manufacture the nanocarbon. In this case, there is mounted an inert gas supply header 52 for intermittently blowing an inert gas to the grown nanocarbon product from above the cone-shaped plate, this inert gas supply header 52 being constructed such that the position of blowing an inert gas from the inert gas supply header 52 to the metallic substrate 42 can be changed each time of blowing. The nanocarbon that has been grown on the surface of the metallic substrate 42 can be blown down while changing the inert gas-spraying position. In this manner, the nanocarbon can be caused to drop and to discharge from the downstream side of the nanocarbon producing apparatus, thereby making it possible to continuously manufacture nanocarbon.

As a result, the nanocarbon that has been grown on the surface of the metallic substrate 42 can be prevented from flowing downward at a stroke, thereby making it possible to avoid the closing of the nanocarbon-discharging 47 and to enable the nanocarbon to efficiently make the nanocarbon flow down without inviting the clogging with nanocarbon.

With respect to the microscopic mechanism in the formation of nanocarbon, it is almost the same as that explained with reference to FIG. 8, thereby omitting the explanation thereof. If the angle of inclination of metallic substrate 42 is small, the nanocarbon is produced by using the metallic particles separated from metallic catalyst powder, as a core, on the metallic substrate 42. The nanocarbon thus grown is repeatedly grown at a region over the metallic substrate 42 with metallic particles separated from the metallic substrate 42 being used as a core. However, since the nanocarbon thus grown can hardly flow downward, the interior of the nanocarbon producing apparatus 10 becomes full of this grown nanocarbon.

Meanwhile, in the case of FIG. 10, an inert gas is designed to be intermittently blown from the inert gas injection nozzle 51 above the metallic substrate 42. Therefore, the blocks of nanocarbon product 17 that have been grown on the surface of metallic substrate 42 are enabled to be blown down reliably, thereby making it possible to drop the nanocarbon product and to discharge it from the downstream side of the nanocarbon producing apparatus 10, thus making it possible to continuously manufacture the nanocarbon.

The position of the inert gas injection nozzle 51 is designed such that it is spaced away from the surface of cone-shaped plate 42, so that an inert gas can be sprayed against only above the blocks of nanocarbon that have been grown to a certain height. By doing so, the floating metallic particles that have been freshly peeled from the metallic catalyst powder and are still capable of acting for the growth of nanocarbon are prevented from being discharged as they are. Furthermore, it is possible to avoid the lowering of the nanocarbon-producing efficiency that may result from the obstruction of the repeated growth of nanocarbon using, as a core, metallic particles that have been peeled from the metallic catalyst powder. With respect to the angle of inclination of the cone-shaped plate 42, it may be designed in the same manner as in the case of the fifteenth embodiment, thereby making it possible to enhance the nanocarbon producing efficiency.

The metallic catalyst powder-mixed hydrocarbon to be continuously sprayed from the injection nozzle 44 disposed on the upstream side of the nanocarbon producing apparatus 10 may not be required to be continuously sprayed. Rather, the intermittent spray of hydrocarbon is more advantageous in enhancing the manufacturing efficiency of nanocarbon. The reason for this is that the timing of not spraying the metallic catalyst powder mixed hydrocarbon from above is more advantageous in promoting the growth of nanocarbon using, as a core, the metallic powder peeled from the metallic substrate 42 after the nanocarbon has been grown on the surface of metallic substrate 42. Therefore, it is preferable to suitably adjust the various factors such as the periodical intervals of spraying the metallic catalyst powder-mixed hydrocarbon, the timing of not spraying the metallic catalyst powder-mixed hydrocarbon, the spraying volume of the metallic catalyst powder-mixed hydrocarbon, the mixing ratio between the metallic catalyst powder and the hydrocarbon, etc. while taking into account the features of growth of nanocarbon on the surface of metallic substrate 42, the volume and features of nanocarbon falling downward from the nanocarbon producing apparatus 10, etc.

The metallic substrate 42 having an inclined surface is concentrically disposed in contact with the electric heater 43 which is capable of uniformly heating the inclined surface of metallic substrate 42. The reason for doing so is the same as explained with reference to the fifteenth embodiment. If the cone-shaped 42 is not disposed in this manner, the ratio of growth of nanocarbon may be lowered at the regions where the surface temperature is relatively low.

The nanocarbon producing apparatus according to the sixteenth embodiment is featured in that not only the injection nozzle 44 and the supply header 45, but also the inert gas injection nozzle 51 and the inert gas spray header 53 are disposed on an upstream side of the heating vessel 41. Therefore, the position at which the inert gas is blown from the inert gas spray header 53 above the metallic substrate 42 each time of blowing can be changed. By doing so, the nanocarbon that has been grown on the surface of the metallic substrate 42 can be blown down while successively changing the inert gas-blowing position, thus causing the nanocarbon to drop and to discharge from the downstream side of the nanocarbon producing apparatus, thereby making it possible to continuously manufacture nanocarbon. As a result, the nanocarbon that has been grown on the surface of the metallic substrate 42 can be prevented from flowing downward simply, thereby making it possible to avoid the closing of the nanocarbon-discharging portion 47 and to enable the nanocarbon to efficiently flow down without inviting the clogging with nanocarbon.

(Seventeenth Embodiment)

Figure 11:
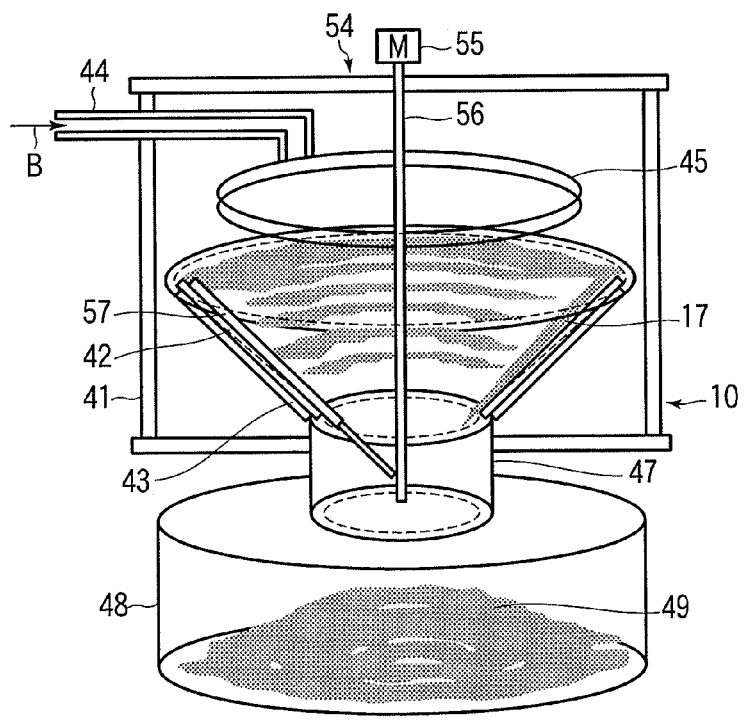
FIG. 11 is a diagram schematically illustrating a nanocarbon producing apparatus according to the seventeenth embodiment of the present invention.

FIG. 11 shows schematically a vertical type nanocarbon producing apparatus according to the seventeenth embodiment of the present invention. Herein, the same components as those of FIGS. 1, 8, 9 and 10 are identified by the same reference numbers, thereby omitting the explanation thereof.

The reference number 54 in FIG. 11 represents a scraping mechanism. This scraping mechanism 54 is constituted by: a driving shaft-rotating motor 55; a rotating driving shaft 56 rotated by the motor 55; and a nanocarbon product-scraping rod (hereinafter referred to as a scraping rod) 57 which is sustained by the rotating driving shaft 56. The nanocarbon product-scraping rod 57 is disposed so as to spaced apart from the surface of the metallic substrate 42 and is enabled to rotate along the surface of the metallic substrate 42. Incidentally, although not shown in FIG. 11 for the sake of convenience, it is also designed in the embodiment of FIG. 11 as in the case of FIG. 8 that a metallic catalyst powder-mixed hydrocarbon can be continuously or intermittently but uniformly sprayed from the supply header 45 to the surface of metallic substrate 42.

The nanocarbon producing apparatus according to the seventeenth embodiment is designed such that the surface of metallic substrate 42 can be uniformly heated and that the metallic catalyst powder-mixed hydrocarbon can be continuously or intermittently but uniformly sprayed from the upstream side of the nanocarbon producing apparatus 10 which provides a reducing atmosphere therein, through the supply header 45 from the injection nozzle 44, to the surface of metallic substrate 42 whose surface is uniformly heated. Therefore, the metallic catalyst powder-mixed hydrocarbon and metal can be uniformly reacted with each other at all regions of the surface of metallic substrate 42, thereby enabling nanocarbon to grow, by making use of the metallic fine powder as a core, to a certain height in the space over the metallic substrate 42. Further, it is designed such that the grown nanocarbon product that has been grown on the surface of metallic substrate can be scraped away by making use of the nanocarbon-scraping mechanism 54. As a result, the nanocarbon product 17 is caused to fall, thereby making it possible to discharge the nanocarbon from the downstream side of the heating vessel 41 and to continuously manufacture the nanocarbon.

With respect to the microscopic mechanism in the production of nanocarbon, it is almost the same as that explained with reference to FIGS. 8-10, thereby omitting the explanation thereof.

As explained above with reference to the sixteenth embodiment, if the angle of the inclined surface of metallic substrate 42 is small, the heating vessel 41 would become full of the nanocarbon that has been abruptly grown.

Meanwhile, in the case of FIG. 11, the nanocarbon-scraping mechanism 54 is mounted for scraping the grown nanocarbon product. Therefore, by actuating this nanocarbon-scraping mechanism 54, the nanocarbon that has been grown on the surface of metallic substrate can be scraped and allowed to drop, thereby making it possible to discharge it from the downstream side of the nanocarbon heating vessel 41, thus making it possible to continuously manufacture the nanocarbon.

The position of the scraping rod 57 of the nanocarbon-scraping mechanism 54 is set in such a manner that it is spaced apart from the surface of metallic substrate 42, so that the scraping rod 57 is enabled to contact with only an upper portion of the blocks of nanocarbon that have been grown to a certain height. By doing so, the floating metallic particles that have been freshly peeled from the metallic substrate 42 and are still capable of acting as a core for the growth of nanocarbon are prevented from being discharged as they are. Furthermore, the above design enables avoiding the lowering of the nanocarbon-producing efficiency that may result from the obstruction of the repeated growth of nanocarbon using, as a core, metallic particles that have been peeled from the metallic substrate 42. With respect to the angle of inclination of metallic substrate 42, it may be designed in the same manner as in the case of the fifteenth embodiment, thereby making it possible to enhance the nanocarbon-producing efficiency.

The reason for the manner of spraying the metallic catalyst powder-mixed hydrocarbon to be continuously sprayed from the injection nozzle 44 disposed on the upstream side of the heating vessel 41 is the same as explained with reference to the fifteenth embodiment. The metallic substrate 42 which is with an angle of inclination, concentrically is disposed in contact with the electric heater 43 which is capable of uniformly heating the surface of metallic substrate 42. The reason for doing so is the same as explained with reference to the fifteenth embodiment. If this metallic substrate 42 is not disposed as described above, the ratio of growth of nanocarbon may be lowered at the regions where the surface temperature is relatively low.

This seventeenth embodiment is featured in that it comprises a driving shaft-rotating motor 55; a rotating driving shaft 56 rotated by the motor 55; and a nanocarbon product-scraping rod 57 which is sustained by the rotating driving shaft 56. Therefore, the nanocarbon product 17 that has been grown on the surface of the metallic substrate 42 can be scraped off and permitted to fall, thereby enabling it to discharge from the downstream side of the heating vessel 41, thus making it possible to continuously manufacture nanocarbon.

Incidentally, although an electric heater is employed as a heating source in the 14th to 17th embodiments, the heating source is not limited to the electric heater but may be constructed so as to utilize the hot air obtained from the waste heat generated from installations or plants, thereby making it possible to improve the efficiency of the nanocarbon producing apparatus as a whole or the efficiency of the system as a whole.

Further, the 14th to 17th embodiments may be modified with respect to the design thereof for controlling the flow rate of spray from the injection nozzle so as to optimize the formation of nanocarbon such as carbon nanotubes, carbon fibers, carbon nanocoils, etc. For example, in order to control the spray rate of a metallic catalyst powder-mixed hydrocarbon, a flow meter and a flow rate-controlling valve may be attached to the supply header. Alternatively, a metallic catalyst powder mixed hydrocarbon spray nozzle may be installed in place of the metallic catalyst powder-mixed hydrocarbon supply header so as to make it possible to spray a metallic catalyst powder-mixed hydrocarbon to the surface of the metallic substrate without being uneven. These modifications may be optionally executed.

Further, the 14th to 17th embodiments may be modified with respect to the design thereof for controlling the flow rate of spray from the inert gas injection nozzle so as to optimize the conditions to enable only the blocks of nanocarbon that have been grown to flow downward. For example, the design thereof may also be modified so as to optimize the layout of the nozzle, the configuration of the nozzle, the layout and configuration of the distal end of nozzle, the inter gas blow rate, the timing for blowing an inert gas, etc.

Furthermore, in the case of above 14th to 17th embodiments, the nanocarbon producing apparatus is constructed as a vertical system, wherein the injection nozzle and the inert gas injection nozzle are disposed at an upper portion of the system and the nanocarbon discharge nozzle is disposed at a lower portion of the system. However, they may be constructed as a horizontal system or an oblique mount system, wherein the metallic substrate can be disposed in contact with the inner wall of a concentrical inner cylinder to be heated by an external heating source and installed in the nanocarbon producing apparatus provides a reducing atmosphere therein. By suitably designing the discharging system for the nanocarbon product, it becomes possible to efficiently and continuously manufacture nanocarbon.

(Eighteenth Embodiment)

The vertical type nanocarbon producing apparatus according to the eighteenth embodiment of the present invention is fundamentally the same in construction as the nanocarbon producing apparatus shown in FIG. 8. Therefore, this nanocarbon producing apparatus will be explained with reference to FIG. 8.

The nanocarbon producing apparatus according to the eighteenth embodiment is characterized in that iron is employed as a material for the metallic substrate 42 and that the surface temperature of this iron metallic substrate 42 is set to a range of 550° to 700° as a metallic catalyst powder-mixed hydrocarbon is continuously and uniformly sprayed thereto.

The nanocarbon producing apparatus 10 according to the eighteenth embodiment is designed such that the surface of metallic substrate 42 can be uniformly heated and that the metallic catalyst powder-mixed hydrocarbon can be continuously or intermittently but uniformly sprayed from the upstream side of the heating vessel 41 which provides a reducing atmosphere therein, through the supply header 45 from the injection nozzle 44, to the surface of metallic substrate 42 whose surface is uniformly heated. Therefore, hydrocarbon and metal can be uniformly reacted with each other at all regions of the surface of metallic substrate 42, thereby enabling nanocarbon to grow, by making use of the metallic fine powder as a core, to a certain height in the space over the metallic substrate 42. Further, it is designed that a material of the metallic substrate 42 is iron and the surface temperature of this iron metallic substrate 42 is set to a range of 550° to 700° as a metallic catalyst powder-mixed hydrocarbon is continuously or intermittently but uniformly sprayed thereto.

It is desirable to set the surface temperature of the metallic substrate 42 as low as possible and to enhance the efficiency of the nanocarbon producing apparatus as a whole. However, it has verified through repeated tests and researches conducted by the present inventors that when a material of the metallic substrate 12 is iron, it is possible to most effectively create high-purity nanocarbon by setting the surface temperature of the metallic substrate the range of 550° C. to 700° C. without increasing the surface temperature thereof to 800° C. or more.

According to the eighteenth embodiment, since a material of the metallic substrate 12 is iron and the surface temperature of this metallic substrate 42 is set to a range of 550° C. to 700° C., it is possible to produce nanocarbon by making use of inexpensive iron as the metallic substrate 42. Further, nanocarbon thus formed can be peeled away and permitted to fall gravitationally due its own weight from the metallic substrate 42 after the nanocarbon has been grown to a certain thickness. Alternatively, the nanocarbon thus grown can be forcedly scraped down by blowing an inert gas to the nanocarbon by making use of a nanocarbon-scraping mechanism. As a result, the nanocarbon thus dropped is permitted to flow down to a lower portion of the heating vessel 41 and can be discharged therefrom, thus making it possible to continuously manufacture the nanocarbon.

(Nineteenth Embodiment)

The vertical type nanocarbon producing apparatus according to the nineteenth embodiment of the present invention is fundamentally the same in construction as the nanocarbon producing apparatus shown in FIG. 8. Therefore, this nanocarbon producing apparatus will be explained with reference to FIG. 8.

The nanocarbon producing apparatus 10 according to the nineteenth embodiment is designed such that the surface of metallic substrate 42 can be uniformly heated and that the metallic catalyst powder-mixed hydrocarbon to be injected from the upstream side of the heating vessel 41 where a reducing atmosphere is provided therein is heated prior to the injection thereof through the supply header 45 from the supply nozzle 44. Then, the metallic catalyst powder-mixed hydrocarbon is continuously or intermittently but uniformly sprayed in a state of gas to the heated metallic substrate 42 whose surface is uniformly heated in advance. Therefore, the hydrocarbon and metal can be uniformly reacted with each other at all regions of the surface of metallic substrate 42, thereby enabling nanocarbon to grow, by making use of the metallic fine powder as a core, to a certain height in the space over the metallic substrate 42. Meanwhile, the metallic substrate 42 is disposed in the heating vessel 41 with an angle of inclination, concentrically with the heating vessel 41 and the metallic catalyst powder-mixed hydrocarbon to be sprayed against the surface of the metallic substrate 42 is heated in the heating vessel 41 and turned into a gaseous state. Accordingly, this gaseous nanocarbon can be uniformly sprayed without lowering the surface temperature of the metallic substrate 42.

In this case, the nanocarbon producing apparatus 10 is of a vertical type and the surface temperature of the metallic substrate is set a range (550° C. to 700° C.) which is optimal for the production of nanocarbon. Further, an upper region of the interior of the heating vessel 41 is kept in a high-temperature atmosphere on account of an ascending current. To this high-temperature atmosphere, liquid or gaseous metallic catalyst powder-mixed hydrocarbon is sprayed and heated to turn it into a gaseous state. As a result, the hydrocarbon in a gaseous state is uniformly sprayed to the surface of the metallic substrate and enables the reaction thereof to take place, thus making it possible to efficiently create nanocarbon without lowering the surface temperature of the metallic substrate 42.

According to the nineteenth embodiment, the metallic catalyst powder-mixed hydrocarbon to be injected continuously to the surface of the metallic substrate 42 is preliminarily heated in the heating vessel 41 to turn it into a gaseous state. Then, this gaseous metallic catalyst powder-mixed hydrocarbon is continuously sprayed to the surface of the cone-shaped metallic substrate. As a result, the nanocarbon-producing reaction on the surface of cone-shaped metallic substrate can be promoted, thus accelerating the nanocarbon-producing rate and enhancing the nanocarbon-producing efficiency without lowering the surface temperature of the cone-shaped metallic substrate. Further, even if the preset temperature of the electric heater 13 is set to a relatively low level, the surface of the metallic substrate can be maintained at an optimal temperature. Additionally, the heating temperature of the heating vessel 41 can be also lowered, thereby making it possible to continuously and stably create and recover nanocarbon while enhancing the nanocarbon-producing efficiency.

(Twentieth Embodiment)

The vertical type nanocarbon producing apparatus according to the twentieth embodiment of the present invention is fundamentally the same in construction as the nanocarbon producing apparatus shown in FIG. 8. Therefore, this nanocarbon producing apparatus will be explained with reference to FIG. 8.

The nanocarbon producing apparatus according to the twentieth embodiment is featured in that the gaseous metallic catalyst powder-mixed hydrocarbon that has been fed as a liquid into the heating vessel 41 from the injection nozzle 44 is preliminarily heated in the heating vessel 41 to turn into a gas, which is then continuously sprayed to the surface of metallic substrate.

Namely, the nanocarbon producing apparatus according to the twentieth embodiment is designed such that the surface of metallic substrate 42 can be uniformly heated and that the metallic catalyst powder-mixed hydrocarbon injected from the upstream side of the heating vessel 41 where a reducing atmosphere is provided therein is sprayed as a liquid into the heating vessel 41 after passing through the supply header 45 from the supply nozzle 44, thereby vaporizing the gaseous metallic catalyst powder-mixed hydrocarbon. Then, the vaporized metallic catalyst powder-mixed hydrocarbon is continuously or intermittently but uniformly sprayed to the surface of heated metallic substrate 42 whose surface is uniformly heated in advance. Therefore, the gaseous metallic catalyst powder mixed hydrocarbon and metal can be uniformly reacted with each other at all regions of the surface of metallic substrate 42, thereby enabling nanocarbon to grow, by making use of the metallic fine powder as a core, to a certain height in the space over the metallic substrate 42. Meanwhile, the metallic substrate 42 is concentrically mounted in the heating vessel 41 so as to provide an inclined surface and the metallic catalyst powder-mixed hydrocarbon to be sprayed against the surface of metallic substrate 42 is heated in the heating vessel 41 and turned into a gaseous state. Accordingly, this gaseous nanocarbon can be uniformly sprayed without lowering the surface temperature of the metallic substrate 42.

In this case, the nanocarbon producing apparatus 10 is of a vertical type and the surface temperature of the metallic substrate is set in a range (550° C. to 700° C.) which is optimal for the formation of nanocarbon. Further, an upper region of the interior of the heating vessel 41 is kept in a high-temperature atmosphere on account of an ascending current. The mechanism for enabling the nanocarbon to be effectively produced without lowering the surface temperature of the metallic substrate 42 is the same as described with reference to the nineteenth embodiment.

According to the twentieth embodiment, the metallic catalyst powder-mixed hydrocarbon to be injected to the surface of the metallic substrate 42 is preliminarily heated in the heating vessel 41 to turn it into a gaseous state. Then, this gaseous metallic catalyst powder-mixed hydrocarbon is continuously sprayed to the surface of the metallic substrate. As a result, the nanocarbon-producing reaction on the surface of metallic substrate can be promoted, thus accelerating the nanocarbon-producing rate and enhancing the nanocarbon-producing efficiency without lowering the surface temperature of the metallic substrate. Further, even if the preset temperature of the electric heater 13 is set to a relatively low level, the surface of the metallic substrate can be maintained at an optimal temperature. Additionally, the heating temperature of the heating vessel 41 can be also lowered, thereby making it possible to continuously and stably create and recover nanocarbon while enhancing the nanocarbon-producing efficiency.

(Twenty-First Embodiment)

FIG. 12 shows schematically a vertical type nanocarbon producing apparatus according to the twenty-first embodiment of the present invention. Herein, the same components as those of FIGS. 1 and 8 are identified by the same reference numbers, thereby omitting the explanation thereof.

The reference number 57 in FIG. 12 represents an injection nozzle for spraying a gaseous metallic catalyst powder-mixed hydrocarbon containing an acid component, and the reference number 58 represents a supply header for passing the gaseous metallic catalyst powder-mixed hydrocarbon "E" containing an acid component. Incidentally, although not shown in FIG. 12 for the sake of convenience, it is also designed in the embodiment of FIG. 12 as in the case of FIG. 8 that an acid component-containing liquid (a metallic catalyst powder-mixed hydrocarbon) can be continuously or intermittently but uniformly sprayed from the supply header 58 to the surface of metallic substrate 42.

The nanocarbon producing apparatus 10 shown in FIG. 12 is featured in that the gaseous metallic catalyst powder-mixed hydrocarbon containing an acid component is sprayed as a liquid to the surface of metallic substrate 42 disposed in the heating vessel 41 provides a reducing atmosphere therein, thereby enabling the metallic fine powder on the surface of metallic substrate 42 to corrode and to easily peel off from the surface of metallic substrate 42. As a result, the reaction of the gaseous metallic catalyst powder-mixed hydrocarbon can be promoted on the surface of metallic substrate 42.

Namely, the nanocarbon producing apparatus according to the twentieth embodiment is designed such that the surface of metallic substrate 42 can be uniformly heated and that the metallic catalyst powder-mixed hydrocarbon containing an acid component and injected from the upstream side of the heating vessel 41 where a reducing atmosphere is provided therein is sprayed to the surface of the metallic substrate 42 after passing through the supply header 58 from the supply nozzle 57, thereby enabling the metallic fine powder on the surface of metallic substrate 42 to corrode and to easily peel off from the surface of metallic substrate 42. As a result, the reaction of the gaseous metallic catalyst powder-mixed hydrocarbon is promoted, thereby enabling nanocarbon to easily grow up, by making use of the metallic fine powder as a core, to a certain height in the space over the metallic substrate 42. Additionally, the metallic catalyst powder-mixed hydrocarbon to be sprayed against the surface of metallic substrate 42 which is concentrically mounted in the heating vessel 41 so as to provide an inclined surface is heated in the heating vessel 41 and turned into a gaseous state. Accordingly, this gaseous nanocarbon can be uniformly sprayed without lowering the surface temperature of the metallic substrate.

As for the liquid hydrocarbon containing an acid component and designed to be sprayed against the surface of metallic substrate 42, it is possible to employ a solution of hydrocarbon comprising hydrocarbon selected from ethanol, methanol, bio-ethanol, various kinds of alcohols, hydrocarbon oil such as kerosene, etc. and an acid such as acetic acid, hydrochloric acid, etc. which is mixed in a very small quantity with the hydrocarbon to make it acidic; or an acidic solution of hydrocarbon such as biomass oil, etc. The hydrocarbon containing a very small amount of any of these acidic components is sprayed as a liquid and then vaporized in the heating vessel 41, thereby enabling the vaporized gaseous metallic catalyst powder-mixed hydrocarbon to be uniformly and continuously sprayed onto the surface of the metallic substrate 42, causing the reaction thereof to take place to form the nanocarbon.

In this twenty-first embodiment, a liquid gaseous metallic catalyst powder-mixed hydrocarbon containing an acid component and designed to be sprayed, through the injection nozzle 57 and the supply header 58, against the metallic substrate is preliminarily heated in the heating vessel 41 and turned into a gas, which is then continuously sprayed against the surface of the metallic substrate 42. Therefore, by making use of catalytic particles constituting a substrate as a core, the reaction of gaseous metallic catalyst powder-mixed hydrocarbon thus vaporized is caused to take place on the surface of the metallic substrate 12 under a high temperature condition, thereby enabling the nanocarbon 17 to efficiently form and grow by way of a vapor phase deposition method. Further, a liquid hydrocarbon such as ethanol, methanol, acetic acid, bio-ethanol, biomass oil, etc. is preliminarily heated in the heating vessel 41 to turn it into a gas, which is then continuously sprayed against the surface of metallic substrate 42.

As a result, the nanocarbon-producing reaction on the surface of cone-shaped metallic substrate can be promoted, thus accelerating the nanocarbon-producing rate and enhancing the nanocarbon-producing efficiency without lowering the surface temperature of the cone-shaped metallic substrate. Further, even if the preset temperature of the electric heater 13 is set to a relatively low level, the surface of the metallic substrate can be set to a range of 550° C. to 700° C., thus making it possible to lower the heating temperature of the continuous nanocarbon producing apparatus. Accordingly, nanocarbon can be continuously and stably created and recovered while enhancing the nanocarbon-producing efficiency.

(Twenty-Second Embodiment)

FIG. 13 shows schematically a vertical type nanocarbon producing apparatus according to the twenty-second embodiment of the present invention. Herein, the same components as those of FIGS. 1, 8 and 11 are identified by the same reference numbers, thereby omitting the explanation thereof.

The nanocarbon producing apparatus according to the twenty-second embodiment is featured in that a spacing distance Δa between the surface of the metallic substrate 12 and the scraper rod 57 constituting one of the components of the scraping mechanism 54 as well as the angle θ between the scraper rod 57 and the driving shaft 56 is made adjustable. Incidentally, although not shown in FIG. 13 for the sake of convenience, it is also designed in the embodiment of FIG. 13 as in the case of FIG. 8 that a metallic catalyst powder-mixed hydrocarbon can be continuously or intermittently but uniformly sprayed from the supply header 45 to the surface of cone-shaped plate 42.

Namely, the nanocarbon producing apparatus 10 shown in FIG. 13 is designed such that the surface of cone-shaped plate 42 can be uniformly heated and that the scraping mechanism 54 for scraping away the nanocarbon that has been grown on the metallic substrate 42 is equipped with the scraper rod 57 which is enabled to rotate about the central axis of the surface of metallic substrate 42 which is concentrically disposed in the heating vessel 41. Furthermore, the spacing distance Δa between the surface of the metallic substrate 12 and the scraper rod 57 as well as the angle θ between the scraper rod 57 and the driving shaft 56 is made adjustable.

The scraper rod 57 is disposed so as to rotate along the upper surface of the metallic substrate 42 which is disposed in the heating vessel 41. Accordingly, the scraper rod 57 is prevented from directly contacting with the surface of the metallic substrate 42 and is enabled to scrape away only the nanocarbon product 17 that has been grown on the surface of metallic substrate 42. If the scraper rod 57 is not designed to prevent the direct contact thereof with the surface of the metallic substrate 42 and to scrape away only the nanocarbon product 17 that has been grown on the surface of metallic substrate 42, the metallic fine powder of the metallic substrate 42 may be also scraped away. As a result, not only the purity of nanocarbon be deteriorated due to the intermingling of metallic impurities in the nanocarbon product to be obtained, but the metal constituting the surface of metallic substrate 42 would also scraped away, thereby inviting a lowering of the continuous nanocarbon-producing rate, thus lowering the nanocarbon-producing efficiency.

According to the twenty-second embodiment, the nanocarbon that has been failed to peel off and to gravitationally drop from the surface of metallic substrate 12 after the nanocarbon has been grown to a predetermined thickness on the surface of metallic substrate can be made to drop, at periodic intervals, to a region below the nanocarbon producing apparatus 10 without scraping the metal constituting the surface of metallic substrate 42, thereby making it possible to steadily discharge the nanocarbon product from the downstream side of the nanocarbon producing apparatus and to continuously manufacture nanocarbon.

Incidentally, as for the structure for adjusting the spacing distance Δa between the surface of the metallic substrate 12 and the scraper rod 57 and the angle θ between the scraper rod 57 and the driving shaft 56, it may be constructed as follows for example. Namely, although not shown in the drawing, a screw may be attached to the arm portion of the scraper rod, thereby enabling the distance of gap Δa and the angle θ to be finely adjusted through the rotation of the screw. Of course, it is possible to employ various structures and systems in conformity with the layout of the nanocarbon producing apparatus.

Meanwhile, the nanocarbon producing apparatus shown in FIG. 13 is of a vertical system wherein an electric heater acting as a heating source is disposed in contact with the outer wall of the metallic substrate. However, it is also possible to utilize the hot air obtained from the waste heat generated from installations or plants, thereby improving the efficiency of the nanocarbon producing apparatus as a whole or the efficiency of the system as a whole. As explained above, the nanocarbon that has failed to peel off and to gravitationally drop from the surface of metallic substrate 12 after the nanocarbon has been grown to a predetermined thickness on the surface of metallic substrate can be made to drop, at periodic intervals, to a region below the nanocarbon producing apparatus 10, thereby making it possible to steadily discharge the nanocarbon product from a lower portion of the heating vessel. Therefore, it is possible to steadily discharge nanocarbon from the downstream side of the heating vessel, thus making it possible to continuously manufacture nanocarbon.

(Twenty-Third Embodiment)

Although not shown in the drawings, this embodiment is featured in that the inclined angle θ of the cone-shaped metallic substrate is set to 30° relative to the horizontal direction. As described with reference to the fourteenth embodiment, this inclined angle θ is preferably confined to a range of 30° to 60°. As already described above, the reason for this is that if this angle θ is smaller than 30°, the nanocarbon that has been grown cannot flow downward, so that the heating vessel would become full of the grown nanocarbon. Further, if this angle θ is larger than 60°, the nanocarbon grown cannot be retained by the metallic substrate, thereby making the nanocarbon flow downward quite easily. As a result, the repeated growth of nanocarbon using, as a core, the metallic particles that have been peeled from the metallic substrate would be obstructed, thus decreasing the nanocarbon-producing efficiency.

(Twenty-Fourth Embodiment)

FIG. 14 shows schematically a vertical type nanocarbon producing apparatus according to the twenty-fourth embodiment of the present invention. Herein, the same components as those of FIGS. 1 and 8 are identified by the same reference numbers, thereby omitting the explanation thereof.

The nanocarbon producing apparatus according to the twenty-fourth embodiment is featured in that it is equipped with a surface thermometer 59 for measuring the surface temperature of the metallic substrate 42, thereby making it possible to accurately set the surface temperature of the metallic substrate 42 to the range of 550° C. to 700° C. under the condition where a gaseous metallic catalyst powder-mixed hydrocarbon is continuously or intermittently but uniformly sprayed to the metallic substrate. Incidentally, the reference number 60 represents a thermocouple connected with this surface thermometer 59. Incidentally, although not shown in FIG. 14 for the sake of convenience, it is also designed in the embodiment of FIG. 14 as in the case of FIG. 8 that a metallic catalyst powder-mixed hydrocarbon can be continuously or intermittently but uniformly sprayed from the supply header 45 to the surface of metallic substrate 42.

The nanocarbon producing apparatus according to this twenty-fourth embodiment is designed so as to make it possible to accurately measure the surface temperature of metallic substrate 42 disposed in the heating vessel 41 by making use of the thermocouple 60. The reason is that it is important to always keep an optimum temperature for the continuous production of nanocarbon by uniformly heating the surface of metallic substrate 42 which is concentrically disposed in the heating vessel 41. The measurement of only the heating temperature of outer wall of heating vessel 41 is not enough for achieving the aforementioned object. Namely, it is important to accurately measure the surface temperature of the metallic substrate 42 disposed in the heating vessel 41 and, based on this measurement, to strictly control the heating temperature of outer wall of heating vessel 41.

If the surface temperature of the metallic substrate 42 disposed in the heating vessel 41 is lower than 550° C. under the condition wherein hydrocarbon is being continuously and uniformly sprayed to the surface temperature of the metallic substrate 42, nanocarbon can be hardly formed. On the other hand, if the surface temperature of the metallic substrate 42 disposed in the heating vessel 41 is higher than 700° C., the soot of carbon is caused to generate, thereby making it difficult to produce the nanocarbon. For this reason, it is critically important for purpose of enhancing the efficiency of producing nanocarbon as well as for purpose of enhancing the purity of nanocarbon to accurately set the surface temperature of the metallic substrate 42 disposed in the heating vessel 41 to a range of 550° C. to 700° C. under the condition wherein hydrocarbon is being continuously and uniformly sprayed to the surface of the metallic substrate 42. Namely, the efficiency of producing nanocarbon as well as the purity of nanocarbon can be enhanced by accurately measuring the surface temperature of the metallic substrate 42 and, based on this measurement, by strictly controlling the temperature of the outer heating temperature of the heating vessel 41. By doing so, it is possible to continuously manufacture nanocarbon which is excellent in quality and high in purity.

According to the twenty-fourth embodiment, the nanocarbon producing apparatus is equipped with a surface thermometer 59 for measuring the surface temperature of the metallic substrate 42, thereby making it possible to accurately set the surface temperature of the metallic substrate 42 to a range of 550° C. to 700° C. under the condition where a gaseous metallic catalyst powder-mixed hydrocarbon is continuously or intermittently but uniformly sprayed to the metallic substrate. Accordingly, it is possible, through the strict control of the outer heating temperature of the heating vessel 41, to enhance the nanocarbon-producing efficiency and the purity of nanocarbon, thus making it possible to continuously manufacture nanocarbon which is excellent in quality and high in purity.

(Twenty-Fifth Embodiment)

FIG. 15 shows schematically a vertical type nanocarbon producing apparatus according to the twenty-fifth embodiment of the present invention. Herein, the same components as those of FIGS. 1, 8 and 12 are identified by the same reference numbers, thereby omitting the explanation thereof.

The nanocarbon producing apparatus according to the twenty-fifth embodiment is featured in that it is equipped with an electric heater 61 for heating the heating vessel 41 on the outside of the heating vessel 41, thereby making it possible to uniformly maintain the temperature inside the heating vessel 41. Incidentally, although not shown in FIG. 15 for the sake of convenience, it is also designed in the embodiment of FIG. 15 as in the case of FIG. 8 that a metallic catalyst powder-mixed hydrocarbon can be continuously or intermittently but uniformly sprayed from the supply header 45 to the surface of metallic substrate 42.

The twenty-fifth embodiment is featured in that it is equipped, on the outside thereof, with an electric heater 61 as a heating source. As a result, it is possible to keep the temperature inside the heating vessel 41. Accordingly, it is possible to enhance the nanocarbon-producing efficiency and the purity of nanocarbon. Therefore, it is possible to continuously manufacture nanocarbon which is excellent in quality and high in purity.

(Twenty-Sixth Embodiment)

FIG. 16 shows schematically a vertical type nanocarbon producing apparatus according to the twenty-sixth embodiment of the present invention. Herein, the same components as those of FIGS. 1, 8 and 12 are identified by the same reference numbers, thereby omitting the explanation thereof.

The nanocarbon producing apparatus according to the twenty-sixth embodiment is featured in that it is equipped with an upper damper 62 and a lower damper 63, both of which are disposed in the nanocarbon-discharging nozzle 47, so that nanocarbon can be brushed off out of the heating vessel while making it possible to keep the temperature as well as the reducing atmosphere inside the heating vessel 41. Incidentally, although not shown in FIG. 16 for the sake of convenience, it is also designed in the embodiment of FIG. 16 as in the case of FIG. 8 that a metallic catalyst powder-mixed hydrocarbon containing an acid component can be continuously or intermittently but uniformly sprayed from the supply header 45 to the surface of metallic substrate 42.

Namely, due to the provision of a rotary valve, etc. at a lower portion of the heating vessel 41, it is also possible, to stably discharge the nanocarbon product that has been dropped downward. In this case also, in order to enhance the sealing performance against the external atmosphere, a double damper comprising the upper and the lower dampers (the upper damper 62 and the lower damper 63) may be disposed below the heating vessel and a nanocarbon recovery vessel 48, etc. may be disposed below the double damper, thereby making it possible to recover nanocarbon.

The upper damper 62 and the lower damper 63 can be operated as follows. First of all, the upper damper 62 and the lower damper 63 are entirely closed. Then, the upper damper 62 is opened to thereby accumulate nanocarbon product in a space between the upper damper 62 and the lower damper 63. Subsequently, the upper damper 62 is entirely closed and then the lower damper 63 is opened. As a result, the nanocarbon product can be recovered under the condition where the interior of the nanocarbon producing apparatus 10 is separated from the nanocarbon recovery vessel 43. Further, in order to prevent the air inside the nanocarbon recovery vessel 43 from entering into the nanocarbon producing apparatus 10, an inert gas preferably intermittently injected into a space between the upper damper 62 and the lower damper 63. The layout and the operation thereof may be performed as described above, thereby making it possible to steadily discharge the nanocarbon product.

According to the nanocarbon producing apparatus of the twenty-sixth embodiment, since it is equipped with the upper damper 62 and the lower damper 63 at the nanocarbon product discharging nozzle 47, it is possible to obtain the nanocarbon producing apparatus 10 which is capable of stably and steadily perform the discharge of nanocarbon product from the heating vessel 41.

Although the mounting of a rotary valve is omitted in FIG. 16, a rotary valve may be mounted above or below a double damper comprising the upper and the lower dampers (the upper damper 41 and the lower damper 42).

Further, a reducing atmosphere in the interior of the heating vessel is required to be kept during the operation thereof, thus a sealing structure for sufficiently securing the air-tightness against the external atmosphere should be, of course, taken into account.

(Twenty-Seventh Embodiment)

FIG. 17 shows schematically a perspective view of the cone-shaped metallic substrate 42 to be used in the vertical type nanocarbon producing apparatus according to the twenty-seventh embodiment of the present invention. Herein, the same components as those of FIG. 8 are identified by the same reference numbers, thereby omitting the explanation thereof.

As shown in FIG. 17, the inclined angle θ of the metallic substrate 42 which is made of a high-purity iron plate (not less than 99.5% in purity) or a carbon steel containing iron is set to 30° relative to the horizontal direction. As described with reference to the eighth embodiment, this inclined angle θ is preferably confined to the range of 30° to 60°. The reason to confine the inclined angle θ to this range is the same as explained in the twenty-fourth embodiment.

According to the twenty-seventh embodiment, since a high-purity iron plate or a carbon steel containing iron is employed as a material for the metallic substrate 42, it is no longer required to employ nickel alloys or a noble metal such as platinum, thus making it possible to easily manufacture high-quality nanocarbon at a low cost. Further, since the product specification of the high-purity iron plate or of the carbon steel containing iron is standardized, high-quality nanocarbon always exhibiting stabilized purity and high stability can be easily and efficiently mass-produced at low cost.

As explained above, the nanocarbon (such as carbon nanotube, carbon fiber, carbon nanocoil, etc.) that has been grown to a certain thickness on the surface of metallic substrate is permitted to peel away and fall, due to its own weight, from the surface thereof and then permitted to pass through a lower portion of the nanocarbon producing apparatus and to discharge from the downstream region of the nanocarbon-producing furnace, thus making it possible to continuously manufacture nanocarbon. On the other hand, the nanocarbon that has failed to peel off and to gravitationally drop from the surface of metallic substrate 12 after the nanocarbon has been grown to a predetermined thickness on the surface of metallic substrate can be made to drop, at periodic intervals, to a region below the nanocarbon producing apparatus. It is possible in this manner to steadily discharge the nanocarbon product from the downstream side of the nanocarbon producing apparatus. Therefore, it is possible to effectively mass-produce high-quality nanocarbon which is high in purity and stability at a low cost.

(Twenty-Eighth Embodiment)

Figure 18A:
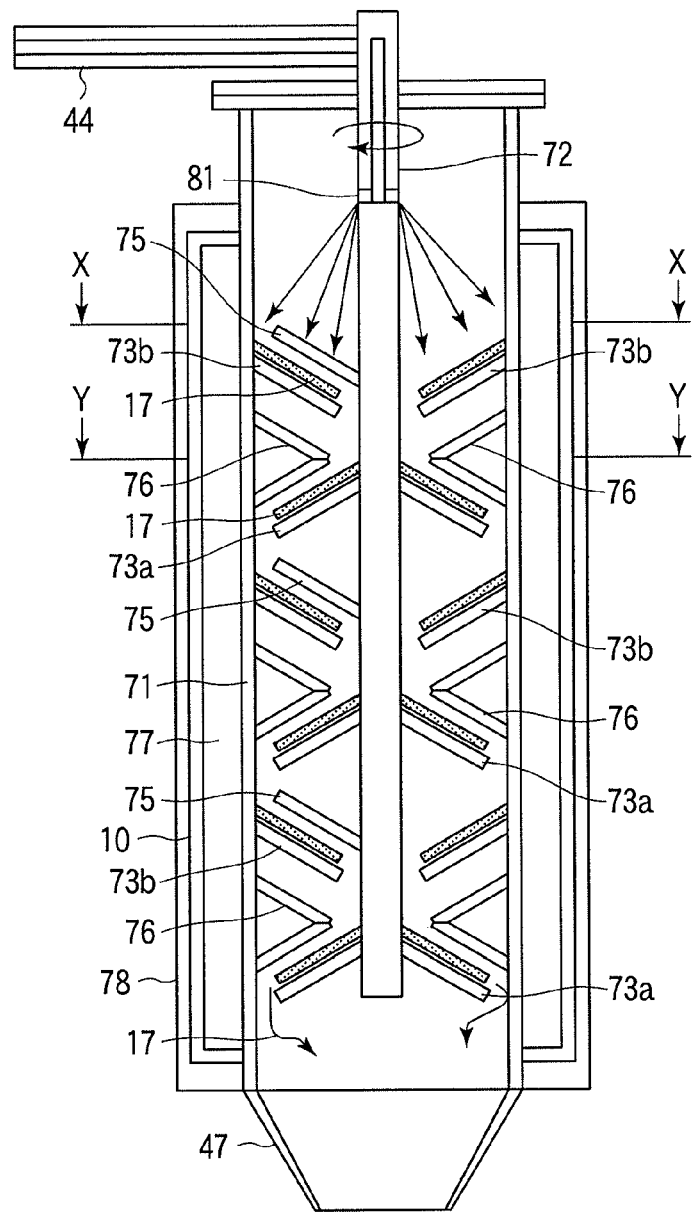
FIG. 18A is a diagram schematically illustrating the entire structure of a vertical type nanocarbon producing apparatus according to the twenty-eighth embodiment of the present invention.
Figure 18B:
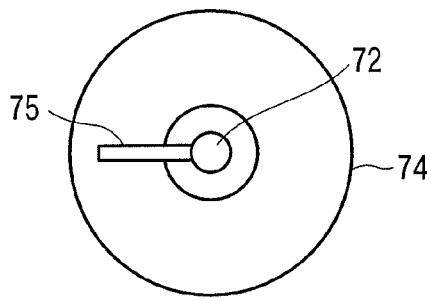
FIG. 18B is a cross-sectional view taken along the X-X line of FIG. 18A.
Figure 18C:
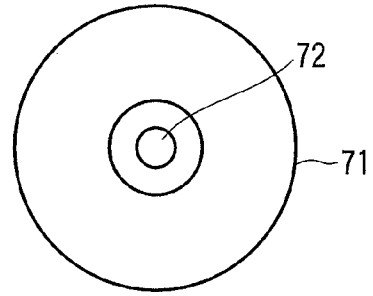
FIG. 18C is a cross-sectional view taken along the Y-Y line of FIG. 18A.

This embodiment will be explained with reference to FIG. 18A, FIG. 18B and FIG. 18C. Herein, FIG. 18A is a general view of the vertical type nanocarbon producing apparatus according to the twenty-eighth embodiment, FIG. 18B is a cross-sectional view taken along the X-X line of FIG. 18A, and FIG. 18C is a cross-sectional view taken along the Y-Y line of FIG. 18A. Herein, the same components as those of FIGS. 1 and 8 are identified by the same reference numbers, thereby omitting the explanation thereof.

The nanocarbon producing apparatus 10 is equipped with a vertical heating vessel (inner cylinder) 71 providing therein a reducing atmosphere. A scraper blade-rotating shaft (hereinafter referred to as a rotary shaft) 72 for the heating furnace, which is designed to be rotated about the central axis of the heating vessel 71 by means of a driving shaft-rotating motor is disposed inside the heating vessel 71. A plurality of cone-shaped plates 73a are fixed concentrically and in multistage to the rotary shaft 72 in such a manner that the surface thereof is inclined. A plurality of cone-shaped plates 73b are fixed in multistage to the inner wall of the heating vessel 71. Herein, the cone-shaped plates 73a and the cone-shaped plates 73b are alternately disposed from top or bottom. Further, the surface of cone-shaped plate 73a is declined downward from the rotary shaft 72 and the surface of cone-shaped plate 73b is declined downward from the inner wall of the heating vessel 71. Namely, the cone-shaped plates 73a are respectively extended downward from the rotary shaft 72, and the cone-shaped plates 73b are respectively extended downward from the inner wall of the heating vessel 71.

The rotary blades 75 for scraping away the nanocarbon product 17 are respectively attached to the rotary shaft 72 in such a manner that they are respectively positioned over each of the cone-shaped plates 73b. Cone-shaped fixed blades 76 for scraping away the nanocarbon product 17 are respectively attached to the inner wall of the heating vessel 71 in such a manner that they are respectively positioned over each of the cone-shaped plates 73a. On the outer circumference of the heating vessel 71 is disposed, as a heating source, a heating jacket 77 for heating the interior of the heating vessel. This heating jacket 77 is designed so as to utilize, as a heating source, the hot air obtained from the waste heat generated from installations or plants which are disposed on the outer circumference of the heating vessel 71. In order to insulate the inner temperature of the heating vessel 71, a heat insulating material 78 is arranged on the outside of the heating jacket 77.

As described above, the injection nozzle 44 for mixing and spraying hydrocarbon and a small quantity of metallic catalyst powder into the heating vessel 71 is disposed on the upstream side of the heating vessel 71. A discharge nozzle 47 for discharging the nanocarbon 17 that has been deposited on the cone-shaped plates 73a and 73b is disposed on the downstream side of the heating vessel 71. A spray nozzle 81 for spraying a metallic catalyst powder-mixed hydrocarbon is disposed at an upper portion of the rotary shaft 72. This spray nozzle 81 is connected with the injection nozzle 44.

Next, the operation of the nanocarbon producing apparatus which is constructed as described above will be explained.

A metallic catalyst powder-mixed hydrocarbon is continuously or intermittently sprayed from the injection nozzle 44 through the spray nozzle 81. As a result, the reaction of the metallic catalyst powder-mixed hydrocarbon is caused to take place on the cone-shaped plates 73a and 73b disposed in the heating vessel 71 of the nanocarbon producing apparatus 10 or on the inner wall of the heating vessel 71, resulting in the growth of nanocarbon 17. Since the reaction of the metallic catalyst powder-mixed hydrocarbon is caused to take place on the cone-shaped plates 73a and 73b disposed in the heating vessel 71 of the nanocarbon producing apparatus 10 or on the inner wall of the heating vessel 71, it is possible to synthesize the nanocarbon 17 in large quantities within a short period of time. As the nanocarbon 17 grows, the metallic fine particles reacted are caused to peel off and slightly separate from the surface of the cone-shaped plates 73a and 73b. Then, to the metallic fine particles thus separated, nanocarbon is additionally precipitated and permitted to grow. By repeating these phenomena, the nanocarbon is acceleratingly formed and grown, thereby making it possible to synthesize highly pure nanocarbon in large quantities.

On this occasion, the quantity of the metallic fine particles to be peeled off from the surfaces of cone-shaped plates 73a and 73b or the quantity of the metallic fine particles to be contained in the nanocarbon is very small. Therefore, by making of the metallic fine particles contained in the sprayed metallic catalyst powder-mixed hydrocarbon as a core, hydrocarbon is permitted to react with the metallic fine particles existing on the surface of metallic substrate, thereby making it possible to continuously repeat the formation and growth of nanocarbon. Therefore, when the metallic catalyst powder-mixed hydrocarbon is continuously sprayed, through the spray nozzle 81, from the injecting nozzle 44 disposed at an upper portion of the nanocarbon producing apparatus 10, the reaction of hydrocarbon is caused to take place repeatedly in the nanocarbon producing apparatus on the cone-shaped plates 73a and 73b, thereby continuously and repeatedly enabling to produce and grow the nanocarbon.

Namely, the catalytic particles constituting the catalytic fine metal powder act as a core in the nanocarbon producing apparatus 10, on the cylindrical vessel disposed on the inner wall of the heating vessel 71 and on the cone-shaped plates 73a and 73b disposed in the heating vessel. The catalytic particles acting as a core are caused to react with the sprayed metallic catalyst powder-mixed hydrocarbon under high temperatures, thus enabling nanocarbon to deposit and grow by way of vapor phase deposition. The inner wall of the nanocarbon producing apparatus 10 is uniformly heated and, at the same time, the hydrocarbon is also uniformly sprayed. Accordingly, nanocarbon can be continuously and stably manufactured for a long period of time by simply feeding a metallic catalyst powder-mixed hydrocarbon without requiring the employment of a special kind of metallic substrate.

Meanwhile, the cone-shaped plates 73a and the rotary blades 75 are fixed to the rotary shaft 72. Therefore, the nanocarbon that has been grown on the cone-shaped plates 73a can be scraped away by the fixed blades 76 as the rotary shaft 72 is rotated. Further, the nanocarbon that has been grown on the cone-shaped plates 73b can be scraped away from the rotary blades 75 as the rotary shaft 72 is rotated. Therefore, these nanocarbons thus scraped are respectively permitted to flow downward.

Incidentally, it is also possible to provide the cone-shaped plates 73a and 73b with a catalytic function in themselves. For example, the cone-shaped plates 73a and 73b may be formed by making use of iron as a material thereof, thereby furnishing these cone-shaped plates 73a and 73b with a catalytic function. In the present invention however, the injection nozzle 79 for spraying a mixture comprising hydrocarbon and a very small quantity of catalytic fine metal powder into the heating vessel 71 is disposed on the upstream side of the heating vessel 71, so that a metallic catalyst powder-mixed hydrocarbon containing catalytic fine metal powder can be injected from the injection nozzle 79. Thus, the hydrocarbon to be injected is already mixed with a very small quantity of catalytic fine metal powder. Therefore, these cone-shaped plates 73a and 73b are not always required to be provided with catalytic function.

As for the content of the catalytic fine metal powder to be contained in the metallic catalyst powder-mixed hydrocarbon, it may be very small and sufficient to provide it with the function of core for the formation of nanocarbon. As compared with the quantity of hydrocarbon, the amount of the catalytic fine metal powder can be confined to a very small level. On the occasion of mixing catalytic fine metal powder with hydrocarbon which is in a state of liquid, a very small amount of catalytic fine metal powder is poured into a liquid hydrocarbon and then agitated. With respect to the quantity of the catalytic fine metal powder to be mixed with hydrocarbon, the ratio of the catalytic fine metal powder to the hydrocarbon may be confined to a level as small as 1/100,000~1/10,000,000 or so.

Especially when the hydrocarbon is liquid, it is only required to pour a very small quantity of the catalytic fine metal powder into a vessel of hydrocarbon and to uniformly agitate the resultant mixture.

Incidentally, when the quantity of the metallic catalyst powder to be incorporated is made larger, it may be possible to increase the rate of producing nanocarbon. In this case however, the ratio of catalytic fine metal powder to be contained in the nanocarbon product will be increased, thereby raising the problem that the purity of the nanocarbon may be locally lowered. For this reason, it is preferable to decrease the content of the catalytic fine metal powder as much as possible to thereby create nanocarbon containing scarcely any catalytic fine metal powder and exhibiting high purity. Namely, it is important to determine an optimum ratio of catalytic fine metal powder while taking into consideration the combination of the kind of hydrocarbon raw material and the kind of catalytic fine metal powder to be incorporated.

As explained above, the material for the cone-shaped plates 73a and 73b is not required to have in itself the catalytic function and only required to be formed of a material having heat resistance, have more or less smooth surface and be resistant to thermal deformation. Namely, the nanocarbon can be steadily produced by simply supplying the metallic catalyst powder-mixed hydrocarbon.

As described above, this twenty-eight embodiment is featured in that it comprises a heating vessel 71, a heating jacket 77 disposed on the outer circumference of the heating vessel 71, the injection nozzle 79 disposed at an upper portion of the heating vessel 71 and designed to spray a metallic catalyst powder-mixed hydrocarbon into the heating vessel 71, and a discharge nozzle 47 disposed on the downstream side of the heating vessel 71. In this case, the metallic catalyst powder-mixed hydrocarbon is continuously sprayed, through the injection nozzle 79 and the spray nozzle 81, into the heating vessel 71, thereby enabling the reaction thereof to take place to grow nanocarbon in the heating vessel 71. The nanocarbon product thus grown can be discharged from the discharge nozzle 47. Therefore, it is possible to effectively mass-produce high-quality nanocarbon which is high in purity and stability at a low cost.

In the embodiment shown in FIG. 18, the cone-shaped plates 73a and 73b are arranged in multi-stages in the heating vessel 71 in such a manner that while the cone-shaped plates 73a are extended obliquely downward in an outward direction, the cone-shaped plates 73b are extended obliquely downward in an inward direction, thereby creating a staggered flow passage for the hydrocarbon/catalytic mixing and spraying liquid. Therefore, the nanocarbon that has been formed on and separated from the surfaces of cone-shaped plates 73a and 73b is permitted to gravitationally fall or made to fall by the rotation of the rotary shaft 72 toward the downstream side of the heating vessel 71. The nanocarbon thus flowing downward is discharged from the discharge nozzle 47 disposed on the downstream side of the heating vessel 71.

In the twenty-eighth embodiment, the employment of the heating jacket 77 is explained wherein the hot air obtained from the waste heat generated from installations or plants is utilized, as a heating source. However, it is also possible to utilize an electric heater which is capable of utilizing, as a heating source, the electricity to be generated by taking advantage of the waste heat derived from installations or plants for example. By doing so, it may become possible to improve the efficiency of the nanocarbon producing apparatus as a whole or the efficiency of the system as a whole.

Further, the nanocarbon producing apparatus may be designed so as to optimize the flow rate of hydrocarbon being sprayed through the injection nozzle 79 from the spray nozzle 81 for the formation of nanocarbon. Specifically, a flow meter and a flow rate-controlling valve may be optionally attached to a hydrocarbon supply pipe which is connected with a hydrocarbon header, thereby making it possible to control the spray rate of hydrocarbon.

The metallic catalyst powder-mixed hydrocarbon to be continuously sprayed from the injection nozzle 44 disposed on the upstream side of the heating vessel 71 may not be required to be continuously sprayed. Rather, the intermittent spray of hydrocarbon is more advantageous in enhancing the producing efficiency of nanocarbon. The reason is that the timing of not spraying the metallic catalyst powder-mixed hydrocarbon from above is more advantageous in promoting the peeling of metallic powder from the cone-shaped plates 73a and 73b. Therefore, it is preferable to suitably adjust the various factors such as the periodical intervals of spraying the metallic catalyst powder-mixed hydrocarbon, the timing of not spraying the metallic catalyst powder-mixed hydrocarbon, the spraying volume of the metallic catalyst powder-mixed hydrocarbon, the mixing ratio between the metallic catalyst powder and the hydrocarbon, etc. while taking into account the features of growth of nanocarbon on the surfaces of cone-shaped plates 73a and 73b, the volume and features of nanocarbon falling downward from the heating vessel 71, etc.

Furthermore, in the case of the FIG. 18, the nanocarbon-forming apparatus is constructed as a vertical system, wherein the injection nozzle and the inert gas injection nozzle is disposed at an upper portion of the system and the discharge nozzle is disposed at a lower portion of the system. However, they may be constructed as a horizontal system or an obliquely mounted system, wherein the metallic substrate can be disposed in contact with the inner wall of a concentrical inner cylinder to be heated by a heating jacket and installed in the nanocarbon producing apparatus provides a reducing atmosphere therein. By suitably designing the discharging system for the nanocarbon product, it becomes possible to efficiently and continuously manufacture nanocarbon.

(Twenty-Ninth Embodiment)

Figure 19:
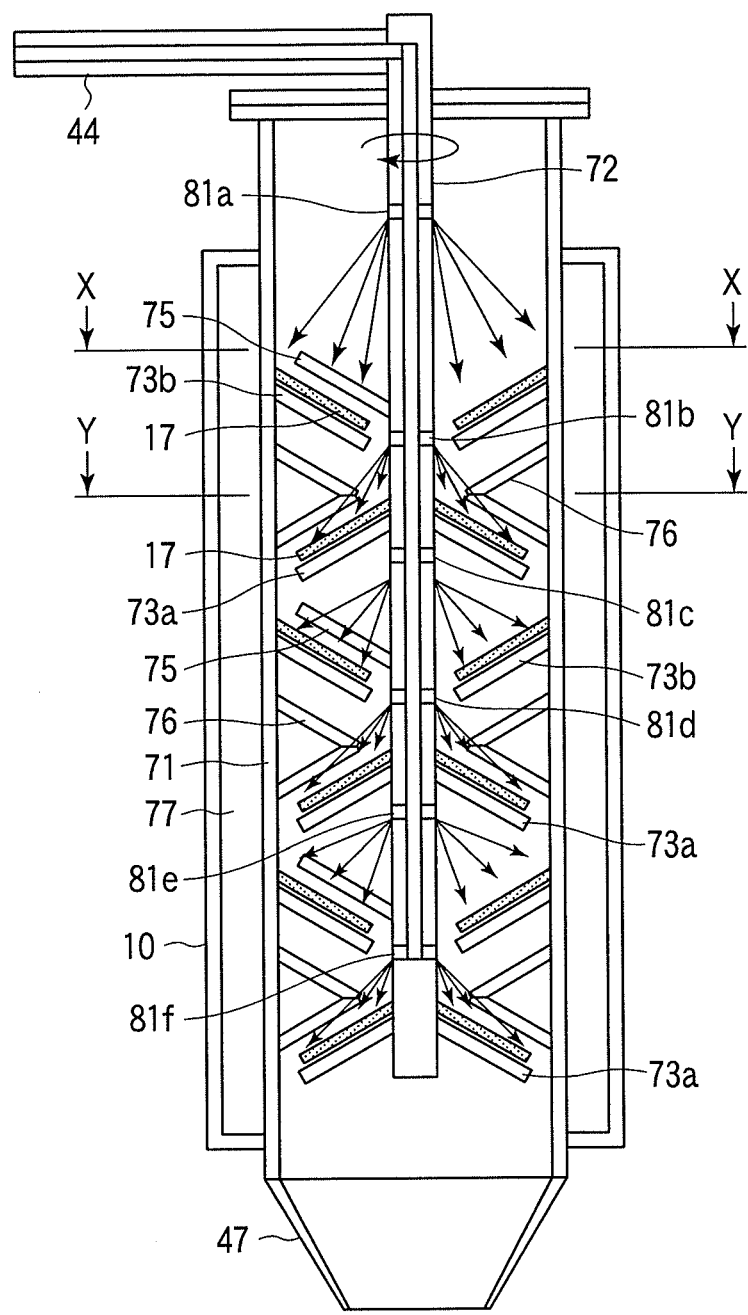
FIG. 19 is a diagram schematically illustrating a vertical type nanocarbon producing apparatus according to the twenty-ninth embodiment of the present invention.

This embodiment will be explained with reference to FIG. 19. Herein, FIG. 19 schematically shows the vertical type nanocarbon producing apparatus according to the twenty-ninth embodiment. Herein, a cross-sectional view taken along the X-X line of FIG. 19 is shown in FIG. 18B, and a cross-sectional view taken along the Y-Y line of FIG. 19 is shown in FIG. 18C. Therefore, the cross-sectional views along these lines are omitted herein. Further, the same components as those of FIG. 18 are identified by the same reference numbers, thereby omitting the explanation thereof.

In the embodiment shown in FIG. 19, the rotary shaft 72 is a hollow shaft. Therefore, a plurality of spray nozzles 81$a$, 81$b$, 81$c$, 81$d$, 81$e$ and 81$f$ are secured to the rotary shaft 72. The hydrocarbon containing a very small amount of metallic catalyst powder can be injected from the injection nozzle 44 and permitted to pass through the rotary shaft 72, so that the hydrocarbon containing metallic catalyst powder can be continuously or intermittently delivered to these spray nozzles 81$a$-81$f$ from which the hydrocarbon containing metallic catalyst powder can be sprayed to a plurality of cone-shaped plates 73$a$ and 73$b$.

The hydrocarbon containing a very small amount of metallic catalyst powder that has been continuously or intermittently sprayed from a plurality of spray nozzles 81$a$-81$f$ is reacted on the surfaces of cone-shaped plates 73$a$ and 73$b$, thereby creating and growing nanocarbon thereon. In the same manner as explained with reference to the twenty-eighth embodiment, the hydrocarbon containing a very small amount of metallic catalyst powder is continuously or intermittently injected from the injection nozzle 44 and permitted to react on the surfaces of cone-shaped plates 73$a$ and 73$b$, thereby enabling nanocarbon to grow with the catalytic fine metal powder being utilized as a core. The nanocarbon product 17 thus grown is peeled away from each of the cone-shaped plates 73$a$ and 73$b$ through the rotation of the rotary shaft 72. The nanocarbon product 17 thus peeled is discharged from the discharge nozzle 47 disposed on the downstream side of the apparatus.

Meanwhile, the cone-shaped plates 73$a$ and the rotary blades 75 are respectively fixed to the rotary shaft 72. Therefore, the nanocarbon that has been grown on the cone-shaped plates 73$a$ can be scraped and peeled away by the fixed blades 76 as the rotary shaft 72 is rotated and allowed to flow toward the downstream side of the apparatus. Further, the nanocarbon that has been grown on the cone-shaped plates 73$b$ can be scraped and peeled away from the rotary blades 75 as the rotary shaft 72 is rotated and allowed to flow toward the downstream side of the apparatus.

According to the twenty-ninth embodiment, the hydrocarbon containing a very small amount of metallic catalyst powder is directly sprayed to the surface of each of the cone-shaped plates 73$a$ and 73$b$ under the same conditions. Therefore, it is possible to continuously and more effectively manufacture high-quality nanocarbon and, at the same time, the nanocarbon thus grown on the surface of each of multiple metal substrates can be steadily discharged from the downstream side of the heating vessel. Further, the metallic catalyst powder-mixed hydrocarbon containing the catalytic fine metal powder can be continuously or intermittently sprayed to the surfaces of cone-shaped plates 73$a$ and 73$b$ under optimum conditions. Therefore, high-quality nanocarbon can be manufactured more at a higher rate.

(Thirtieth Embodiment)

Figure 20:
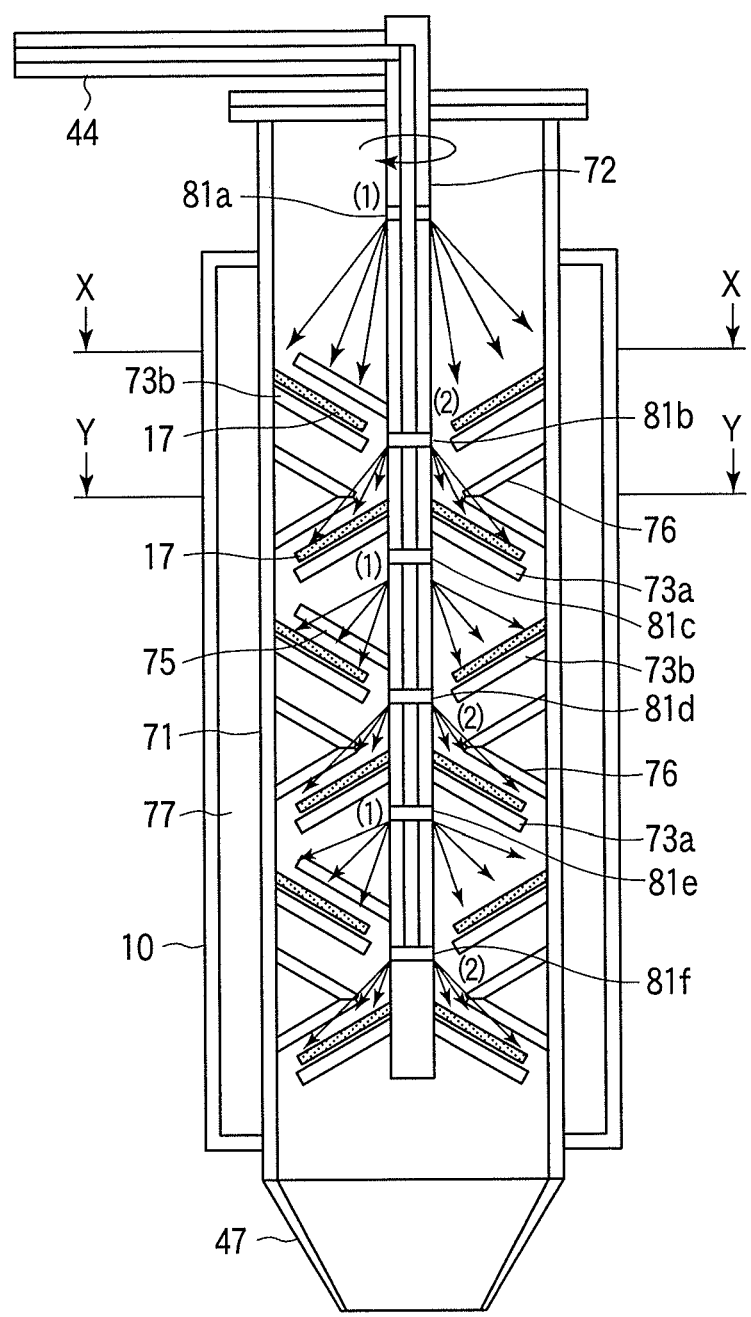
FIG. 20 is a diagram schematically illustrating a vertical type nanocarbon producing apparatus according to the thirtieth embodiment of the present invention.

This embodiment will be explained with reference to FIG. 20. Herein, FIG. 20 schematically shows the vertical type nanocarbon producing apparatus according to the thirtieth embodiment. Herein, a cross-sectional view taken along the X-X line of FIG. 20 is shown in FIG. 18B, and a cross-sectional view taken along the Y-Y line of FIG. 20 is shown in FIG. 18C. Therefore, the cross-sectional views along these lines are omitted herein. Further, the same components as those of FIGS. 18 and 19 are identified by the same reference numbers, thereby omitting the explanation thereof.

In the embodiment shown in FIG. 20, the sprayers 21 (21$a$-21$f$) are arranged in a mechanism in such a manner that the position of intermittently spraying the catalyst-mixed hydrocarbon to the surfaces of cone-shaped plates 73$a$ and 73$b$ disposed in multi-stages can be changed successively. This mechanism is designed such that at the time of performing the spray of the group (1) of FIG. 20, the spray of the group (2) of FIG. 20 is suspended, and that at the time of performing the spray of the group (2) of FIG. 20, the spray of the group (1) of FIG. 20 is suspended. In the case of FIG. 20, the intermittent spray of the metallic catalyst powder-mixed hydrocarbon to the surface of each of the cone-shaped plates 73$a$ and 73$b$ which are arranged in a staggered manner and inclined upward and downward can be performed as follows. Namely, in the first spray, the spray is performed from the sprayers 21$a$, 21$c$ and 21$e$ (the position of group (1) in FIG. 20) to the surfaces of the downwardly declined cone-shaped plates 73$b$. In the second spray, the spray is performed from the sprayers 21$b$, 21$d$ and 21$f$ (the position of group (2) in FIG. 20) to the surfaces of the upwardly inclined cone-shaped plates 73$a$. Then, in the third spray, the spray is performed, as in the case of the first spray, from the sprayers 21$a$, 21$c$ and 21$e$ (the position of group (1) in FIG. 20) to the surfaces of the downwardly declined cone-shaped plates 73$b$. In this manner, the spray is performed alternately.

In the case of the thirtieth embodiment, the hydrocarbon containing a very small amount of metallic catalyst powder is not sprayed directly and simultaneously to the surface of each of the cone-shaped plates 73$a$ and 73$b$ under the same conditions. Namely, the timing of directly spraying the hydrocarbon containing metallic catalyst powder is shifted in such a manner that by taking into account the timing of scraping the nanocarbon after the nanocarbon has been grown to a certain extent on each of the metallic substrates, the timing of the direct spraying to the cone-shaped plates 73$a$ and 73$b$ is staggered. Accordingly, the growth of nanocarbon on each of the cone-shaped plates 73$a$ and 73$b$ can be efficiently promoted, thus making it possible to continuously manufacture high-quality nanocarbon. Further, the nanocarbon thus grown on each of the cone-shaped plates 73$a$ and 73$b$ can be steadily discharged from the downstream side of the heating vessel 71. Further, the metallic catalyst powder-mixed hydrocarbon containing catalytic fine metal powder can be continuously or intermittently sprayed under optimal conditions to the surface of each of the cone-shaped plates 73$a$ and 73$b$. As a result, it is possible to manufacture high-quality nanocarbon more at a higher rate.

(Thirty-First Embodiment)

Figure 21A:
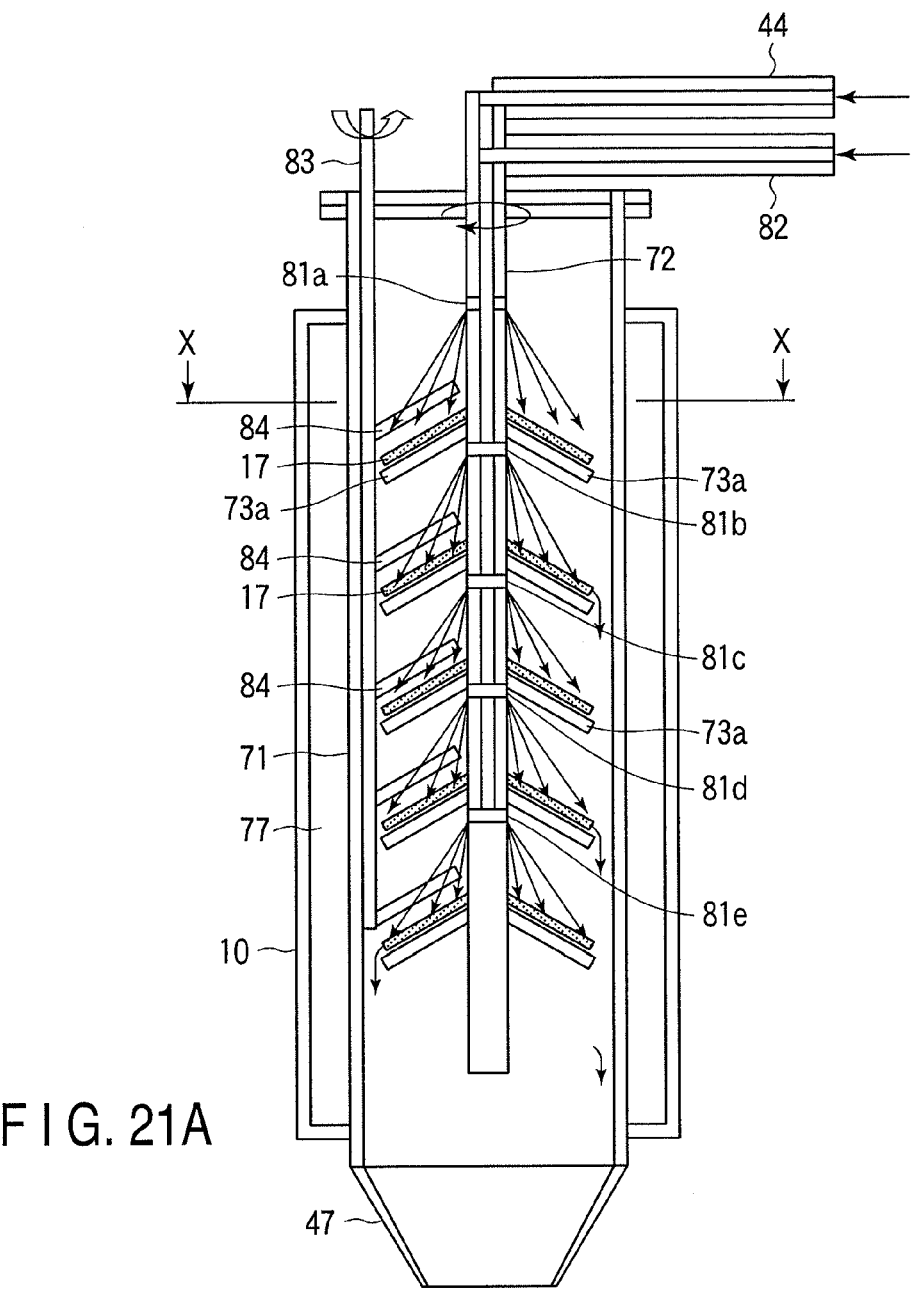
FIG. 21A is a diagram schematically illustrating the entire structure of a vertical type nanocarbon producing apparatus according to the thirty-first embodiment of the present invention.
Figure 21B:
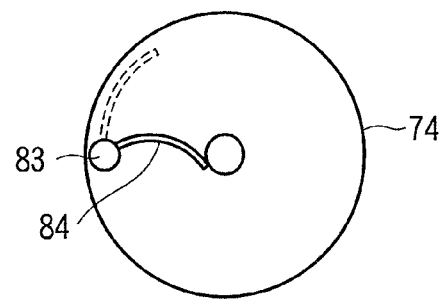
FIG. 21B is a cross-sectional view taken along the X-X line of FIG. 21A.

This embodiment will be explained with reference to FIGS. 21A and 21B. Herein, FIG. 21A schematically shows the vertical type nanocarbon producing apparatus according to the thirty-first embodiment. Herein, a cross-sectional view taken along the X-X line of FIG. 21A is shown in FIG. 21B. Further, the same components as those of FIGS. 18~21 are identified by the same reference numbers, thereby omitting the explanation thereof.

The reference number 82 in these FIGS. represents an inert gas injection nozzle (inert gas supply means) for feeding an inert gas into the rotary shaft 72. Blade-rotating rod 83 is disposed along the inner wall of the heating vessel 71. Scraper blades 84 for scraping away the nanocarbon that has been deposited on this blade-rotating rod 83 are fixed to the blade-rotating rod 83. Herein, the blade-rotating rod 83 can be rotated in such a manner that the distal end of the scraper blade 84 can be moved from a region close to the rotary shaft 72 to a region close to the inner wall of heating vessel 71. The scraper blades 84 are disposed almost in parallel with the cone-shaped plates 73a. Incidentally, the blade-rotating rod 83 and the scraper blades 84 are integrally referred to as a scraping mechanism.

The thirty-first embodiment is featured in that an inert gas is intermittently sprayed from the inert gas injection nozzle 82 at the moment when nanocarbon has been grown on each of the cone-shaped plates 73a, thus making it possible to change the flow rate and the spraying direction. Therefore, it is possible to safely and steadily scrape away the nanocarbon product existing on the surfaces of cone-shaped plates 73a and to discharge it from the discharge nozzle 47 disposed on the downstream side of the apparatus.

(Thirty-Second Embodiment)

Figure 22:
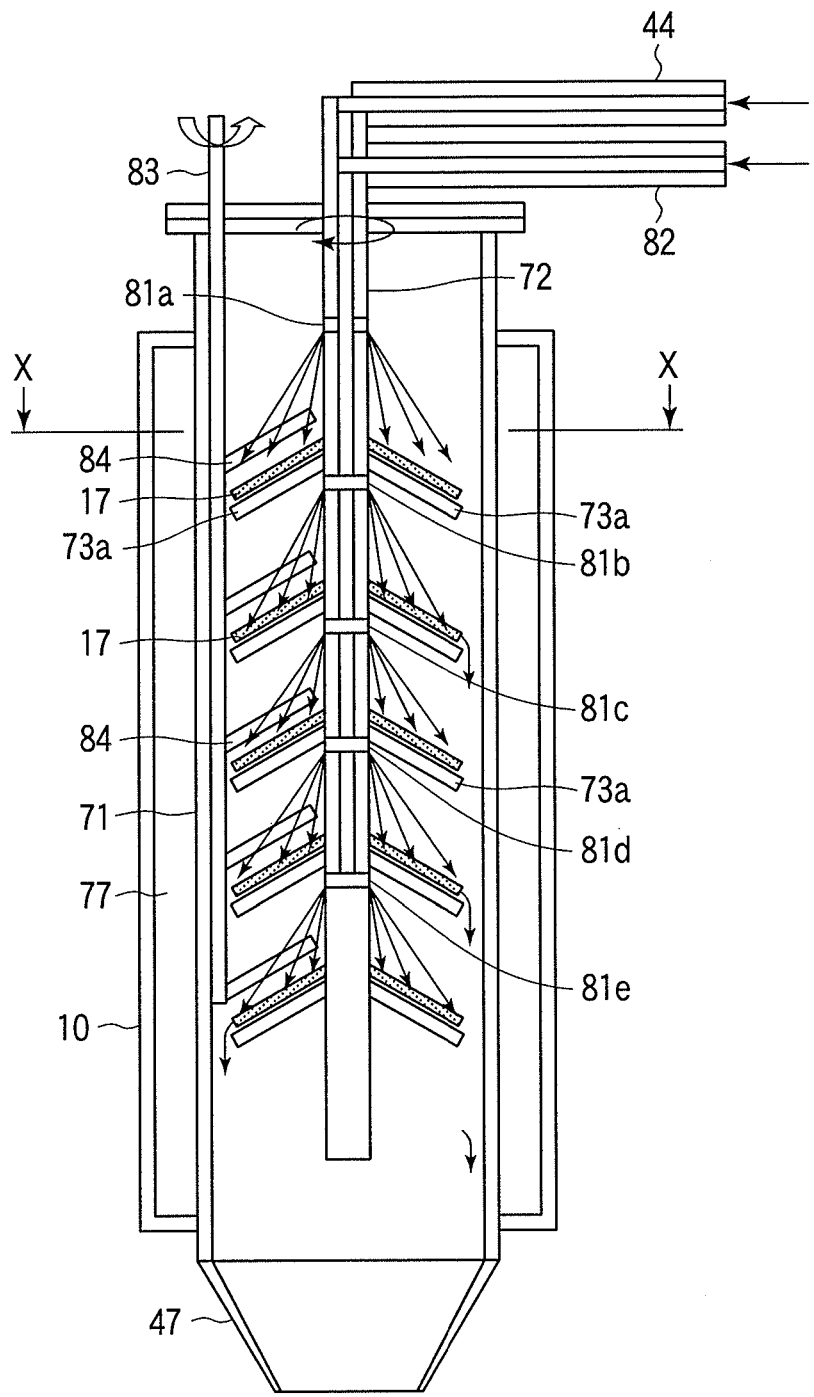
FIG. 22 is a diagram schematically illustrating a vertical type nanocarbon producing apparatus according to the thirty-second embodiment of the present invention.

This embodiment will be explained with reference to FIG. 22. Herein, FIG. 22 schematically shows the vertical type nanocarbon producing apparatus according to the thirty-second embodiment. Herein, a cross-sectional view taken along the X-X line of FIG. 22 corresponds to FIG. 21B. Therefore, the cross-sectional view along the X-X line is omitted herein. Further, the same components as those of FIGS. 18-21 are identified by the same reference numbers, thereby omitting the explanation thereof.

In the nanocarbon producing apparatus shown in FIG. 22, the inert gas injection nozzle 82 is designed such that the position of intermittently spraying the inert gas to the surfaces of cone-shaped plates 73a disposed in multi-stages can be changed successively. Namely, in the first spray, the spray is performed from the spray nozzles 81a, 81c and 81e to the surfaces of the cone-shaped plates 73a. In the second spray, the spray is performed from the spray nozzles 81b and 81d to the surfaces of the cone-shaped plates 73a. Then, in the third spray, the spray is performed, as in the case of the first spray, from the spray nozzles 81a, 81c and 81e to the surfaces of the cone-shaped plates 73a. In this manner, the spray is performed alternately.

In the case of the thirty-second embodiment, the inert gas is not sprayed directly and simultaneously to the surface of each of the cone-shaped plates 73a. Namely, the timing of directly spraying the inert gas is shifted in such a manner that by taking into account the timing of scraping the nanocarbon after the nanocarbon has been grown to a certain extent on each of the metallic substrates, the timing of the direct spraying to the surfaces of cone-shaped plates 73a is staggered. Accordingly, the growth of nanocarbon on each of the cone-shaped plates 73a can be efficiently promoted, thus making it possible to continuously manufacture high-quality nanocarbon. Further, the nanocarbon thus grown on each of the cone-shaped plates 73a can be steadily discharged from the downstream side of the heating vessel 71. Further, the inert gas can be sprayed under optimal conditions to the surface of each of the cone-shaped plates 73a. As a result, it is possible to manufacture high-quality nanocarbon more effectively.

(Thirty-Third Embodiment)

This embodiment will be explained with reference to FIG. 23. Herein, FIG. 23 schematically shows the vertical type nanocarbon producing apparatus according to the thirty-third embodiment. Herein, a cross-sectional view taken along the X-X line of FIG. 23 corresponds to FIG. 21B. Therefore, the cross-sectional view along the X-X line is omitted herein. Further, the same components as those of FIGS. 18-22 are identified by the same reference numbers, thereby omitting the explanation thereof.

In the nanocarbon producing apparatus shown in FIG. 23, a scraping mechanism (herein, nanocarbon product-scraping blades 84) for scraping away the nanocarbon deposited on the surfaces of the aforementioned multiple metal substrates is disposed in the heating vessel, thereby making it possible to scrape away the nanocarbon that has been grown on the surface of each of the cone-shaped plates 73a by making use of these scraping blades 84.

According to this thirty-third embodiment, when nanocarbon has been grown to a certain extent on each of the cone-shaped plates 73a, the grown nanocarbon is efficiently scraped away by making use of these scraping blades 84. Incidentally, in the case of FIG. 23, the scraping blades 84 are rotated about the central axis of the blade-rotating shaft 83. Herein, as each of the cone-shaped plates 73a is rotated slowly, grown nanocarbon is scraped and permitted to fall by the scraping blades 84 which are disposed so as not to directly contact with each of the cone-shaped plates 73a, thereby making it possible to steadily scrape away the deposited and grown nanocarbon. Since nanocarbon is enabled to freshly and continuously grow from the root portion of nanocarbon after the scraping operation of nanocarbon, it is now possible to efficiently manufacture high-quality nanocarbon.

(Thirty-Fourth Embodiment)

This embodiment will be explained with reference to FIG. 24. Herein, FIG. 24 schematically shows the vertical type nanocarbon producing apparatus according to the thirty-fourth embodiment. Herein, a cross-sectional view taken along the X-X line of FIG. 24 corresponds to FIG. 21B. Therefore, the cross-sectional view along the X-X line is omitted herein. Further, the same components as those of FIGS. 18-23 are identified by the same reference numbers, thereby omitting the explanation thereof.

In the nanocarbon producing apparatus shown in FIG. 24, the angle of inclination of each of the cone-shaped plates 73a that have been disposed in multi-stages is made adjustable, thereby making it possible to adjust the flow down rate of the nanocarbon product as well as the timing thereof. The dashed line portions 73' in FIG. 24 illustrates a state wherein the cone-shaped plates 73a are sharply inclined as compared with the solid line portion.

According to this thirty-fourth embodiment, the angle of inclination of each of the cone-shaped plates 73a is enabled to be adjusted during the operation of apparatus so as to enable the metallic catalyst powder-mixed hydrocarbon containing catalytic fine metal powder to fall down to the surface of each of the cone-shaped plates 73a under optimal conditions. Therefore, it is now possible to easily obtain an optimal growing rate of nanocarbon and also to adjust the flow down rate of the nanocarbon product as well as the timing thereof. Accordingly, it becomes possible to quite easily obtain the optimal growing rate of nanocarbon.

Furthermore, since it is possible to adjust the angle of inclination of each of the cone-shaped plates 73a at the moment when nanocarbon has been grown to a certain extent on the surface of each of the cone-shaped plates 73a, nanocarbon is enabled to freshly and continuously grow from the root portion of nanocarbon after the scraping operation of nanocarbon, thereby making it possible to efficiently manufacture high-quality nanocarbon.

(Thirty-Fifth Embodiment)

This embodiment will be explained with reference to FIG. 25A, FIG. 25B and FIG. 25C. Herein, FIG. 25A is a general view of the vertical type nanocarbon producing apparatus according to the thirty-fifth embodiment, FIG. 25B is a cross-sectional view taken along the X-X line of FIG. 25A, and FIG. 25C is a cross-sectional view taken along the Y-Y line of FIG. 25A. Herein, the same components as those of FIGS. 1~24 are identified by the same reference numbers, thereby omitting the explanation thereof.

The nanocarbon producing apparatus shown in FIG. 25 is constructed such that each of the cone-shaped plates 73a that have been disposed in multi-stages is provided with a cut-out portion 85, thereby enabling grown nanocarbon deposited on the surface of each of the cone-shaped plates 73a to fall through this cut-out portion 85. Incidentally, this cut-out portion 85 is formed to face the rotary shaft 72 in the case of the cone-shaped plate 73a and to face the inner wall of the heating vessel 71 in the case of the cone-shaped plate 73b, these cut-out portions 85 formed in the cone-shaped plate 73a and in the cone-shaped plate 73b being aligned with each other along the axial direction of the rotary shaft 72.

According to this thirty-fifth embodiment, when nanocarbon has been grown to a certain extent on each of the cone-shaped plates 73a and 73b, the grown nanocarbon is scraped away by making use of the fixed blades 76. Herein, the nanocarbon that has been grown on each of the cone-shaped plates 73a and 73b is scraped away by making use of the fixed blades 76 and then the nanocarbon product thus scraped away is permitted to pass through the cut-out portions 85 and to flow downward. Therefore, the grown nanocarbon is prevented from remaining on each of the cone-shaped plates 73a and 73b, thus making it possible to flow downward from each of the metallic substrates.

Incidentally, in the case of the embodiment shown in FIG. 25, the rotary shaft 72 is mounted at the center of the nanocarbon producing apparatus 10 and is enabled to rotate about this rotary shaft 72. Herein, as each of the cone-shaped plates 73a and 73b is rotated slowly, grown nanocarbon is steadily scraped and permitted to fall by making use of the fixed blades 76 which are disposed so as not to directly contact with each of the cone-shaped plates 73a and 73b, thereby making it possible to steadily scrape away the deposited and grown nanocarbon. Since nanocarbon is enabled to freshly and continuously grow from the root portion of nanocarbon after the scraping operation of nanocarbon, it is now possible to efficiently manufacture high-quality nanocarbon.

Incidentally, in this thirty-fifth embodiment, the cut-out portion 85 formed in each of the cone-shaped plates 73a (or 73b) is illustrated as being arranged so as to overlap with each other along the axis of the rotary shaft 72. However, the position of the cut-out portion 85 may not be restricted to such an embodiment but may be formed so as to off-set each other in the inner circumferential direction of the heating vessel for example. Further, the cut-out portion 85 may be formed only in the cone-shaped plates 73a or in the cone-shaped plates 73b.

(Thirty-Sixth Embodiment)

Figure 26:
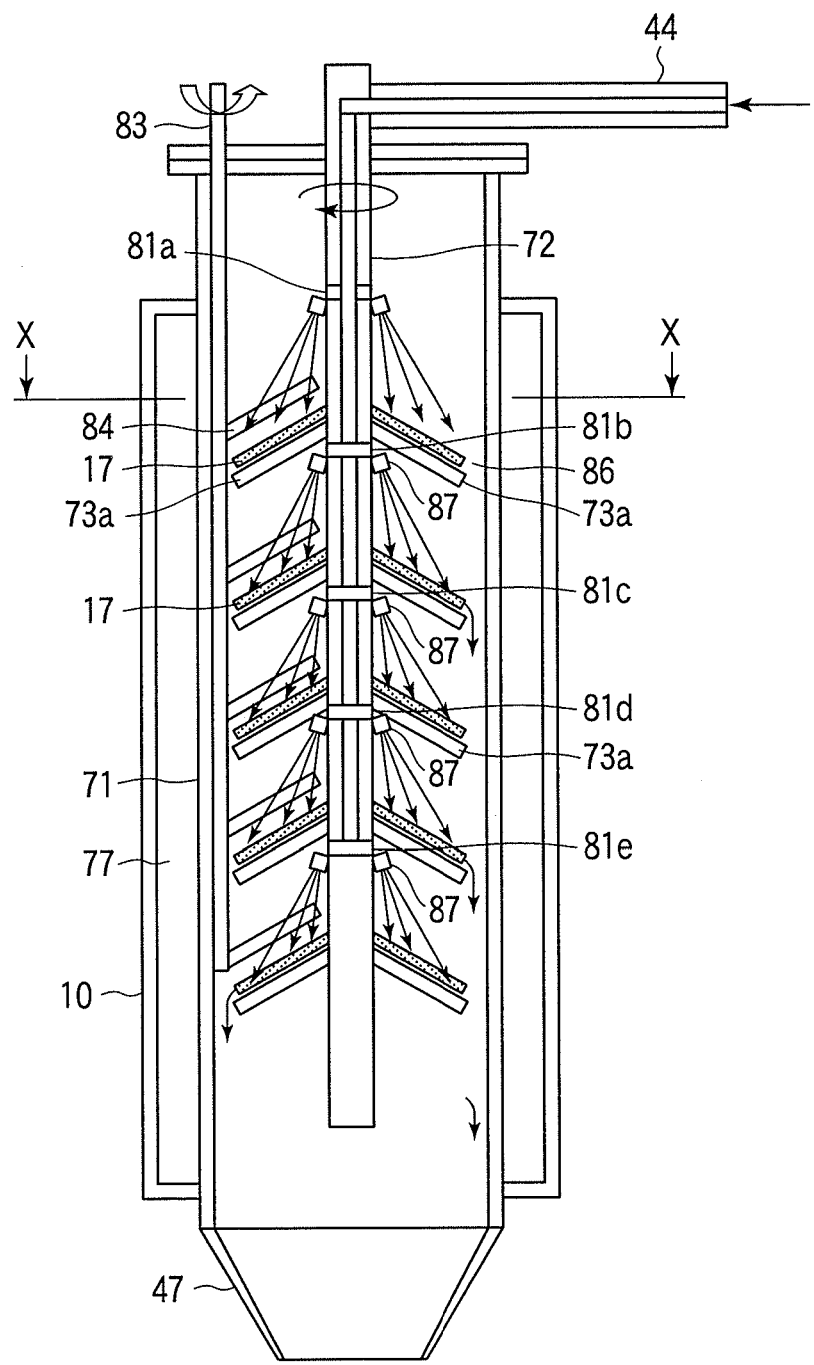
FIG. 26 is a diagram schematically illustrating the entire structure of a vertical type nanocarbon producing apparatus according to the thirty-sixth, the thirty-seventh and the thirty eighth embodiment of the present invention.

This embodiment will be explained with reference to FIG. 26. Herein, FIG. 26 schematically shows the vertical type nanocarbon producing apparatus according to the thirty-sixth embodiment. Herein, a cross-sectional view taken along the X-X line of FIG. 26 corresponds to FIG. 21B. Therefore, the cross-sectional view along the X-X line is omitted herein. Further, the same components as those of FIGS. 18-25 are identified by the same reference numbers, thereby omitting the explanation thereof.

In the nanocarbon producing apparatus shown in FIG. 26, a space 86 is provided between each of heating vessels 71 and each of the cone-shaped plates 73a disposed in multi-stages, thereby enabling a catalyst-mixed hydrocarbon to flow downward from the central axis of the rotary shaft to the space 86, thus causing the deposited nanocarbon to drop through this space 86. Further, in the nanocarbon producing apparatus shown in FIG. 26, spray nozzles 87 are attached to the rotary shaft so as to enable the catalyst-mixed hydrocarbon to spray uniformly from the blade-rotating rod 83 to each of the cone-shaped plates 73a, thereby creating a passageway for causing the deposited nanocarbon to flow downward from the outer periphery of each of the cone-shaped plates 73a. Herein, the spray nozzles 87 are respectively connected with each of the spray nozzles 81a-81e.

In this thirty-sixth embodiment, the catalyst-mixed hydrocarbon is sprayed from the rotary shaft 72 to thereby enable nanocarbon to grow on each of the cone-shaped plates 73a. Each of the cone-shaped plates 73a is declined downward in the external direction. Accordingly, the nanocarbon that has been grown on each of the cone-shaped plates 73a is caused to flow downward passing through the passageway formed at the outer periphery of each of the cone-shaped plates 73a, the grown nanocarbon being subsequently discharged from the discharge nozzle 47. As a result, the direction of spraying the catalyst-mixed hydrocarbon becomes the same as the downward flow direction of the nanocarbon product. Therefore, the production of nanocarbon on each of the cone-shaped plates 73a can be promoted and, at the same time, the nanocarbon thus grown on each of the cone-shaped plates 73a can be steadily discharged.

Incidentally, in order to facilitate the flow-down of nanocarbon product, a design for achieving the steady flow of nanocarbon product may be utilized as explained below. Namely, the angle of inclination of each of the cone-shaped plates 73a may be increased, or the space between the inner wall of the heating vessel 71 and the outer periphery of each of the cone-shaped plates 73a may be increased and an inert gas may be intermittently sprayed to this widened space.

Due to these modifications, it is possible to promote the production of nanocarbon and to steadily discharge the nanocarbon product, thus making it possible to efficiently manufacture high-quality nanocarbon.

(Thirty-Seventh Embodiment)

This embodiment will be explained with reference to FIG. 26. However, the same components as those of FIGS. 18-25 are identified by the same reference numbers, thereby omitting the explanation thereof.

The nanocarbon producing apparatus according to the thirty-seventh embodiment differs from the nanocarbon producing apparatus of the thirty-sixth embodiment in the respects that iron is employed as a material for each of the cone-shaped plates 73a and that the surface temperature of the cone-shaped plates 73a is set to the range of 500° C. to 1200° C. under the condition where the catalyst-mixed hydrocarbon is continuously and uniformly sprayed to the cone-shaped plates 73a. Other features of the apparatus are the same as those of the thirty-sixth embodiment.

It is desirable to set the surface temperature of each of the cone-shaped plates 73a as low as possible and to enhance the efficiency of the nanocarbon producing apparatus as a whole. However, it has been verified through repeated tests and researches conducted by the present inventors that when iron is employed as a material for the metallic catalyst powder of the metallic catalyst powder-mixed hydrocarbon containing a very small amount of metallic catalyst powder, it is possible to most effectively create high-purity nanocarbon by setting the surface temperature of each of the cone-shaped plates 73*a* to the range of 550° C. to 700° C. without increasing the surface temperature thereof to 800° C. or more.

However, it has been also verified that in the case where water is contained in hydrocarbon raw material or depending on the kinds of hydrocarbon raw material itself, it is impossible to create high-purity nanocarbon unless the surface temperature of each of the cone-shaped plates 73*a* is raised to about 1200° C.

According to the thirty-seventh embodiment, it is designed that the surface temperature of the cone-shaped plates 73*a* is set to the range of 500° C. to 1200° C. Therefore, irrespective of the kinds of hydrocarbon and even if the water content in the liquid hydrocarbon raw material such as biomass or bio-ethanol originating from biomass is fluctuates, it is possible to set the optimal temperature condition in conformity with the specific kind of hydrocarbon, thus making it possible to steadily produce high-quality carbon nanotubes.

(Thirty-Eighth Embodiment)

This embodiment will be explained with reference to FIG. 26. However, the same components as those of FIGS. 18-25 are identified by the same reference numbers, thereby omitting the explanation thereof.

The nanocarbon producing apparatus according to the thirty-eighth embodiment differs from the nanocarbon producing apparatus of the thirty-sixth embodiment in the respects that the metallic catalyst powder-mixed hydrocarbon to be sprayed to the surfaces of the cone-shaped plates 73*a* disposed in multi-stages is heated in the heating vessel 71 to turn it into a gaseous state, thereby making it possible to uniformly spray it without lowering the surface temperature of each of the cone-shaped plates 73*a*. Other features of the apparatus are the same as those of the thirty-sixth embodiment. In this nanocarbon producing apparatus 10, catalytic particles constituting the metallic catalyst powder in the sprayed catalyst-mixed hydrocarbon is utilized as a core. Then, the reaction of hydrocarbon thus vaporized is caused to take place under a high temperature condition, thereby enabling nanocarbon to efficiently form and grow by way of a vapor phase deposition method.

According to the nanocarbon producing apparatus of the thirty-eighth embodiment, since the spray nozzles 87 themselves are mounted at a central portion of the apparatus, the metallic catalyst powder-mixed hydrocarbon to be injected can be heated by the inner ambient temperature. Further, a liquid hydrocarbon to be sprayed into the heating vessel 71 and comprising hydrocarbon selected from ethanol, methanol, bio-ethanol, various kinds of alcohols, hydrocarbon oil such as kerosene, etc. and a very small quantity of metallic catalyst powder is preliminarily heated in the nanocarbon producing apparatus to turn it into a gaseous state. This gaseous mixture is then continuously sprayed to the surface of each of the cone-shaped plates 73*a*. Accordingly, the temperature inside the heating vessel 71 as well as the surface temperature of each of the cone-shaped plates 73*a* can be prevented from being lowered, thereby improving the nanocarbon-producing reaction inside the heating vessel 71 and accelerating the nanocarbon-producing rate, resulting in the enhancement of nanocarbon-forming efficiency. Moreover, even if the set temperature of the heating jacket 77 is set to a lower level, it is possible to maintain the temperature inside the heating vessel 71. As a result, the heating temperature of the nanocarbon producing apparatus 10 can be lowered, thus making it possible to steadily and continuously form and recover nanocarbon while enhancing the nanocarbon-producing efficiency.

In the thirty-eighth embodiment, a liquid metallic catalyst powder-mixed hydrocarbon is heated to turn it into a gaseous state for spraying it. However, the liquid metallic catalyst powder-mixed hydrocarbon may be sprayed as a liquid into the nanocarbon producing apparatus, in which the liquid metallic catalyst powder-mixed hydrocarbon can be vaporized and the reaction thereof can be achieved. Namely, in this case, the hydrocarbon such as ethanol, methanol, bio-ethanol, various kinds of alcohols, hydrocarbon oil such as kerosene, etc. may be sprayed, while being mixed with a very small quantity of metallic catalyst powder, into the nanocarbon producing apparatus. In this case, the liquid metallic catalyst powder-mixed hydrocarbon that has been sprayed as a liquid on the occasion of spraying it to the cone-shaped plates 73*a* disposed in the nanocarbon producing apparatus 10 should be immediately vaporized under the influence of the heated cone-shaped plates 73*a*.

Further, the metallic catalyst powder-mixed hydrocarbon to be sprayed to the surface of metallic substrate may be sprayed not only as a gas but also as a liquid into the heating vessel, wherein the liquid hydrocarbon sprayed as a liquid can be vaporized in the heating vessel and enabled to react on the surface of each of the metallic substrates. Namely, in this case, the metallic catalyst powder-mixed hydrocarbon thus injected can be vaporized as it flows downward through the rotary shaft 72, thereby enabling the metallic catalyst powder-mixed hydrocarbon to be sprayed as a gaseous state at the time of spraying it to the cone-shaped plates 73*a*. By doing so, the vaporized metallic catalyst powder-mixed hydrocarbon can be sprayed continuously and uniformly on the cone-shaped plates 73*a* disposed in the heating vessel 71, thus enabling the reaction of the metallic catalyst powder-mixed hydrocarbon to take place and producing nanocarbon. In this manner, as in the case of thirty-eighth embodiment, the nanocarbon can be efficiently formed and permitted to grow.

Further, in the nanocarbon producing apparatus shown in FIG. 26, the metallic catalyst powder-mixed hydrocarbon to be sprayed to the surface of each of the metallic substrates may be sprayed as a liquid into the heating vessel 71 and this liquid metallic catalyst powder-mixed hydrocarbon may contain an acid component. As a result, the metallic fine particles on the surface of each of the metallic substrates can be easily corroded and become liable to be peeled off from the surface of each of the metallic substrates. Following is an explanation on an improvement of reaction on the surface of each of the metallic substrates.

Namely, the nanocarbon producing apparatus of this embodiment is the same in fundamental construction as the nanocarbon producing apparatus shown in FIG. 26. However, in the nanocarbon producing apparatus of this embodiment, a liquid metallic catalyst-powder mixed hydrocarbon containing an acid component and being sprayed into the nanocarbon producing apparatus provides a reducing atmosphere therein is sprayed as a liquid into the nanocarbon producing apparatus. As a result, the metallic substrates can be easily corroded due to the effects of metallic catalyst powder and become liable to be peeled off from the surface of each of the metallic substrates, thereby making it possible to promote the reaction on the surface of each of the cone-shaped plates 73*a* disposed in the heating vessel 71.

As for the liquid hydrocarbon containing an acid component, it is possible to employ, for example, a solution of hydrocarbon comprising a very small quantity of catalytic metal power, hydrocarbon selected from ethanol, methanol, bio-ethanol, various kinds of alcohols, hydrocarbon oil such as kerosene, etc. and a very small quantity of an acid such as acetic acid, hydrochloric acid, etc. for making the mixture acidic; or an acidic solution of hydrocarbon such as biomass oil, etc. which contains a very small quantity of catalytic metal power. The metallic catalyst powder-mixed hydrocarbon containing any of these acidic components is sprayed as a liquid and then vaporized in the nanocarbon producing apparatus, thereby enabling the vaporized hydrocarbon to be uniformly and continuously sprayed onto the surface of the metallic substrate, causing the reaction of vaporized hydrocarbon to take place to form the nanocarbon.

In the nanocarbon producing apparatus shown in FIG. 26, the liquid metallic catalyst powder-mixed hydrocarbon containing an acid component and designed to be sprayed into the heating vessel 71 is enabled to react under high temperature conditions, thereby making it possible to efficiently form and grow the nanocarbon. Therefore, it is possible to steadily and continuously form and recover the nanocarbon while enhancing the nanocarbon-forming efficiency.

(Thirty-Ninth Embodiment)

Figure 27A:
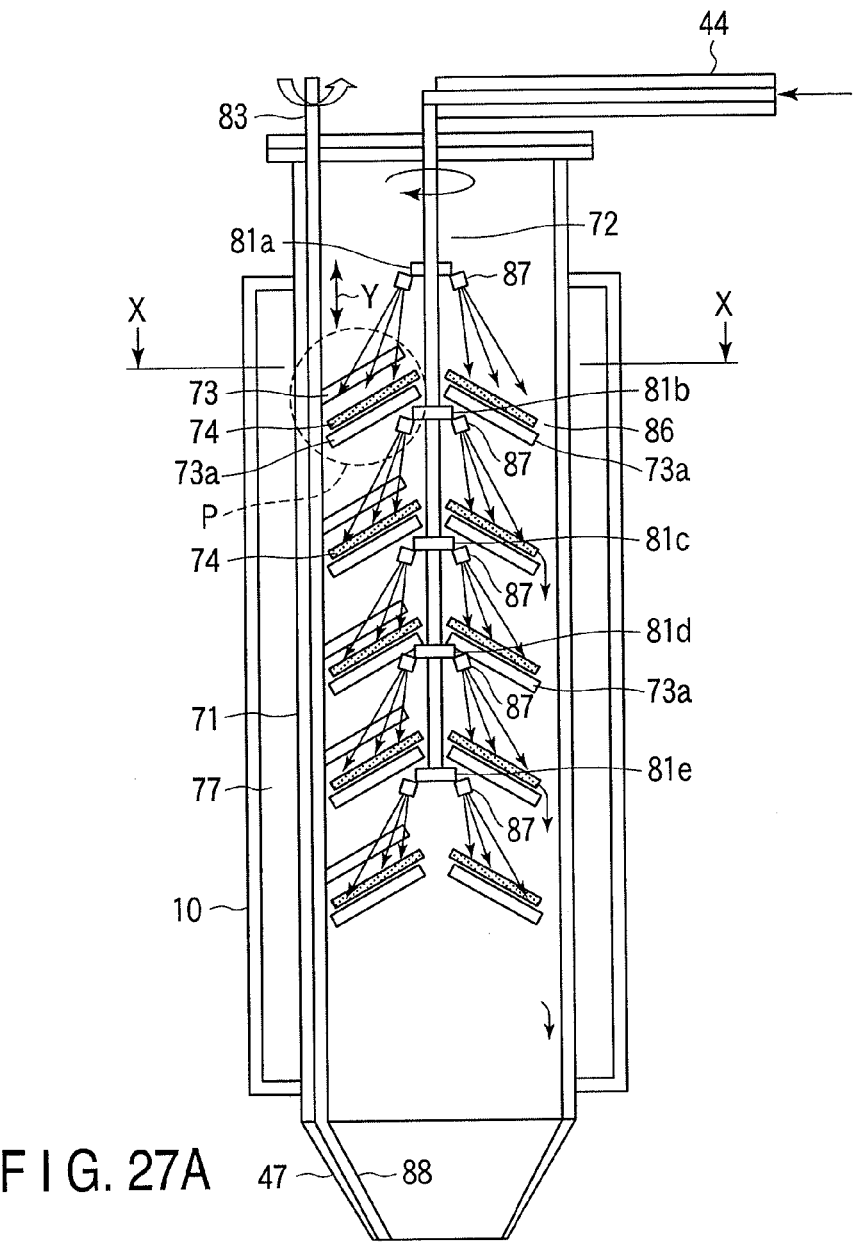
FIG. 27A is a diagram schematically illustrating the entire structure of a vertical type nanocarbon producing apparatus according to the thirty-ninth embodiment of the present invention.
Figure 27B:
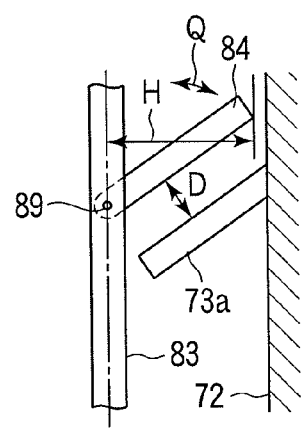
FIG. 27B is a cross-sectional view taken along the X-X line of FIG. 27A.

FIG. 27A and FIG. 27B show respectively a diagram for illustrating the vertical type nanocarbon producing apparatus according to the thirty-ninth embodiment. Herein, FIG. 27A is a general view of the vertical type nanocarbon producing apparatus, and FIG. 27B is a partially enlarged view showing a main portion of FIG. 27A (a portion indicated by a dashed line). Herein, the same components as those of FIGS. 18-26 are identified by the same reference numbers, thereby omitting the explanation thereof.

The nanocarbon producing apparatus shown in FIG. 27 differs from the nanocarbon producing apparatus of the thirty-sixth embodiment in the respects that a distance "D" between the underside surface of the scraper blade 84 which is secured to the blade-rotating rod 83 and the surface of cone-shaped plate 73a which is secured to the rotary shaft 72 is made adjustable in the direction of the arrow "Y". Other features of the apparatus are the same as those of the thirty-sixth embodiment. In the case of FIG. 27, a scraper blade 88 is also attached to a lower end portion of the blade-rotating rod 83, wherein a spacing distance "L" is made adjustable by moving the blade-rotating rod 83 in the direction of the arrow "Y".

As described above, the scraper blade 84 is prevented from being contacted with the surface of the cone-shaped plate 73a disposed in the heating vessel 71 of the nanocarbon producing apparatus 10 and is designed to scrape away only the nanocarbon that has been grown from a portion in the vicinity of the cone-shaped plate 73a. Herein, the scraper blade 84 is prevented from being contacted with the surface of the cone-shaped plate 73a disposed in the heating vessel 71 and is designed to scrape away only the nanocarbon that has been grown using, as a core, the catalytic particles constituting the metallic catalyst powder. The reason for this is to avoid the scraping-off of metallic fine particles of the metallic catalyst powder that have been adhered to the surface of the cone-shaped plate 73a disposed in the heating vessel 71. If the metallic fine particles of the metallic catalyst powder that have been adhered to the surface of the cone-shaped plate 73a are scraped away, metallic impurities may be permitted to enter into the nanocarbon product, thereby deteriorating the purity of the nanocarbon product. In addition to that, when a metal is mounted on the surface of the cone-shaped plate 73a, this metal may be scraped away, thus inviting a decrease of the continuous nanocarbon-producing rate and hence deteriorating the nanocarbon-producing efficiency.

With respect to the structure for adjusting the spacing distance "D", the following structures and systems are conceivable in conformity with the design of the nanocarbon producing apparatus 10.

(1) In conformity with the structure to uniformly scrape the surface of the cone-shaped plate 73a, the proximal end portion of the scraper blade 84 is secured to the rotational driving shaft 32 by means of screw 89, wherein the fine adjustment of the length "H" of arm (a distance between the axial center of the rotational driving shaft 83 and the edge of the scraper blade 84) can be performed by the rotation of the screw 89 in the direction of arrow "Q" (see FIG. 27B).

2) A scraper blade 84—fixing jig (not shown) is mounted on the rotational driving shaft 83—facing side of the scraper blade 84, wherein the fine adjustment of the length "H" of the arm can be performed by adjusting the mounting height of the fixing jig.

According to the nanocarbon producing apparatus of the thirty-ninth embodiment, the nanocarbon that has failed to peel off and to gravitationally drop from the surface of cone-shaped plate 73a after the nanocarbon has been grown to a predetermined thickness on the surface of cone-shaped plate 73a can be made to drop, at periodic intervals, to a region below the nanocarbon producing apparatus 10 without scraping the metallic fine particles existing in the vicinity of the surface of cone-shaped plate 73a disposed in the heating vessel 71. Therefore, it is now possible to steadily discharge the nanocarbon product from the downstream side of the heating vessel 71 of the nanocarbon producing apparatus 10 and to continuously manufacture nanocarbon.

Further, as shown in FIG. 27, in order to prevent the generation of build-up/bridges of nanocarbon product falling down to a portion of the scraper blade 84 located close to a lower portion of the blade-rotating rod 83 (a lower portion of the heating vessel 71), the scraper blade 88 is attached to a lower portion of the rotational driving shaft 83. Therefore, it is possible to perform the scraping of the lower surface region of the nanocarbon producing apparatus 10 located in the vicinity of the nanocarbon product discharge nozzle 47 where the bridge is more likely to be formed due to the falling nanocarbon. By the provision of the scraper blade 88, it becomes possible to effectively prevent the bridge from being formed by the discharging nanocarbon product while enabling to realize the scraping and falling of the nanocarbon product.

(Fortieth Embodiment)

The vertical type nanocarbon producing apparatus according to the fortieth embodiment is featured in that a biomass oil to be derived from the thermal decomposition of biomass materials such as ligneous materials is used as a hydrocarbon to be sprayed into the heating vessel.

In the vertical type nanocarbon producing apparatus of the fortieth embodiment, oils (hydrocarbon oils) originating from a fossil resource are not employed as a raw material for nanocarbon but biomass materials such as ligneous materials are employed, wherein the biomass materials are thermally decomposed to obtain biomass oils. As a result, it is possible to produce nanocarbon or high-functionality carbon while making it possible to restrict the employment of the fossil resource and the discharge of $CO_2$ resulting from the combustion and to prevent global warming.

Incidentally, in the fortieth embodiment, the employment of biomass to be derived from the thermal decomposition of biomass materials such as ligneous materials has been discussed as hydrocarbon to be sprayed. However, it is also possible, other than such kind of biomass, to employ, as a hydrocarbon, the following materials shown in the following paragraphs (1) and (2).

(1) Hydrocarbon having a carbon content, which can be obtained by a process wherein biomass materials such as ligneous materials are thermally decomposed to obtain a biomass oil, from which water is removed to obtain a hydrocarbon having a large carbon content.

When hydrocarbon of this kind is sprayed into a heating vessel, it is possible to produce nanocarbon more effectively from biomass materials.

(2) Hydrocarbon having a carbon content, which can be obtained by a process wherein biomass materials such as ligneous materials are thermally decomposed to obtain a biomass gas, from which water vapor is removed to obtain a hydrocarbon having a large carbon content. As for the method of removing water vapor from the biomass gas, it is possible to employ, for example, a method of converting the water vapor component into a hydrogen component by raising the thermal decomposition temperature, or a method of adsorbing/separating/removing the water vapor component from a biomass gas by making use of chemical procedures for example.

By spraying the hydrocarbon conditioned as described above, it is possible to produce nanocarbon more effectively and simply from biomass materials on the occasion of directly producing nanocarbon by making use of a gas to be derived from the thermal decomposition of a biomass material such as a ligneous material, etc. Incidentally, as for the method of removing the water vapor component from a biomass gas, it is possible to employ a method of converting a water vapor component into a hydrogen component by raising the thermal decomposition temperature, a reforming method, a method of adsorbing/separating/removing a water vapor component from a biomass gas by making use of a chemical method, etc.

As described above, it is possible, through a suitable combination of the aforementioned methods, to efficiently and increasingly produce high-quality nanocarbon from various kinds of hydrocarbon raw materials.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A nanocarbon producing apparatus comprising:
   a heating vessel which provides a reducing atmosphere therein;
   a metallic substrate disposed on an inside surface of the heating vessel, the metallic substrate comprising catalytic particles;
   a heating source disposed on an outer circumference of the heating vessel;
   a hydrocarbon injection nozzle disposed on an upstream side of the heating vessel which injects hydrocarbon into the heating vessel, and effects a reaction to grow nanocarbon on the metallic substrate;
   a scraping mechanism disposed in the heating vessel which scrapes away the nanocarbon grown on the metallic substrate, the scraping mechanism being configured to rotate a scraping member about a central axis of the heating vessel and to be capable of adjusting a spacing distance between the surface of the metallic substrate and the scraping member; and
   a nanocarbon discharging portion disposed on a downstream side of the heating vessel.

2. The nanocarbon producing apparatus according to claim 1, wherein a double damper comprising an upper damper and a lower damper for discharging nanocarbon is disposed at the nanocarbon discharging portion, and is configured to be capable of discharging the nanocarbon out of the heating vessel while keeping the temperature inside the heating vessel constant and maintaining the reducing atmosphere.

3. The nanocarbon producing apparatus according to claim 1, wherein the heating vessel is made of a vertically arranged cylinder, and the metallic substrate is disposed on an inner sidewall of the heating vessel.

\* \* \* \* \*